(12) United States Patent
Williams

(10) Patent No.: US 7,782,027 B2
(45) Date of Patent: *Aug. 24, 2010

(54) HIGH-EFFICIENCY DC/DC VOLTAGE CONVERTER INCLUDING DOWN INDUCTIVE SWITCHING PRE-REGULATOR AND CAPACITIVE SWITCHING POST-CONVERTER

(75) Inventor: Richard K. Williams, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 11/890,818

(22) Filed: Aug. 8, 2007

(65) Prior Publication Data

US 2008/0158915 A1    Jul. 3, 2008

Related U.S. Application Data

(60) Provisional application No. 60/877,952, filed on Dec. 30, 2006, provisional application No. 60/877,720, filed on Dec. 30, 2006.

(51) Int. Cl.
    *G05F 1/563* (2006.01)
(52) U.S. Cl. .................... 323/266; 323/271; 363/60
(58) Field of Classification Search .............. 323/266, 323/271, 282; 363/59, 60
    See application file for complete search history.

(56) References Cited

U.S. PATENT DOCUMENTS

| | | | |
|---|---|---|---|
| 3,943,428 A | 3/1976 | Whidden | 363/60 |
| 4,553,986 A | 11/1985 | Ciliberti et al. | 95/116 |
| 4,743,835 A | 5/1988 | Bosse et al. | 323/266 |
| 4,761,722 A | 8/1988 | Pruitt | 363/17 |
| 4,974,141 A | 11/1990 | Severinsky et al. | 363/81 |
| 5,066,900 A | 11/1991 | Bassett | 323/224 |
| 5,235,504 A | 8/1993 | Sood | 363/53 |
| 5,557,193 A * | 9/1996 | Kajimoto | 323/282 |
| 5,773,966 A | 6/1998 | Steigerwald | 323/284 |
| 5,886,512 A | 3/1999 | Becerra | 323/282 |
| 6,023,418 A | 2/2000 | Engira | 363/63 |
| 6,272,025 B1 | 8/2001 | Riggio et al. | 363/24 |
| 6,400,579 B2 | 6/2002 | Cuk | 363/16 |
| 6,428,918 B1 | 8/2002 | Fuglevand et al. | 429/13 |
| 6,504,423 B2 | 1/2003 | Riggio et al. | 327/560 |
| 6,580,258 B2 | 6/2003 | Wilcox et al. | 323/282 |
| 6,650,552 B2 * | 11/2003 | Takagi et al. | 363/17 |
| 6,798,177 B1 | 9/2004 | Liu et al. | 323/222 |

(Continued)

FOREIGN PATENT DOCUMENTS

KR    10-2006-0084075    7/2006

*Primary Examiner*—Jeffrey L Sterrett
(74) *Attorney, Agent, or Firm*—Patentability Associates

(57) ABSTRACT

A DC/DC converter includes a pre-regulator stage, which may include a Buck converter, and a post-converter stage, which may include a charge pump. The duty factor of the pre-regulator stage is controlled by a feedback path that extends from the output terminal of the pre-regulator stage or the post-converter stage. The pre-regulator steps the input DC voltage down by a variable amount depending on the duty factor, and the post-converter steps the voltage at the output of the pre-regulator up or down by an positive or negative integral or fractional value. The converter overcomes the problems of noise glitches, poor regulation, and instability, even near unity input-to-output voltage conversion ratios.

19 Claims, 55 Drawing Sheets

U.S. PATENT DOCUMENTS

| | | | |
|---|---|---|---|
| 6,937,487 B1 | 8/2005 | Bron | 363/60 |
| 7,071,660 B2 | 7/2006 | Xu et al. | 323/266 |
| 7,078,882 B2 | 7/2006 | Weng et al. | 323/224 |
| 7,161,335 B2 | 1/2007 | Wei et al. | 323/266 |
| 7,317,302 B1 | 1/2008 | Collins | 323/222 |
| 7,336,059 B2 | 2/2008 | Steigerwald et al. | 323/288 |
| 7,359,219 B2 | 4/2008 | Erdl et al. | 363/16 |
| 7,408,330 B2 | 8/2008 | Zhao | 323/266 |
| 7,466,111 B2 | 12/2008 | Komaki et al. | 323/224 |
| 2005/0099164 A1 | 5/2005 | Yang | 323/266 |
| 2008/0157732 A1 | 7/2008 | Williams | 323/282 |
| 2008/0157733 A1 | 7/2008 | Williams | 323/266 |
| 2009/0059630 A1 | 3/2009 | Williams | 323/282 |

* cited by examiner

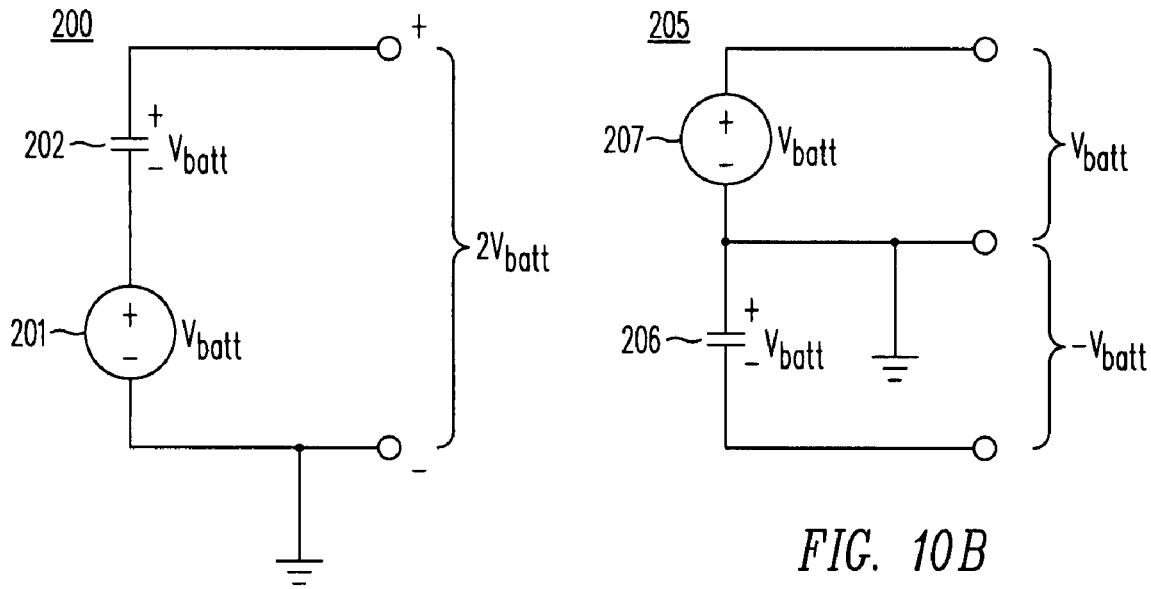
FIG. 10A
FIG. 10B
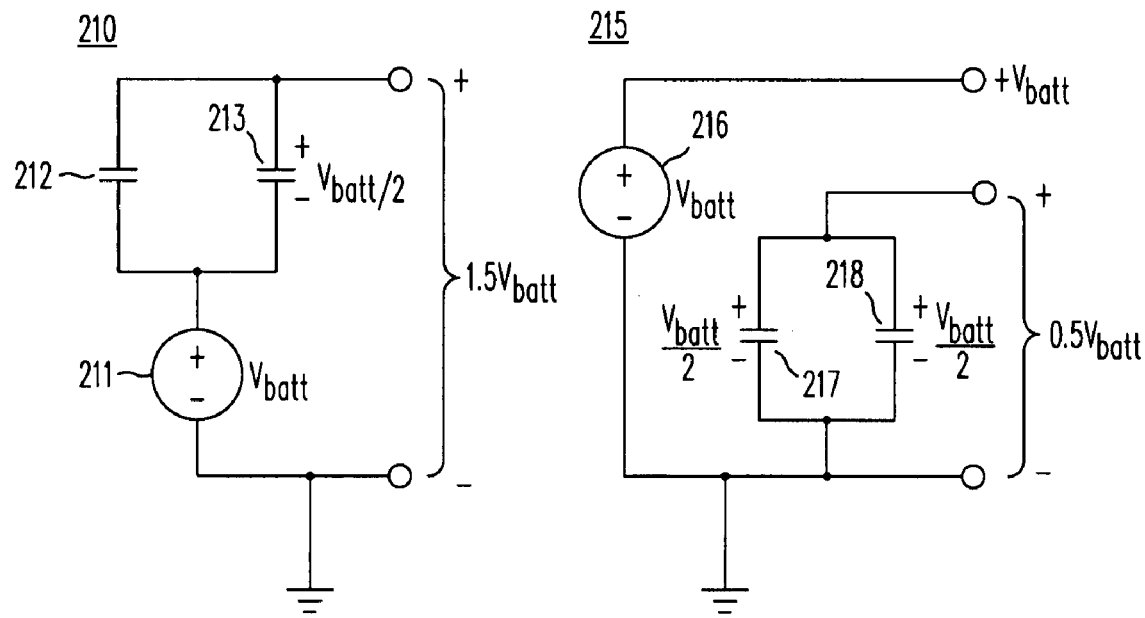
FIG. 10C
FIG. 10D

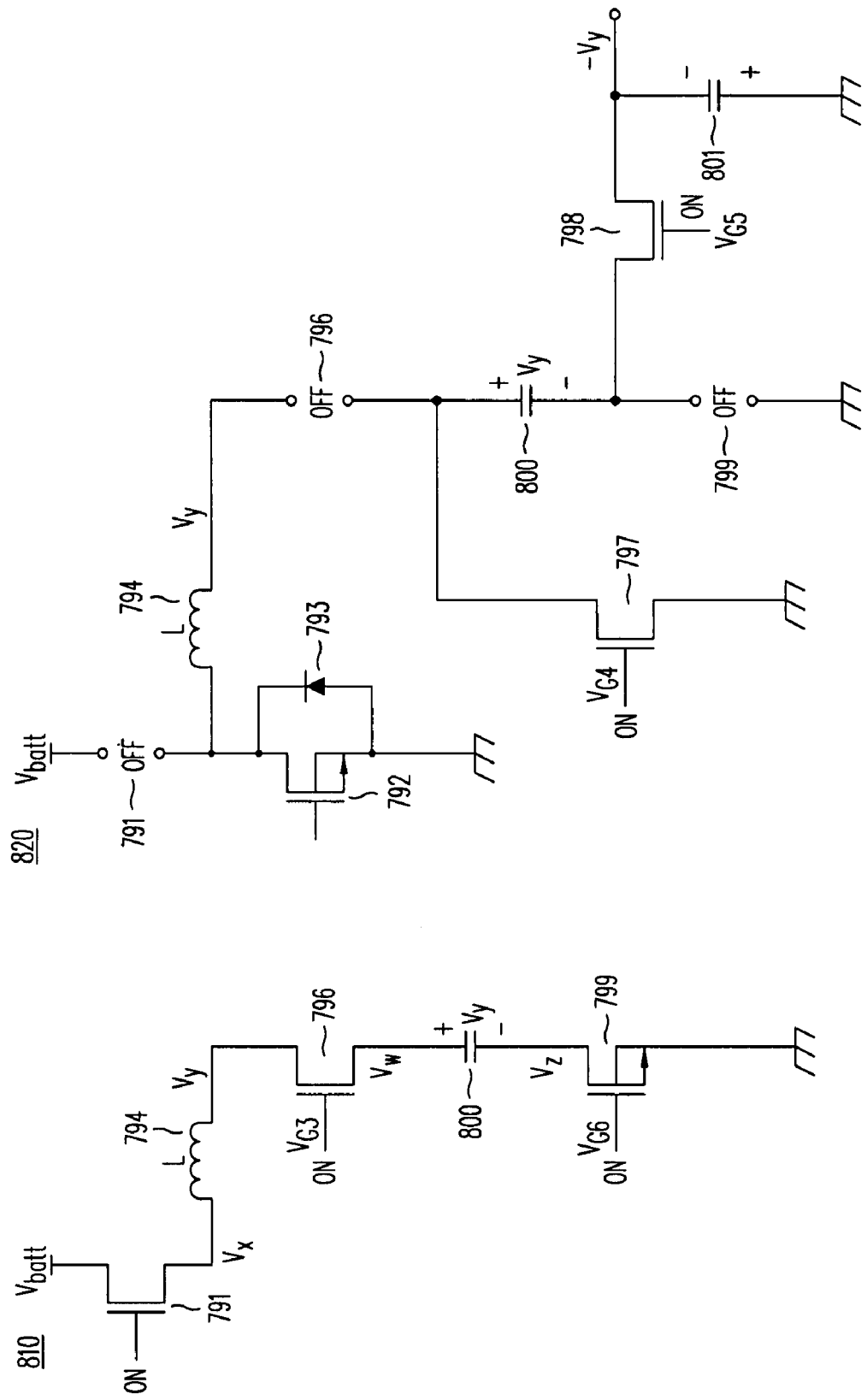

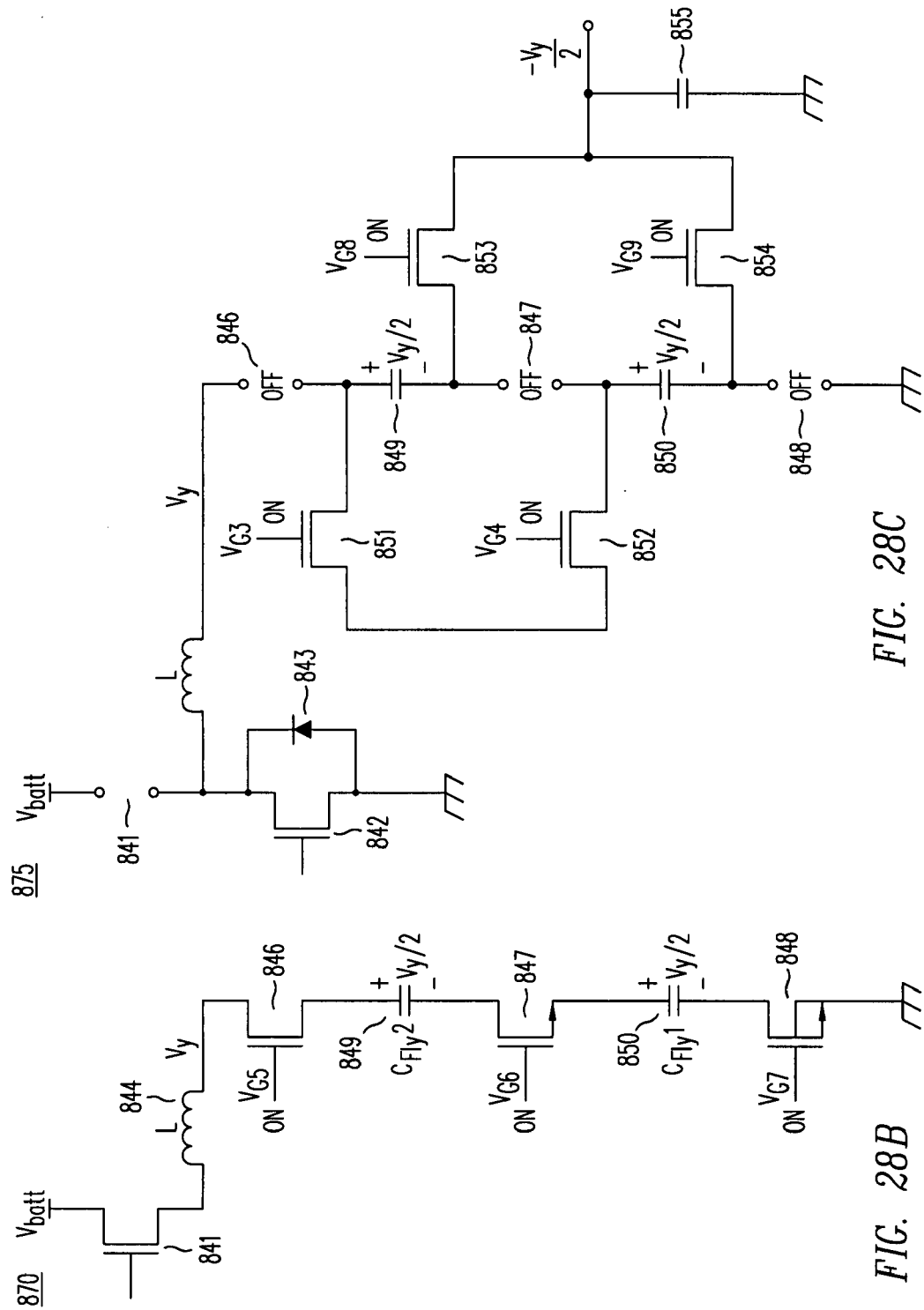

HIGH-EFFICIENCY DC/DC VOLTAGE CONVERTER INCLUDING DOWN INDUCTIVE SWITCHING PRE-REGULATOR AND CAPACITIVE SWITCHING POST-CONVERTER

CROSS-REFERENCE TO RELATED APPLICATIONS

This application claims the priority of Provisional Applications Nos. 60/877,952 and 60/877,720, both titled "High-Efficiency Down-Up And Related DC/DC Converters" and filed on Dec. 30, 2006, each of which is incorporated herein by reference in its entirety.

FIELD OF THE INVENTION

This invention pertains to the design, operation and performance of switching power supplies for use in DC/DC conversion and voltage regulation, and to the semiconductor components used in such converters.

BACKGROUND OF THE INVENTION

Voltage regulation is commonly required to prevent variation in the supply voltage powering various microelectronic components such as digital ICs, semiconductor memories, display modules, hard disk drives, RF circuitry, microprocessors, digital signal processors and analog ICs, especially in battery-powered applications such as cell phones, notebook computers and consumer products.

Since the battery or DC input voltage of a product often must be stepped-up to a higher DC voltage, or stepped-down to a lower DC voltage, such regulators are referred to as DC-to-DC converters. Step-down converters, commonly referred to as "Buck converters," are used whenever a battery's voltage is greater than the desired load voltage. Step-down converters may comprise inductive switching regulators, capacitive charge pumps, and linear regulators. Conversely, step-up converters, commonly referred to as "boost converters," are needed whenever a battery's voltage is lower than the voltage needed to power its load. Step-up converters may comprise inductive switching regulators or capacitive charge pumps.

Another type of converter may operate as either a step-up or a step-down converter depending on whether the power input to the converter has a voltage above or below its output voltage. Commonly referred to Buck-boost converters, such circuitry is needed whenever a regulator's input and output are similar in voltage, where variations in the input voltage preclude the use of a simple boost or Buck converter.

One example of such an application requiring both step-up and step-down conversion is supplying a regulated 3.3V output from a lithium ion (LiIon) battery. A LiIon battery exhibits a terminal voltage which decays from 4.2V when fully charged to below 3V when discharged. Since the initial battery voltage is above 3.3V and the final battery voltage is below 3.3V, the converter must be able to step-down initially and step-up later.

Inductive Switching Converters

Of the aforementioned voltage regulators, the inductive switching converter can achieve superior performance over the widest range of currents, input voltages and output voltages. The fundamental principal of a DC/DC inductive switching converter is that the current in an inductor (coil or transformer) cannot be changed instantly and that an inductor will produce an opposing voltage to resist any change in its current.

By using one or more transistors switching at a high frequency to repeatedly magnetize and de-magnetize an inductor, the inductor can be used to step-up or step-down the converter's input, producing an output voltage different from its input. The transistors are typically implemented using MOSFETs with a low on-state resistance, commonly referred to as "power MOSFETs". Using feedback from the converter's output voltage to control the switching conditions, a constant well-regulated output voltage can be maintained despite rapid changes in the converter's input voltage or its output current.

To remove any AC noise or ripple generated by switching action of the transistors, an output capacitor is placed across the output of the switching regulator circuit. Together the inductor and the output capacitor form a "low-pass" filter able to remove the majority of the transistors' switching noise from reaching the load. The switching frequency, typically 1 MHz or more, must be "high" relative to the resonant frequency of the filter's "LC" tank. Averaged across multiple switching cycles, the switched-inductor behaves like a programmable current source with a slow-changing average current.

Since the average inductor current is controlled by transistors that are biased either as "on" or "off" switches, the power dissipation in the transistors is theoretically small and high converter efficiencies, in the 80% to 90% range, can be realized. Specifically, when an enhancement mode power MOSFET is biased as an on-state switch using a "high" gate bias, it exhibits a linear I-V drain characteristic with a low $R_{DS}(on)$ resistance typically 200 milliohms or less. At a current of 0.5 A for example, such a device will exhibit a maximum voltage drop $I_D \cdot R_{DS}(on)$ of only 100 mV despite its high drain current. Its power dissipation during its on-state conduction time is $I_D^2 \cdot R_{DS}(on)$. In the example given the power dissipation during the transistor's conduction is $(0.5 A)^2 \cdot (0.2\Omega)$=50 mW.

In its off state, an enhancement mode power MOSFET has its gate biased to its source, i.e. so that $V_{GS}$=0. Even with an applied drain voltage $V_{DS}$ equal to a converter's battery input voltage $V_{batt}$, a power MOSFET's drain current $I_{DSS}$ is very small, typically well below one microampere and more generally nanoamperes. The current $I_{DSS}$ is primarily due to junction leakage.

So a power MOSFET used as a switch in a DC/DC converter is efficient, since in its off condition it exhibits low currents at high voltages, and in its on state it exhibits high currents at a low voltage drop. Excepting switching transients, the $I_D \cdot V_{DS}$ product in the power MOSFET remains small, and power dissipation in the switch remains low.

Provided that the transistor switching events (i.e., the time it takes to switch the MOSFET from off to on, and vice-versa) are relatively short compared to the period between switching events, the power loss during switching can in circuit analysis be considered negligible or alternatively treated as a fixed power loss. At multi-megahertz switching frequencies, however, the switching waveform analysis becomes more significant and must be considered by analyzing a device's drain voltage, drain current, and gate bias voltage versus time.

Minimizing Power Loss in Switching Converters

In step-up, step-down or up-down DC-to-DC switching converters, one or more power switch elements are required to control the current and energy flow in the converter circuitry. During operation, these power devices act as power switches, toggling on and off at high frequencies and with varying frequency or duration.

During such operation, these power devices lose energy to self heating, both during periods of on-state conduction and during the act of switching. These switching and conduction losses adversely limit the power converter's efficiency. The efficiency of a converter therefore depends on minimizing the $I_{on} \cdot V_{on}$ conduction loss in every conducting switch or rectifier diode, and in minimizing the gate drive current need to charge the switch's input capacitance at the desired frequency, also known as $C_G \cdot V_G^2$ losses.

Other losses include power dissipated during the switching transition, i.e. cross-over conduction, when both voltage and current are simultaneously present, and at higher voltages, output power lost charging and discharging a MOSFET's drain capacitance, as given by the loss for each device, namely $$P_{loss} = P_{conduction} + P_{drive} + P_{crossover} + P_{drain}$$

For fast switching transistors operating at low voltages, however, these additional losses are small compared to the gate drive and conduction losses in the converter. As such, the power loss in one switch can be reduced by minimizing the sum of its conduction loss and the gate drive loss, where $$P_{loss} \approx P_{conduction} + P_{drive}$$

For a power MOSFET this relationship can be approximated by the equation $$P_{loss} \approx I^2 R_{DS}\left(\frac{t_{sw}}{T}\right) + I \cdot V_f\left(\frac{t_{rect}}{T}\right) + Q_G V_G f$$

In this equation $I^2 R_{DS}$ represents the conduction loss in a power MOSFET and the ratio $(t_{sw}/T)$ represents the portion of the time the MOSFET is switched fully on and conducting current. The conduction loss term $I \cdot V_f$ represents power dissipated in a diode having a forward voltage $V_f$ and $(t_{rect}/T)$ represents the fraction of time in a period $T$ the diode is conducting current. The term $Q_G \cdot V_G \cdot f$ describes the aforementioned $C_G \cdot V_G^2$ gate drive loss described in terms of gate charge $Q_G$. Gate charge $Q_G$ is preferred over capacitance $C_G$ since the capacitance is highly non-linear and difficult to model accurately. Moreover, using gate charge $Q_G$ offers greater accuracy is predicting efficiency since in nature charge is always conserved, but capacitance is not.

From the above equation minimizing the power loss in the MOSFET requires minimizing $R_{DS}$ by making the MOSFET larger while minimizing gate drive loss requires minimizing $Q_G$. Unfortunately gate charge and capacitance are proportional to a transistor's active area A and inversely proportional to its on-resistance, i.e.

$$Q_G \propto A \propto \frac{1}{R_{DS}}$$

This relation clarifies an unavoidable tradeoff that exists between gate drive and resistive channel conduction losses in a power MOSFET used as a switching converter. Bigger MOSFETs exhibit lower on-resistance and less conductive loss but are harder to drive, losing efficiency especially at higher switching frequencies f.

To maximize a converter's overall efficiency, one must not only use MOSFETs with lowest possible resistance and the minimum gate input capacitance, but must also employ a minimal number of switching elements, with each MOSFET optimized in size for its nominal operating current and switching frequency.

Non-isolated converter topologies like synchronous Buck and synchronous boost converters exhibit high efficiencies because they employ only two MOSFET switches. Unfortunately, up-down converters typically require four switches and suffer in efficiency as a result. While transformers or coupled inductors may be used to achieve up-down regulator operation and avoid the need for more switches, in non-isolated converter applications, multi-winding inductors are unacceptably large compared to single-winding coils.

Non-Isolated Switching Converter Topologies

FIGS. 1A and 1B illustrate two common switching regulators, a synchronous Buck step-down converter and a synchronous boost step-up converter.

An example of a synchronous Buck converter 1 is shown in FIG. 1A. Converter 1 comprises a power MOSFET 3, an inductor 4, a synchronous rectifier power MOSFET 2, with an intrinsic rectifier diode 7, and a capacitor 5. Operation of MOSFET 3 is controlled by a pulse-width modulation (PWM) control circuit (not shown), driving the gate of MOSFET 3. Synchronous rectifier MOSFET 2 is driven out of phase with MOSFET 3, but MOSFET 2 is not necessarily on the entire time when MOSFET 3 is off.

While the control circuit controlling the converter's operation is referred to as PWM control implying fixed-frequency variable-pulse-width operation, it may alternatively operate in a variable frequency mode where the clock period is allowed to vary, or alternatively alternating between varying and fixed frequency modes depending on load and input conditions.

The energy input from the power source, battery or power input into the DC/DC converter is switched or gated through MOSFET 3. With its positive terminal connected to the battery or input, MOSFET 3 acts like a "high-side" switch controlling the current in inductor 4. Diode 8 is a P-N junction parasitic to MOSFET 3, in parallel to the transistor's drain and source, which remains reverse-biased under normal Buck converter operation.

By controlling the current in the inductor 4 by controlling the switching and on-time of MOSFET 3, the energy stored in the magnetizing field of inductor 4 can be adjusted dynamically to control the voltage on output filter capacitor 5. The output voltage $V_{out}$ is therefore fed back to the input of PWM controller circuit, which controls the current $I_L$ in inductor 4 through the repeated switching of MOSFET 3. Load 6 represents an electrical load connected to the output of converter 1.

Driven out of phase with MOSFET 3, synchronous rectifier MOSFET 2 conducts some portion of the time when MOSFET 3 is off. With its positive terminal connected to the inductor 4, i.e. to node $V_x$, and its negative terminal connected to circuit ground, MOSFET 2 acts like a "low-side" switch, shunting the current flowing in diode 7. Diode 7 is a P-N junction parasitic to synchronous rectifier MOSFET 2, in parallel to the transistor's drain and source. Diode 7 conducts substantial inductor current only during intervals when both MOSFETs 2 and 3 are off.

Both MOSFETs 2 and 3 are simultaneously off during every switching transition to prevent shorting the input power source to ground. This so-called "break-before-make" (BBM) interval prevents shoot through conduction by guaranteeing that both MOSFETs 2 and 3 do not conduct simultaneously and short or "crow-bar" the input and power source of converter 1. During this brief BBM interval, diode 7 in parallel to synchronous rectifier MOSFET 2 must, along with any parasitic capacitance associated with diode 7, carry the load current $I_L$ through inductor 4. Unwanted noise can occur during the transitions associated with BBM operation.

If we define the converter's duty factor D as the time that energy flows from the battery or other power source into the DC/DC converter, i.e. the time during which MOSFET switch 3 is on, then the ratio of output to input voltage in Buck converter 1 is proportionate to its duty factor, i.e.

$$\frac{V_{out}}{V_{in}} = D \equiv \frac{t_{sw}}{T}$$

where $t_{sw}$ is the time period that MOSFET 3 is turned on during each clock period T.

This relationship for a Buck or synchronous Buck converter is illustrated by curve 21 in FIG. 1C in graph 20. Notice that a Buck converter cannot smoothly reach a zero or unity transfer characteristic without exhibiting some discontinuity at the extremes of D. This phenomenon occurs due to switching delays in the power MOSFET switch and its control and gate drive circuitry.

So long as the Buck converter's power MOSFET 3 is still switching, $t_{sw}$ is limited to some portion of the clock period T, e.g. 5%<D<95%, essentially due to turn-on and turn-off delay within the MOSFET switch and its control loop. For example at a 95% duty factor and a 3 MHz clock frequency, the off time for the high-side MOSFET 3 is only 5% of the 333 nsec period, or just 16 nsec. This means the high side MOSFET 3 must turn off and back on in only 16 nsec—too rapidly to regulate over a 95% output-to-input conversion ratio. This minimum off-time problem impacts both synchronous and non-synchronous Buck converters. This problem is further exacerbated in a synchronous DC/DC converter, since no time remains for the synchronous rectifier MOSFET 2 to turn on and then off again and still exhibit BBM operation.

Referring again to graph 20 in FIG. 1C, above some maximum duty factor $D_{max}$, there is not adequate time to maintain switching operation, and the converter jumps from $D_{max}$ to a 100% duty factor, as shown by discontinuity 23. Above $D_{max}$, the converter turns on the MOSFET 2 and leaves it on for the entire period T. The abrupt transition 23 causes a glitch in the output voltage. Thus, at a 100% duty factor, $V_{out}=V_{in}$ and all regulation is lost as long as the switching is halted.

A similar effect limits the operation of a synchronous boost converter near the extremes of its range. Synchronous boost converter 10, shown in FIG. 1B includes a low-side power MOSFET 11, a battery-connected inductor 13, an output capacitor 14, and a "floating" synchronous rectifier MOSFET 12 with an intrinsic parallel rectifier diode 16. The gates of the MOSFETs 11 and 12 are driven by break-before-make circuitry (not shown) and controlled by a PWM control circuit (not shown) in response to a voltage $V_{FB}$ that is fed back from the output voltage $V_{OUT}$ across filter capacitor 14. BBM operation is needed to prevent shorting out output capacitor 14.

The synchronous rectifier MOSFET 12 is considered to be floating in the sense that neither its source nor drain terminal is not permanently connected to any supply rail, i.e. ground or $V_{batt}$. Diode 16 is a P-N diode intrinsic to synchronous rectifier MOSFET 12, regardless whether MOSFET 12 is a P-channel or an N-channel device. A Schottky diode may be included in parallel with MOSFET 12 but with series inductance may not operate fast enough to divert current from forward biasing intrinsic diode 16. Diode 17 represents a P-N junction diode intrinsic to N-channel low-side MOSFET 11 and remains reverse-biased under normal boost converter operation.

If we again define the converter's duty factor D as the time that energy flows from the battery or power source into DC/DC converter 10, i.e. during the time that low-side MOSFET switch 11 is on and inductor 13 is being magnetized, then the output to input voltage ratio of a boost converter is proportionate to the inverse of 1 minus its duty factor, i.e.

$$\frac{V_{out}}{V_{in}} = \frac{1}{1-D} \equiv \frac{1}{1-t_{sw}/T}$$

This relationship for a boost or synchronous boost converter is illustrated by curve 22 in graph 20 of FIG. 1C. Notice that the boost converter cannot smoothly reach a unity transfer characteristic without exhibiting some discontinuity at the extreme low end of D. This phenomenon occurs due to switching delays in the power MOSFET switch and its control and gate drive circuitry.

So long as the boost converter's power MOSFET 11 is still switching, $t_{sw}$ is limited to some portion of the clock period T, e.g. 5%<D<95%, essentially due to turn-on and turn-off delay within the MOSFET 11 and its control loop. For example, at a 5% duty factor and a 3 MHz clock, the off time for the low-side MOSFET 11 is only 5% of the 333 nsec period, or just 16 nsec. This means the low side MOSFET 11 must turn on and back off in only 16 nsec—too rapidly to regulate below a 5% output-to-input conversion ratio. This minimum on-time problem impacts either synchronous or non-synchronous boost converters.

Referring again to graph 20, below some minimum duty factor $D_{min}$, there is not adequate time to maintain switching operation and the converter must jump from $D_{min}$ to 0% duty factor as shown by discontinuity 24. Below $D_{min}$, the converter turns on the synchronous rectifier MOSFET 12 and leaves it on for the entire period T. The abrupt transition 24 causes a glitch in the output voltage of boost converter 10. Moreover, at a 100% duty factor, $V_{out}=V_{in}$ and all regulation is lost as long as the switching is halted.

So in both synchronous Buck converter 1 and synchronous boost converter 10, operating near a unity transfer characteristic, i.e. where $V_{out} \approx V_{in}$, is problematic.

Buck-Boost Switching Converter)

The problem of non-isolated DC/DC switching converter operation near a unity transfer ratio is especially difficult in applications when the input voltage may vary above or below the desired output voltage. Examples of this situation include the output of noisy AC adapters or circuitry which must operate by battery back-up during emergency conditions when a main source of power has failed.

FIG. 2 illustrates another scenario where a conversion ratio above and below unity is required. Graph 25 illustrates the discharge characteristic of a Lilon battery under a constant load current, starting at 4.2V at full charge, decaying rapidly during discharge interval 26, then slowly decaying from 3.7V to 3.5V in interval 27, and finally dropping quickly in interval 28 to its cutoff at below 3V.

In the event that a DC/DC converter is needed to produce a well-regulated 3.3V output during the entire duration, a sub-unity conversion ratio of (3.3V/4.2V), i.e. a ratio of 0.79, is needed at the outset, indicating that a Buck converter is required. At the battery's end-of-life, the conversion ratio exceeds unity becoming 3.3V/3V, i.e. a conversion ratio of 1.1, and requires a boost converter to achieve regulation. Such an application demanding both step-up and step-down conversion requires a Buck-boost, or up-down converter.

In the case where the user wants to avoid the complexities of up-down conversion, one possible approach is to use only a Buck converter and give up some battery life by cutting of the battery early, e.g. at 3.3V. This approach, upon first inspection seems reasonable since the majority of a LiIon battery's life is above 3.5V. Closer analysis of graph 25 reveals some complications with such an approach.

Because of the limitations of $D_{max}$, the converter cannot regulate approaching a unity conversion ratio. If the converter cannot properly regulate below a certain dropout voltage δ where $δ=V_{batt}(min)-V_{out}$, then the battery cannot be operated all the way down to 3.3V. If for example the drop out of a Buck converter is 300 mV, a converter must cut off operation at 3.6V to guarantee regulation. At 3.6V in and 3.3V out, the switching regulator must operate at a 92% duty factor. Even operating at a duty factor of 92%, which is not an easy task at high frequencies, the majority of the LiIon battery's energy is wasted by using a Buck-only converter solution.

A Buck-boost converter can easily be derived by combining synchronous Buck and boost converters into a merged or cascade circuit. In the schematic diagram of FIG. 3A, for example, a synchronous boost converter 30 comprising a low-side MOSFET 31, an inductor 33, a synchronous rectifier MOSFET 32, an intrinsic diode 35, and a filter capacitor 34, is used to power a synchronous Buck converter comprising a MOSFET 37, an inductor 39, a synchronous rectifier MOSFET 38, an intrinsic diode 42, and a filter capacitor 40, the combined cascade converter 30 collectively driving a load 41. In this approach the input voltage is first stepped-up to a voltage $V_y$ higher than the desired output, then back down to produce $V_{out}$.

The overall efficiency of this boost-Buck topology is given by the product of the boost converter's efficiency $η_{boost}$ multiplied by the Buck converter's efficiency $η_{Buck}$. Even if both converters are 85% efficient, the combined cascade converter only reaches roughly 70% overall efficiency. Moreover, the converter as shown requires two inductors, a characteristic highly undesirable from a user's point-of-view.

Conversely in FIG. 3B, a synchronous Buck converter comprising a MOSFET 52, an inductor 53, a synchronous rectifier MOSFET 51, an intrinsic diode 55, and a filter capacitor 54, is used to power a synchronous boost converter comprising a low-side MOSFET 58, an inductor 57, a synchronous rectifier MOSFET 59, an intrinsic diode 62, a filter capacitor 60, and a load 61. The cascade Buck-boost converter 50 first steps down and regulates the input voltage $V_y$ lower than the desired output, then steps this voltage up to produce $V_{out}$.

Again, the overall efficiency of the Buck-boost cascade converter 50 is given by the product of the individual efficiencies as given by $η_{cascade}=η_{Buck}·η_{boost}$. The overall loss in a Buck-boost cascade converter is worse than the loss in a synchronous Buck converter or a synchronous boost converter alone, because there are more transistors in series between the input and output terminals, and because all the MOSFETs are switching all the time. Unlike converter 30, which required two inductors, however, converter 50 has two inductors 53 and 57 connected in series. Since series-connected inductors share the same current, they can be replaced by a single inductor, and doing so also eliminates the need for capacitor 54.

The resulting Buck-boost converter 70 is illustrated in FIG. 4, comprising a single inductor 73, four MOSFETs 71, 72, 76, and 77, a filter capacitor 80, a load 81, a PWM control circuit 83 and a break-before-make and gate buffer circuit 82. An intrinsic diode 74 in parallel with MOSFET 71, and an intrinsic diode 78 in parallel with MOSFET 77 act as rectifiers during certain operating conditions such as BBM intervals, while diodes 75 and 79 normally remain reversed biased. Depending on its terminal conditions, converter 70 can operate in three distinct modes, Buck, boost, and Buck-boost.

With MOSFETs numbered i=1 to 4 representing respectively MOSFETs 71, 72, 76 and 77, the overall total power loss is then given by $$P_{total} = \sum_{i=1}^{4} (P_{conduction} + P_{drive})_i$$

The equation illustrates that all four MOSFETs exhibit conduction losses, in proportion to their on-time, and all four MOSFETs also exhibit switching losses, in proportion to their switching frequency.

In FIG. 5A, schematic diagram 85 represents the operation of Buck-boost converter 70 as a Buck converter where MOSFETs 71 and 72 are switched out of phase under PWM control while MOSFET 77 remains turned-on and MOSFET 76 is biased off. The overall loss in converter 70 is greater than the loss in a synchronous Buck converter because it now includes the conduction loss in MOSFET 77, namely $$P_{total} = \sum_{i=1}^{2} (P_{conduction} + P_{drive})_i + (P_{conduction})_4$$

The equivalent circuit 90 of FIG. 5B illustrates MOSFET 72, synchronous rectifier MOSFET 71, parallel rectifier diode 74, inductor 73 and series resistance 91 of fully-enhanced MOSFET 77 shunting diode 78. Off state MOSFET 76 is illustrated as reverse-biased P-N diode 79. The Buck converter mode of Buck boost converter 70 works so long as the criterion $V_{in}>(V_{out}+δ)$ is maintained.

Because of series resistance 91 associated with on MOSFET 77, the efficiency of a Buck-boost converter 70 of FIG. 4 operating in a Buck converter mode is lower than that of the simple Buck converter 1 shown in FIG. 1A. This characteristic can be seen in the efficiency graph of FIG. 7, where the Buck-only efficiency (curve 110) is higher, typically 5% to 15% percent higher, than that of the Buck-mode efficiency (curve 107) of a Buck-boost converter.

In FIG. 6A, schematic diagram 95 represents the operation of Buck-boost converter 70 as a boost converter where MOSFETs 76 and 77 are switched out of phase under PWM control while MOSFET 72 remains turned-on and MOSFET 71 is biased off. The converter's overall loss is greater than the loss of a synchronous boost converter because it now includes the conduction loss of MOSFET 72, namely $$P_{total} = \sum_{i=3}^{4} (P_{conduction} + P_{drive})_i + (P_{conduction})_1$$

The equivalent circuit 100 of FIG. 6B illustrates switch MOSFET 76, synchronous rectifier MOSFET 77, parallel rectifier diode 78, inductor 73 and series resistance 101 of fully-enhanced MOSFET 72. Diodes 74, 75 and 79 remain reverse-biased and off. The boost converter mode of Buck-boost converter 70 works so long that the criterion $V_{in} < (V_{out} - \delta)$ is maintained.

Because of series resistance 101 associated with on MOSFET 72, the efficiency of a Buck-boost converter 70 of FIG. 4 operating in boost converter mode 95 is lower than that of the simple boost converter 10 shown in FIG. 1B. This characteristic can be seen in the efficiency graph of FIG. 7, where the boost-only efficiency (curve 111) is higher, typically 5% to 15% percent higher, than the boost-mode efficiency (curve 108) of a Buck-boost converter.

Notice also that boost mode operation efficiency (curve 108) is lower than Buck-mode operation, primarily because boost converters require higher average switch currents than Buck converters, increasing conduction losses. The higher conduction losses in boost converter MOSFETs can be compensated by employing larger lower-resistance power MOSFETs, but only by increasing the input capacitance, gate charge, and gate drive related switching losses, canceling most of the benefit of the lower conduction loss device. The problem is further exacerbated in a Buck-boost converter operating in boost mode, since more series resistance is present at all times due to the resistance 101 related to MOSFET 72.

In between the Buck-only and the boost-only modes, when the converter approaches a unity conversation ratio, the circuit must operate in true Buck-boost mode where all four transistors are switching. That range occurs where the converter exceeds the maximum duty factor $D_{max}$ for a Buck converter or falls below the minimum duty factor Dmin, for a boost.

Table 1 summarizes the operation of Buck-boost converter 70 in the Buck, boost and Buck-boost modes:

TABLE 1

| Mode | Criteria | Switching | Full On | Off |
|---|---|---|---|---|
| Buck | $V_{in} > (V_{out} + \delta)$ | M1, M2 | M4 | M3 |
| Buck-Boost | $(V_{out} + \delta) > V_{in} > (V_{out} - \delta)$ | M1, M2, M3, M4 | none | none |
| Boost | $V_{in} < (V_{out} - \delta)$ | M3, M4 | M2 | M1 |

The switching converter's Buck-boost mode therefore occurs whenever $$\frac{V_{out}}{V_{in}} < (1 \pm \delta)$$

Since all four transistors are switching in the Buck-boost mode, the losses are greater than in the Buck-only or boost-only mode. This characteristic is illustrated in FIG. 774, where the efficiency of converter 70 in the Buck-boost mode (curve 106) is lower than the efficiency of Buck-boost converter 70 operating in Buck-only mode (curve 107) and boost-only mode (curve 108), resulting a rapid drop in efficiency whenever four-switch Buck-boost operation commences. As shown, converter 70 operates only in Buck-boost mode when it has to do so, i.e. for $V_{out}/V_{in}$ conversion ratios near unity, and by example between 0.9 and 1.1.

In the event that converter 70 must operate constantly in four-switch Buck-boost mode, the efficiency follows curve 112A when stepping down, which is considerably lower than the efficiency in the Buck-only mode (curve 107) and far below the efficiency of a simple synchronous Buck converter (curve 110). Similarly, four-switch Buck-boost operation in the step-up mode follows curve 112B with efficiencies considerably lower than the efficiency in boost-only mode (curve 108) and far below the efficiency of a simple synchronous boost converter (curve 111). So while mode switching of a Buck-boost converter limits the loss four-switch Buck-boost operation to near unity voltage conversion ratios, the Buck-boost converter is categorically less efficient that a Buck converter or a boost converter alone.

Since producing a regulated 3.3V output from a LiIon battery falls close to this $\pm\delta$ range surrounding a unity voltage conversion ratio, the greatest portion of the LiIon battery's stored energy occurs at a voltage where the Buck-boost converter's efficiency is poorest, in the range of 3.5V to 3.6V. Moreover, the fact that the converter must go through a mode transition whenever the conversion ratio is near unity can be a real problem in a number of applications, affecting transient regulation, stability and noise.

Clearly, the Buck-boost switching regulator has many disadvantages, and especially so when operating at or near unity conversion ratios.

Charge Pump Converters

An alternative to the switched-inductor converter is a charge pump, a voltage conversion circuit using only switches and capacitors to perform voltage translation through repeated charge redistribution, i.e. the continuous charging and discharging of a capacitor network driven by a clock or oscillator.

The advantage of a charge pump is that at specific voltage conversion ratios, it can exhibit extremely high conversion efficiencies approaching 100%. The disadvantage is that it can only efficiently generate voltages that are exact integral multiples of the number of flying capacitors used in its converter circuit. Voltages other than select multiples exhibit low efficiencies.

A common charge pump 150 is illustrated in FIG. 8A, where a single capacitor is employed as a "doubler", i.e. to double the battery's input voltage. Charge pump 150 comprises four MOSFETs, 152, 153, 154 and 155 configured similar to an H-bridge except that one terminal, the source of MOSFET 154 is connected to the charge pump output $V_{CP}$ and reservoir capacitor 166 rather than to ground.

Charge pump operation can be understood by modeling the MOSFETs as ideal switches where in the equivalent circuits 160 and 180 of FIGS. 8B and 8C, MOSFETs 152, 153, 154 and 155 are represented as switches 162, 163, 164 and 165 respectively. During the charging phase, shown in FIG. 8B, diagonal switches 162 and 165 are closed, driving node $V_x$ to ground and node $V_y$ to $V_{batt}$ and charging a flying capacitor 151 to the voltage $V_{batt}$. During the charging cycle, switches 163 and 164 remain open.

In the charge transfer and discharge phase, shown in FIG. 8C, switches 162 and 165 are opened, switches 163 and 164 are closed, and energy is transferred from the flying capacitor 151 to the output reservoir capacitor 166, pumping the $V_{CP}$ voltage to a value twice the battery voltage or $2 \cdot V_{batt}$.

The purpose of the switch network is essentially to place flying capacitor 151 in parallel with the battery during charging and in series, i.e. stacked on top of the battery's positive terminal, during discharging. The cycle then repeats with another charging phase.

A single flying capacitor charge pump is capable of efficiently delivering power only at twice its input, or alternatively if the capacitor is connected to the negative terminal of the battery to produce a mirror-image negative voltage of the battery, i.e. $-V_{batt}$, also known as an inverter.

FIG. 9A illustrates a charge pump 170 utilizing two flying capacitors 173 and 177 and a network of seven MOSFETs 171, 172, 174, 175, 176, 178 and 179. The purpose of the network is to charge the capacitors in series, charge them each to half the battery voltage, i.e. $V_{batt}/2$. After charging, the two charged capacitors are connected in parallel, and connected to the positive terminal of the battery. The resulting output is then $V_{batt}+V_{batt}/2$ for an output voltage of $1.5V_{batt}$. Because the output is 1.5 times its input this charge pump is sometimes referred to as a "fractional" charge pump.

Schematic diagram 183 and 185 in FIGS. 9B and 9C represent the simple switch equivalent model for operating a fractional charge pump where switches 181, 182, 184, 185, 186, 188 and 189 represent MOSFETs 171, 172, 174, 175, 176, 178 and 179, respectively. In the charging cycle, shown in FIG. 9B, switch 181 is closed grounding $V_x$, switch 189 is closed driving the voltage $V_z$ to the input voltage $V_{batt}$, and switch 185 is closed, i.e. $V_y=V_w$, thereby placing capacitors 173 and 177 in series. If the capacitors have the same value they will each charge to a voltage $V_{batt}/2$. All the other switches remain open in the charging phase.

In the discharge phase, shown in FIG. 9C, all of the switches are opened, and high-side switches 182 and 186 are closed connecting the $V_x$ and $V_w$, the negative terminals of the flying capacitors, to $V_{batt}$. At the same time, switches 184 and 188 are closed connecting $V_y$ and $V_w$, the positive terminals of the capacitors to the output $V_{CP}$ and reservoir capacitor 180. The cycle then repeats constantly either at a fixed or varying frequency.

FIGS. 10A-10D illustrate several charge pump voltage converters possible with switched-capacitor networks, represented during their discharge cycle. In FIG. 10A, a charge pump doubler 200 combines a battery input voltage source 201 with a single flying capacitor 202 stacked atop it, to produce a voltage twice the battery input, i.e. $2 \cdot V_{batt}$. In FIG. 10B, an inverter 205 stacks a single flying capacitor 206 beneath voltage input 207 to produce a below ground output voltage of $-V_{batt}$, essentially a negative mirror image of the input voltage.

In FIG. 10C, a fractional charge pump 210 charges capacitors 212 and 213 to $V_{batt}/2$ then stacks them atop $V_{batt}$ voltage source 211 to produce an output 1.5 times its input. Alternatively, in FIG. 10D, capacitors 217 and 218 charged to $V_{batt}/2$, are connected to ground, the same negative terminal of voltage source 216, producing an output voltage of one-half the battery voltage, i.e. $+0.5V_{batt}$. A voltage $-0.5V_{batt}$ is also possible by referencing the flying capacitors below ground, i.e. with their positive terminal tied to ground.

As shown, charge pumps with two flying capacitors can produce various integral multiples "n" of one-half their input voltage, or as $$V_{CP} = n \cdot \left(\frac{V_{batt}}{2}\right) \text{ where } n = \{-2, -1, 0, +1, +2, +3, +4\}$$

Specifically, when n=+2, the output $V_{CP}$ is equal to the battery voltage $V_{batt}$, behaving identical to a direct battery connection. Operating a two-capacitor fractional charge pump in a single-capacitor converter mode, n=+4 behaves as a doubler where $V_{CP}=2 \cdot V_{batt}$, and n=-2 behaves as an inverter, where $V_{CP}=-V_{batt}$. Operating in two-capacitor fractional mode, n=-1 produces $V_{CP}=-\frac{1}{2}V_{batt}$, n=+1 produces $V_{CP}=+\frac{1}{2}V_{batt}$, and n=+3 produces $V_{CP}=+1.5 \cdot V_{batt}$. When n=0 the converter is off and $V_{CP}=0$, i.e. grounded or alternatively floating. A fractional charge pump can actually switch among these various inverting, fractional and doubler modes automatically as needed.

A problem with charge pump converters is they operate efficiently only at integral multiples of the number of flying capacitors; in other words, they are not voltage regulators. Specifically, as a desired load voltage $V_{out}$ drops below the voltage $V_{CP}$ that the capacitor network produces, the converter cannot adapt. The voltage-differential between the charge pump's output voltage $V_{CP}$ and the regulated output voltage of the converter $V_{out}$ requires a resistor or current source to support the voltage mismatch, and the voltage across that lossy element results in lost power and reduced efficiency. The efficiency equation of the charge pump supplying an output voltage $V_{out}$ can be expressed by adapting the mathematical form for linear regulator efficiency, herein as $$\eta_{CP} = \frac{V_{out}}{V_{CP}} = \frac{V_{out}}{n \cdot \left(\frac{V_{batt}}{2}\right)}$$

where n={-2, -1, 0, +1, +2, +3, +4} and where $V_{out} \leq V_{CP}$.

This efficiency equation for single-mode champ pumps is illustrated graphically in FIG. 11A where $V_{batt}=V_{in}$ for various integral multipliers, including a doubler (curve 221), an inverter (curve 222), and fractional charge pumps (curves 223, 224 and 225). Curve 226 represents a direct battery connection, identical to a linear regulator's maximum theoretical efficiency, i.e. assuming no quiescent operating current. In each case, as the input to output ratio approaches an integral multiple of $\pm\frac{1}{2}V_{batt}$, the efficiency increases. The charge pump is not capable of delivering a voltage higher than that voltage, and a different capacitor multiplier, i.e. a different operating mode must be employed.

Each curve shown in FIG. 11A represents a specific charge pump circuit, e.g. including those shown previously in FIGS. 8, 9 and 10. Unless a load operates at an exact half-volt integral multiple of the input voltage, however, the efficiency of the charge pump converter will suffer. This behavior is especially problematic for battery powered products where the battery voltage changes markedly as the cell discharges. In the case of LiIon batteries, the voltage can decay more than 1V during discharge, representing a 25% change. Even if the peak efficiency may be high at one specific operating condition and battery voltage, the overall efficiency of the converter averaged over the battery discharge curve is poor. Weighted average efficiencies can be lower than 60% using a single-mode charge pump.

One way to improve the average efficiency of the converter is to switch modes between 1×, 1.5× and 2× automatically within one circuit. This feature is particularly useful to supply a fixed voltage over a wide input range. An example of the efficiency of a mode changing charge pump is illustrated in FIG. 11B, which shows the efficiency as a tri-mode converter circuit switches from 1×-battery-direct mode (curve 247), to 1.5×-fractional-mode (curve 244), and again to a 2×-doubler-mode (curve 241) as the battery decays. By switching modes in this zigzag pattern, the efficiency of the charge pump converter is improved because the output is not pumped to an excessively high value compared to the load, and the overall efficiency improves.

Unfortunately, conditions still exist where the efficiency suffers substantially. The mode transitions exhibit dramatic shifts in efficiency (curve 246) at a conversion ratio of one, and again (curve 243) at a 1.5× conversation ratio. The mode transitions may also result in sudden current and voltage discontinuities, or produce instability or noise. To determine what conversion ratio is required the graph of FIG. 11B also includes curves 248, 249, and 250 relating the required input voltage range and conversion ratios to produce output voltages of 3V, 3.5V and 4V, respectively.

Specifically, the charge pump converter in 1.5× mode does not perform well for conditions slightly above a unity conversion ratio, unfortunately manifesting even lower efficiencies than an inductive Buck-boost converter.

Efficiency of Regulated Charge Pumps

The real issue of charge pump as a power supply is that the charge pump converter is not by itself a voltage regulator since it produces only certain fixed voltage multiples. To regulate its output voltage or output current, the charge pump must produce a voltage greater than the desired output and some pass element must be inserted in series between the load and the output of the charge pump converter. The voltage differential between the charge pump's higher output voltage and a specific desired output voltage must then be supported across this series element. Examples of prior art series-pass elements include linear regulators, current sources, or resistors, all of which are lossy, i.e. dissipate power as heat and reduce the charge pump regulator's overall efficiency. Losses are given by the voltage differential present across the series pass element and the current flowing through such an element.

For example, in schematic diagram 260 of FIG. 12A, a charge pump 262 with capacitors 263 and 264 is powered by a battery or other voltage source 261 to produce a voltage $V_{CP}$ across a reservoir capacitor 265. Since this voltage is higher than a desired output voltage $V_{out}$ needed to power load 267, a low dropout (LDO) linear regulator 266 must support the difference $\Delta V_{LDO}$ while conducting current, thereby dissipating heat and reducing efficiency. Even if the quiescent currents $I_{QCP}$ and $I_{QLDO}$ flowing to ground in charge pump 262 and LDO regulator 266 are zero, the efficiency is still limited to a maximum value of $V_{out}/V_{CP}$, the output to input ratio of the LDO pass element. The greater the voltage differential between the charge pump's output $V_{CP}$ and the desired regulated load voltage $V_{out}$ (i.e. the greater the $\Delta V$ across the LDO regulator), the worse the converter's efficiency becomes.

The efficiency problem is not avoided by placing the LDO regulator 282 in front of charge pump 284 as a pre-regulator, as shown in FIG. 12B, since the output voltage $V_{LDO}$ of LDO regulator 282 is necessarily some integral multiple of the charge pump's output voltage $V_{CP}$, and this voltage differs from $V_{in}$ by an amount $\Delta V_{LDO}$—a voltage supported across LDO regulator 282 while it is conducting current. The effect is the same as the prior example with LDO post regulation— the series pass element LDO regulator 282 must support a voltage differential across its terminals while conducting current. Even if the quiescent currents $I_{QCP}$ and $I_{QLDO}$ flowing to ground in charge pump 284 and LDO regulator 282 are zero, the efficiency is still limited to a maximum value of $V_{LDO}/V_{in}$, the output-to-input ratio of the LDO pass element.

Using a current source instead of an LDO regulator does not improve the efficiency of the circuit. As illustrated in circuit 300 of FIG. 12C, inserting a current source 306 between a load 308 and the output terminal of a charge pump 302 still forces the pass element to support a voltage differential $\Delta V$ while it conducts current. This difference between the output of charge pump 302 ($V_{CP}$) and the voltage across filter capacitor 307 ($V_{out}$) must be supported by the conducting current source, and therefore contributes to efficiency loss and wasted power. Even with a 100%-efficient charge pump, the overall converter efficiency is limited to a maximum value of $V_{out}/V_{CP}$, the output-to-input ratio across the series pass element, in this case, current source 306.

Incorporating the current source or regulating function into one of the charge pump switches has the same impact on overall regulator efficiency as using a separate regulating element. As shown in schematic diagram 320 of FIG. 12D, a current source 326 represents one switch of a charge pump doubler comprising MOSFETs 322, 323 and 324 and a capacitor 325. A selector switch 327 biases current source 326 as either an "on" current source or an "off" switch, depending on the mode, so that it behaves as a switched current source conducting a fixed current or no current at all. When the current through current source 326 is zero, no power is dissipated in the switched current source 326. When it current source 326 is on and acting as a current source, however, current source 326 must still must dissipate power. Specifically, during conduction, this controlled current source 326 must support a differential voltage $V_y$-$V_{out}$ across its terminals. As a consequence, it still dissipates power and degrades efficiency.

Eliminating the series pass device in a charge pump regulator does not improve efficiency. As shown in FIG. 12E, even if no device is intentionally included to support the mismatch between the output voltage $V_{out}$ and the charge pump's output $V_{CP}$, a distributed parasitic resistance 346 present in the circuit will necessarily support the $\Delta V$ between the load 347 and charge pump 342, and power is lost in this resistance in the form of heat as if a series pass device were intentionally inserted.

Even in the event that somehow the circuit's series resistance was somehow made zero, the voltage differential would appear across one of the MOSFET switches, forcing the device to saturate, and drop the full voltage differential across its terminals while conducting current. In such a case power is still lost, in an amount equal to the differential voltage times the load current, no matter how the differential voltage is distributed throughout the circuit.

So any voltage differential $\Delta V$ between a charge pump's output voltage $V_{CP}$ and a regulated load voltage $V_{out}$ results in loss of efficiency. Only by reducing the voltage differential $\Delta V$ across a series pass element, i.e. supplying a regulated voltage very close to the charge pump's output voltage—can efficiency be improved. Dynamically changing among single, fractional and doubler modes helps reduce this differential to certain multiples given by $\{V_{out}-V_{CP}\}=\{V_{out}-n \cdot V_{in}\}$ where n can change among 1×, 1.5× or 2× modes.

Operating a charge pump near unity voltage conversion ratios where $V_{out} \approx V_{in}$ and $\Delta V$ across a series pass element is small, the efficiency of regulated charge pumps is greatly improved. Unfortunately for small $\Delta V$, another phenomenon referred to as "dropout" can degrade the accuracy and quality of voltage regulation. The problem of dropout also plagues prior art switching regulators.

Dropout in Prior Art Regulators

Whenever the input and the output voltages of a voltage regulator approach one another within the range of several hundred millivolts, i.e. $V_{out} \approx V_{in} \pm 200$ mV, the quality of the converter's regulating ability suffers. Loss of regulation quality may be manifest in several ways, either by a one-time or repeated glitch or discontinuity in output voltage, by increased ripple, or by complete loss of regulation within some narrow voltage band. The phenomenon of degraded regulation whenever $V_{out}$ approaches $V_{in}$ is referred to as "dropout", meaning the converter drops out of regulation.

The Buck converter of FIG. 1A and the boost converter of FIG. 1B both momentarily lose regulation as their switching duty factor jumps from $D_{max}$ or $D_{min}$ to 100% and they completely lose regulation while D=100%, since the input terminal is essentially resistively connected to the output terminal during the dropout condition.

While the Buck-boost converter doesn't really exhibit permanent dropout, it can easily suffer a voltage glitch during mode transitions whenever the converter switches from its Buck mode into its Buck-boost mode, or from its Buck-boost mode to its boost mode. Mode transitions occur whenever the converter changes from a circuit where two power devices are switching into one where four devices are switching, or vice versa.

To avoid the mode switching transition problem, a Buck boost converter can be run continuously in Buck-boost mode with all four power devices switching continuously, but then the efficiency is degraded under all input-output conditions and conversion ratios.

As stated previously, a charge pump is incapable of regulating voltage without the use of a series-connected linear regulator or a current source such as shown in FIGS. 12A through 12D to provide the regulation function. To maintain a high efficiency, however, a regulated charge pump cannot impose too much voltage across its series regulator, and must therefore change modes during varying input-output conditions as shown in FIG. 11B. As the voltage conversion ratio approaches unity, the most efficient operating mode is the 1× mode shown by curve 247 in FIG. 11B. Under the 1× mode the charge pump is not switching and a series connected linear regulator or current source must provide regulation.

Unfortunately, it is well known phenomenon that all linear regulators exhibit loss of regulation, i.e. dropout, whenever ΔV across the linear regulator's input and output terminals becomes too small. In essence, dropout occurs in a linear regulator because the loop gain of the amplifier performing regulation drops precipitously as its transistor pass element changes from acting as a current source to acting as a variable resistor. If the pass element is a bipolar transistor, the loss of gain occurs at small values of $V_{CE}$ as the device transitions from its active operating region into saturation. In many bipolar linear regulators, this dropout condition occurs at more than 400 mV.

In low-dropout linear regulators, a MOSFET capable of operating as a current source at a lower ΔV is substituted for the bipolar pass element, but the linear regulator still drops out at 200 to 300 mV as the power MOSFET pass element transitions from its saturation, i.e. constant current, region into its linear, i.e. resistive, region of operation.

In conclusion, prior-art non-isolated high-efficiency converters exhibit dropout at voltage conversion ratios approaching unity. Mode switching, loss of regulation and dropout can be avoided, but only by sacrificing efficiency. Isolated converters such as the flyback and forward converter are able to operate at high efficiencies near unity conversion without the need switching modes, but their use of physically-large tapped inductors, coupled inductors, and transformers precludes their application in most portable products.

Summary of Prior-Art Down-Up Converters

In conclusion, existing charge pump converters, Buck-boost switching regulators and other inductive switching regulators are not able to both step-up and step-down DC voltages efficiently, especially for conversion ratios near unity where $V_{in} \approx V_{out}$. What is needed is an up-down converter that is efficient over a wide range of input and output voltages, and that does not need to change its operating mode as it approaches or operates near unity voltage conversion ratios, i.e. when $V_{out} \approx V_{in}$. Furthermore, the converter should be free from dropout problems, maintaining high quality regulation even while biased with an output voltage within a 200 mV of its input, i.e. within the range $V_{out} \approx V_{in} \pm 200$ mV.

SUMMARY OF THE INVENTION

In accordance with this invention, a DC/DC converter comprises a step-down, switched-inductor pre-regulator and a switched-capacitor post-converter. The output terminal of the step-down, switched-inductor pre-regulator is connected to the input terminal of the switched-capacitor post-converter. The switched-capacitor post-converter may comprise a charge pump that multiplies the voltage at its input terminal by an integral or fractional value, or it may be an inverter that multiplies the voltage at its input terminal by a negative integral or fractional value. The step-down, switched-inductor pre-regulator may comprise a Buck converter having a high-side switch connected in a series path with a low-side switch and an inductor connected to a point in the series path between the high-side switch and the low-side switch. In some embodiments, each of the high-side and low-side switches comprises a MOSFET.

The pre-regulator steps the input voltage down, and the post-converter either steps the voltage produced by the pre-regulator up or down by an integral or fractional value or multiplies the voltage produced by the pre-regulator by a negative integral or fractional value. Preferably the output voltage of the DC/DC converter is controlled by a feedback path that may extend from the output terminal of the pre-regulator or the post-converter to a pulse width modulation unit that controls the duty factor of the pre-regulator. In some embodiments, the feedback path includes a level shift unit or other circuitry that modifies the feedback signal.

The DC/DC converter of this invention is capable of operating over a wide range of voltage conversion ratios, ranging from step-up to step-down conversion without the need for mode switching. Free from mode switching and dropout problems when $V_{out} \approx V_{in}$, the converter does not suffer from noise glitches, poor regulation, and instability, even near unity input-to-output voltage conversion ratios. While the converter includes switched-inductor operation, it avoids the minimum pulse width problem plaguing conventional switching regulators at very high and very low duty factors, including regulator dropout, narrow pulses and associated high-current spikes, variable frequency operation, inadequate time to perform break-before-make transitions.

Another aspect of this invention comprises a method of converting a first DC voltage to a second DC voltage. The method comprises: providing at least one inductor and at least one capacitor; during a first time interval coupling a first terminal of the at least one inductor to the first DC voltage; during a second time interval coupling the first terminal of the at least one inductor to a second voltage, thereby producing an intermediate voltage at a second terminal of the at least one inductor; during a third time interval coupling a first terminal of the at least one capacitor to the intermediate voltage and coupling a second terminal of the at least one capacitor to a third voltage; and during a fourth time interval coupling the second terminal of the at least one capacitor to the intermediate voltage and coupling the first terminal of the at least one capacitor to an output terminal, thereby providing the second DC voltage at the output terminal. Variations of the method comprise, during the fourth time interval, coupling the second terminal of the at least one capacitor to a fourth voltage and coupling the first terminal of the at least one capacitor to an output terminal or coupling the first terminal of the at least one capacitor to ground and coupling the second terminal of the at least one capacitor to an output terminal.

BRIEF DESCRIPTION OF THE DRAWINGS

This invention will be better understood by reference to the following drawings, in which like components are identified by similar reference numbers.

FIG. 10A is an equivalent circuit showing a +2×-mode single-capacitor doubler during its discharge cycle.

FIG. 10B is an equivalent circuit showing a −X-mode single-capacitor inverter during its discharge cycle.

FIG. 10C is an equivalent circuit showing a +1.5×-mode dual-capacitor fractional charge pump during its discharge cycle.

FIG. 10D is an equivalent circuit showing a +0.5×-mode dual-capacitor fractional charge pump during its discharge cycle.

FIG. 27B is a circuit diagram of the ×1× type LCDI inverter during the magnetizing-charging stage.

FIG. 27C is a circuit diagram of the −1× type LCDI inverter during the recirculating-transferring stage.

FIG. 28B is a circuit diagram of the fractional −0.5×LCDI regulating inverter during the magnetizing-charging stage.

FIG. 28C is a circuit diagram of the fractional −0.5×LCDI regulating inverter during the recirculating-transferring stage.

DESCRIPTION OF THE INVENTION

Figure 1A:
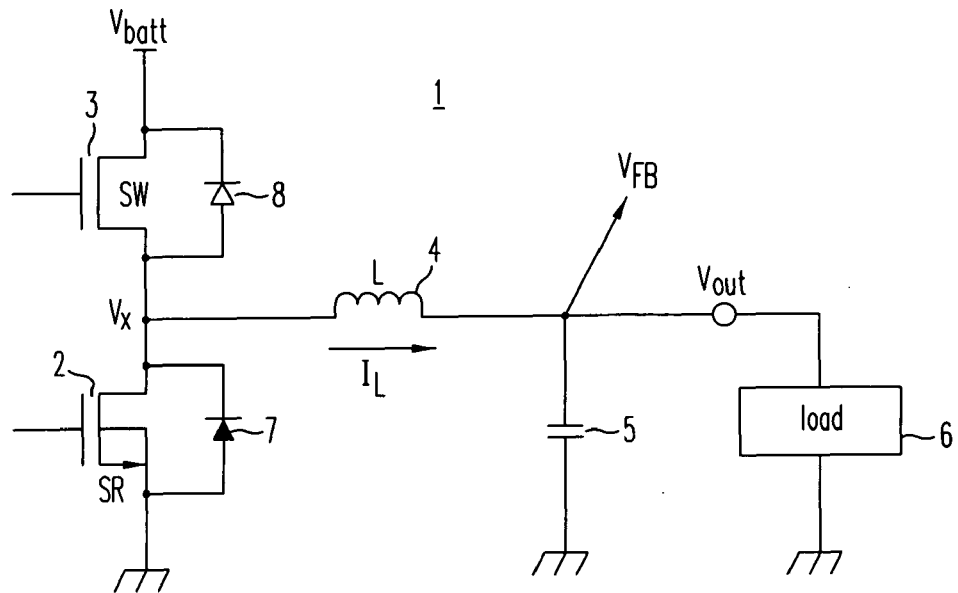
FIG. 1A is a schematic circuit diagram of a prior-art non-isolated DC/DC synchronous Buck converter.
Figure 1B:
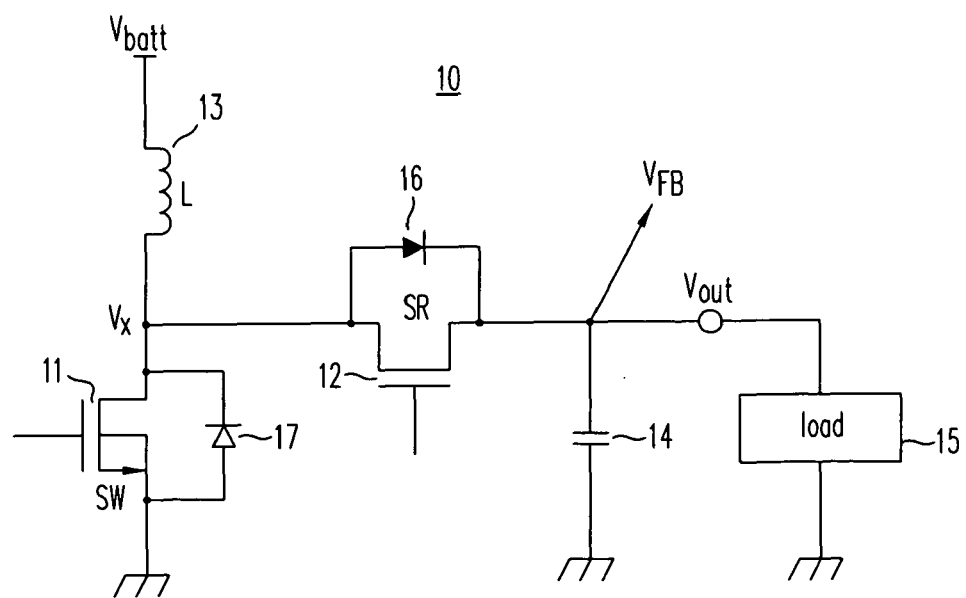
FIG. 1B is a schematic circuit diagram of a prior-art synchronous boost converter.
Figure 1C:
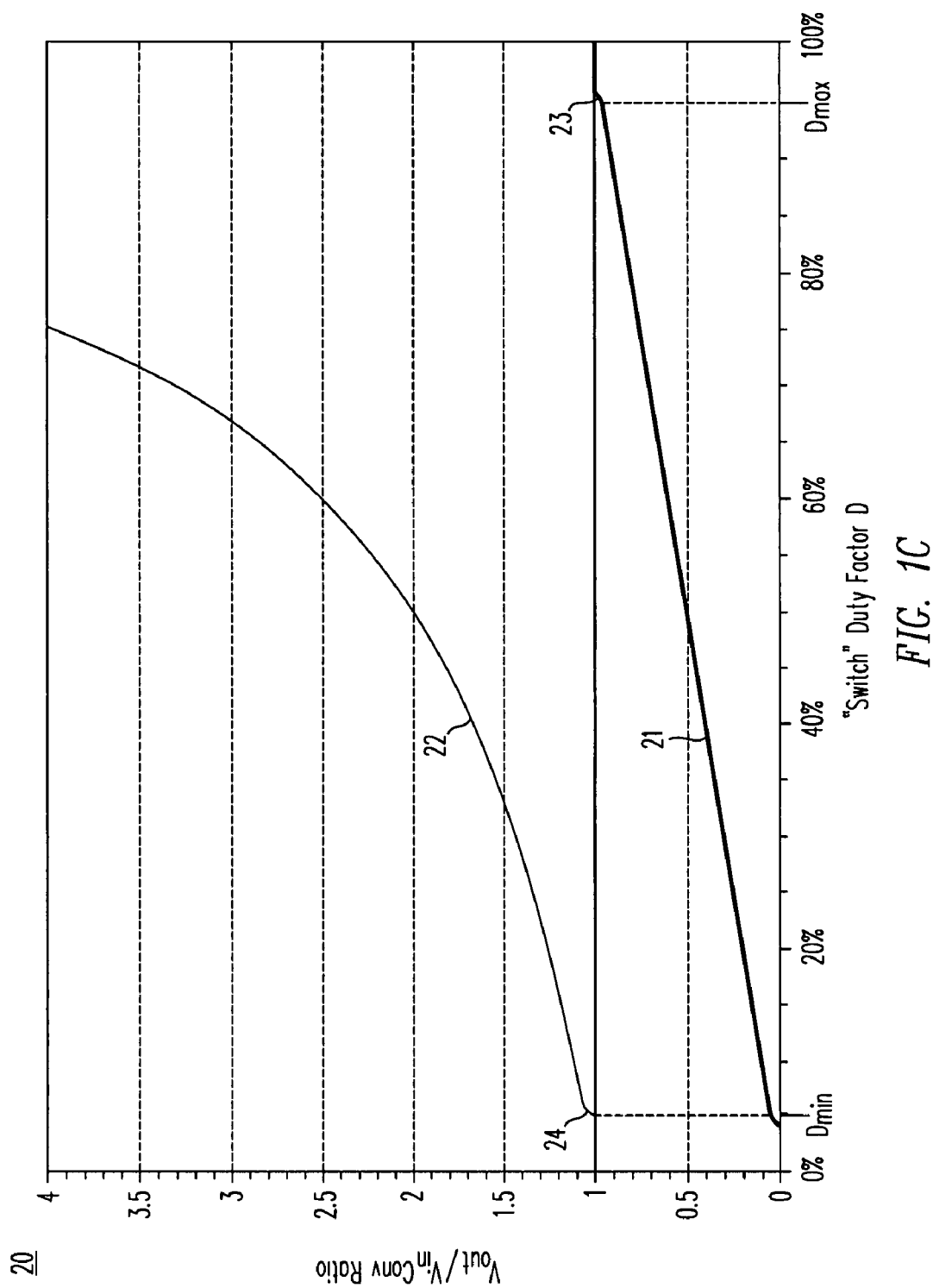
FIG. 1C is a graph showing the duty factor dependence of conversion ratio as a function of the duty factor for the devices shown in FIGS. 1A and 1B.
Figure 2:
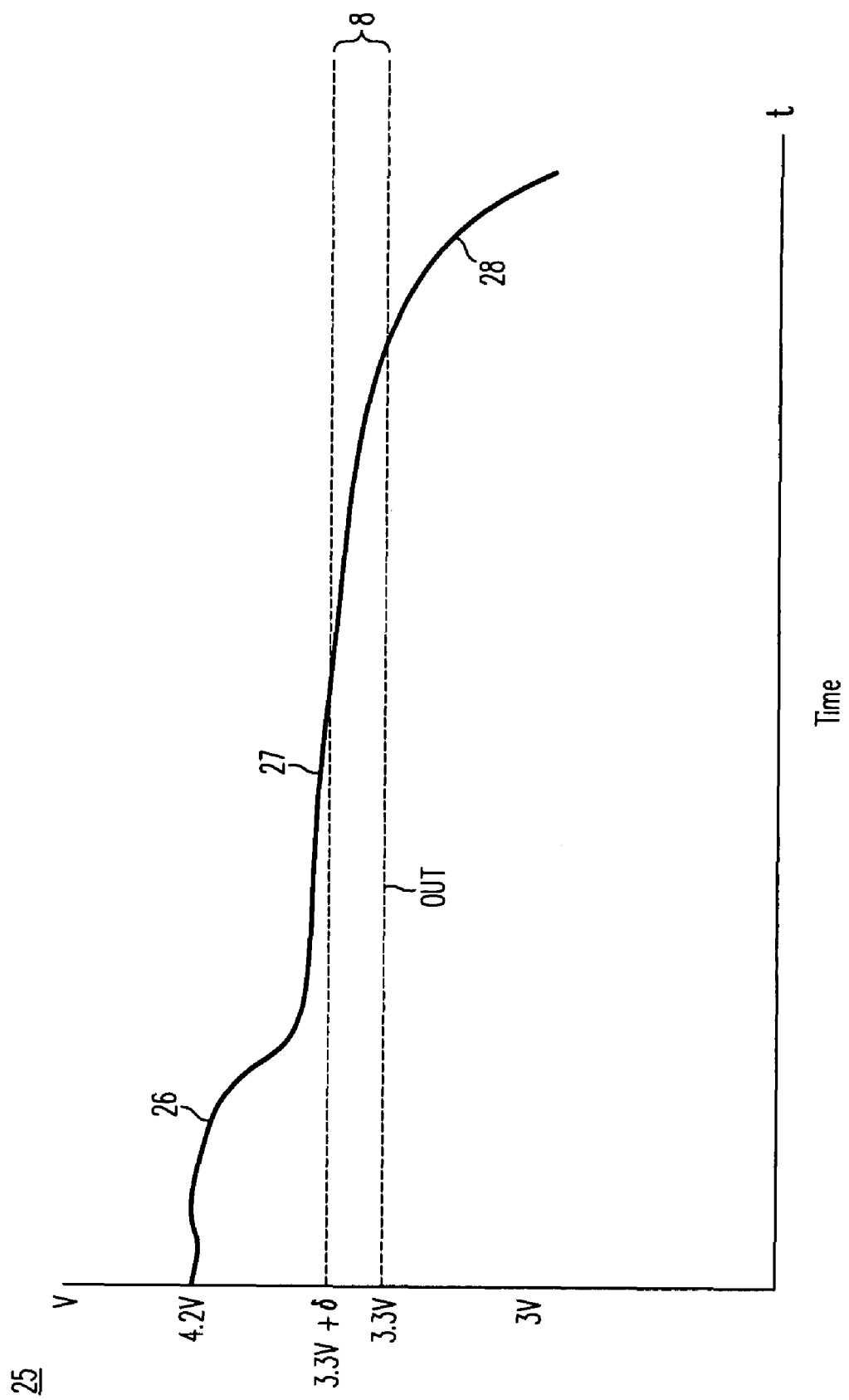
FIG. 2 is a graph showing the discharge characteristics of single-cell LiIon battery.
Figure 3A:
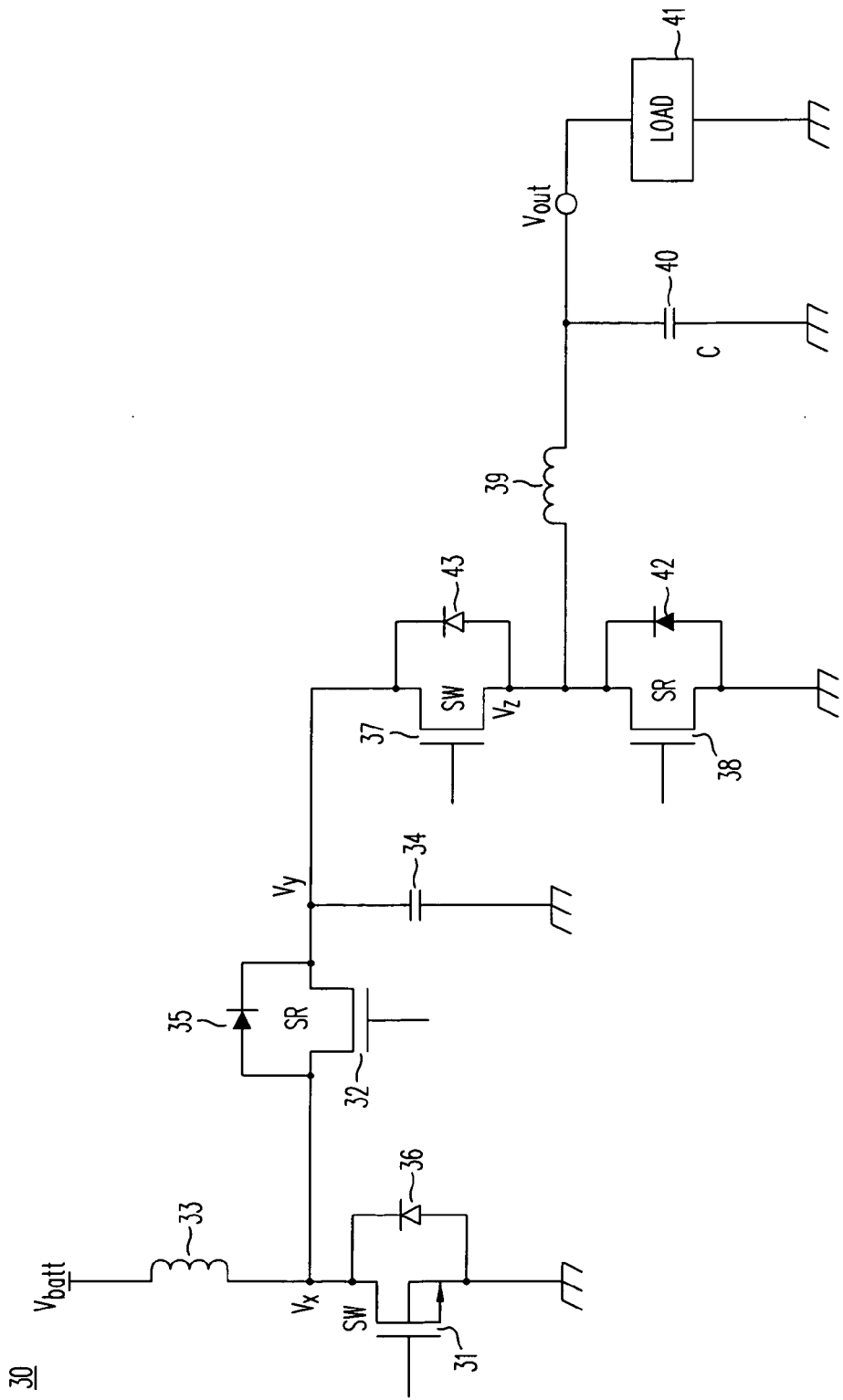
FIG. 3A is a circuit diagram of a prior art cascaded boost-Buck converter.
Figure 3B:
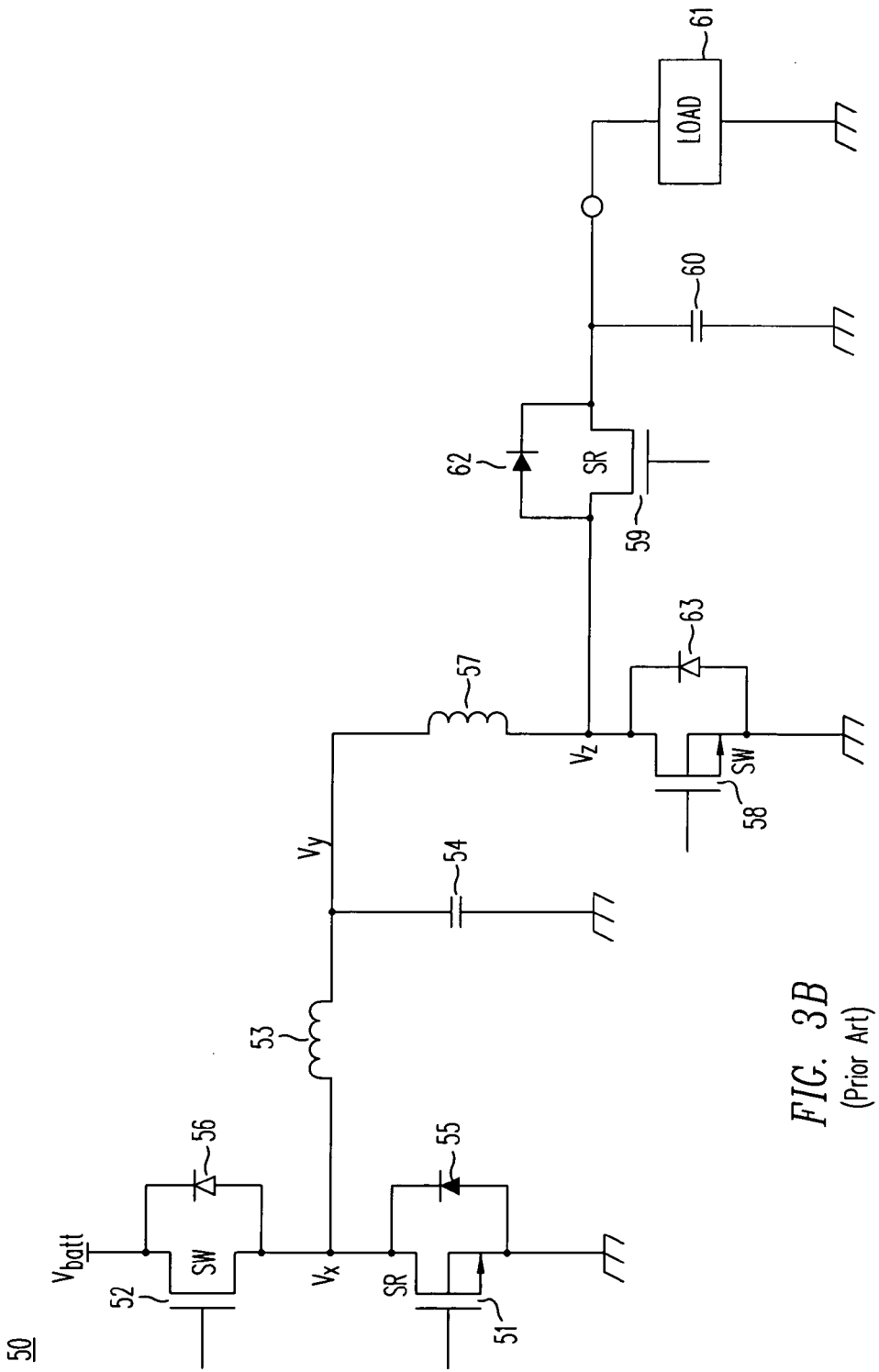
FIG. 3B is a circuit diagram of a prior art cascaded Buck-boost converter.
Figure 4:
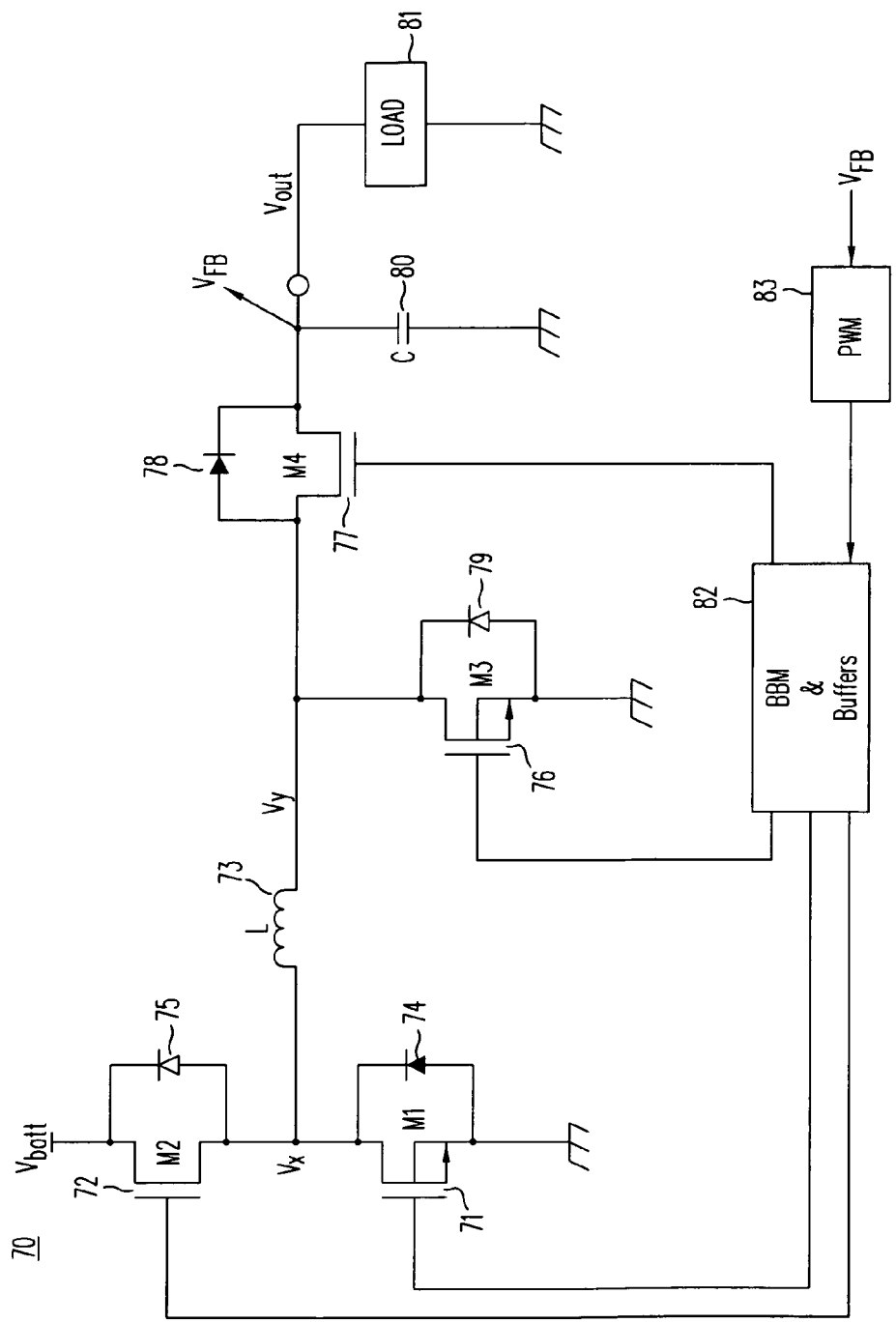
FIG. 4 is a circuit diagram of a prior art Buck-boost converter.
Figure 5A:
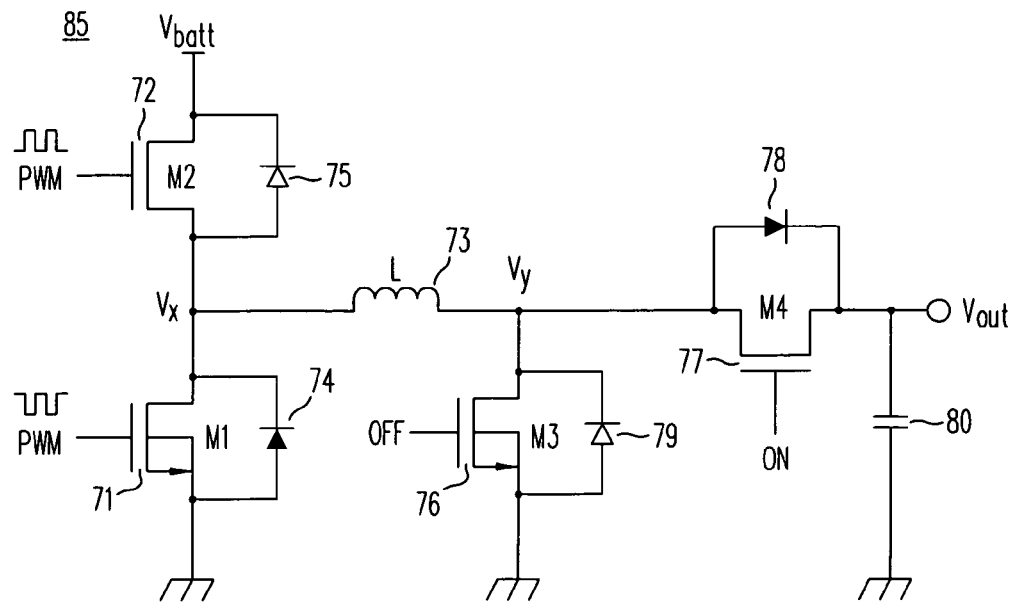
FIG. 5A is a circuit diagram illustrating bias conditions in the Buck mode operation of Buck-boost converter.
Figure 5B:
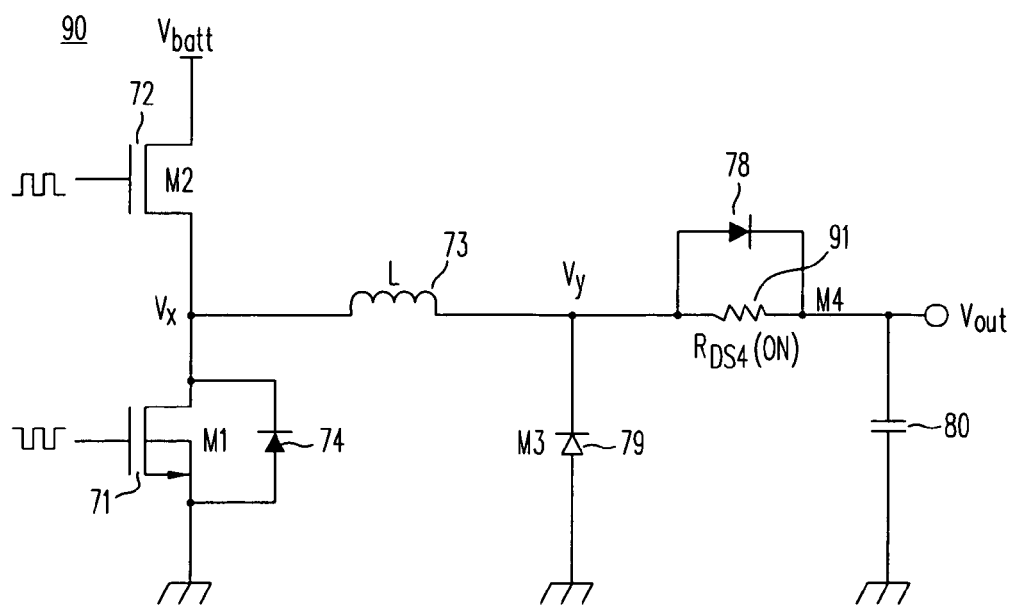
FIG. 5B is an equivalent circuit of the circuit shown in FIG. 5A.
Figure 6A:
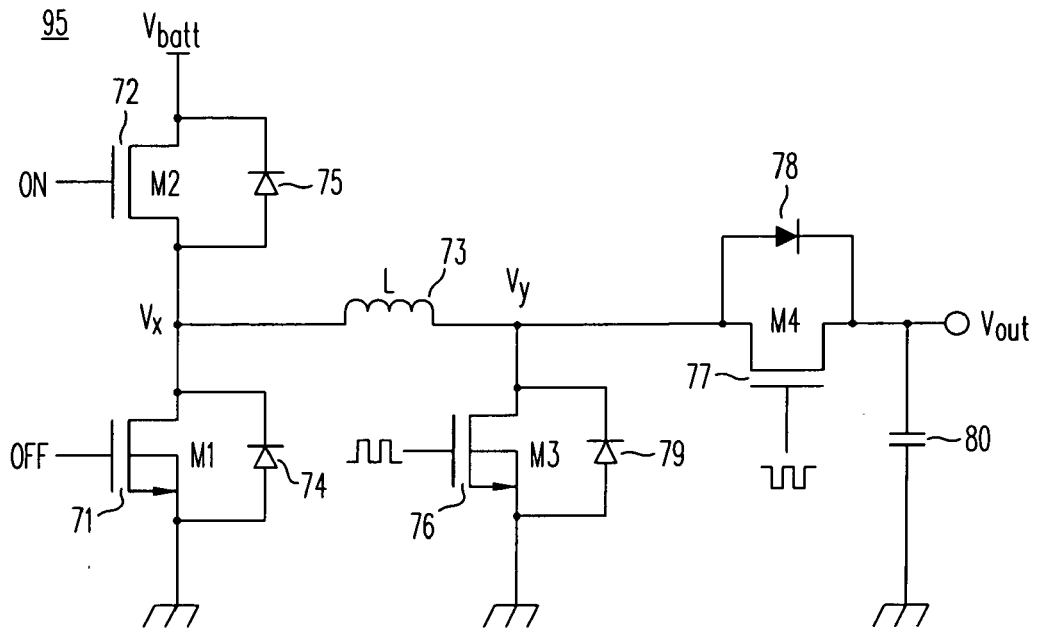
FIG. 6A is a circuit diagram illustrating bias conditions in the boost mode operation of Buck-boost converter.
Figure 6B:
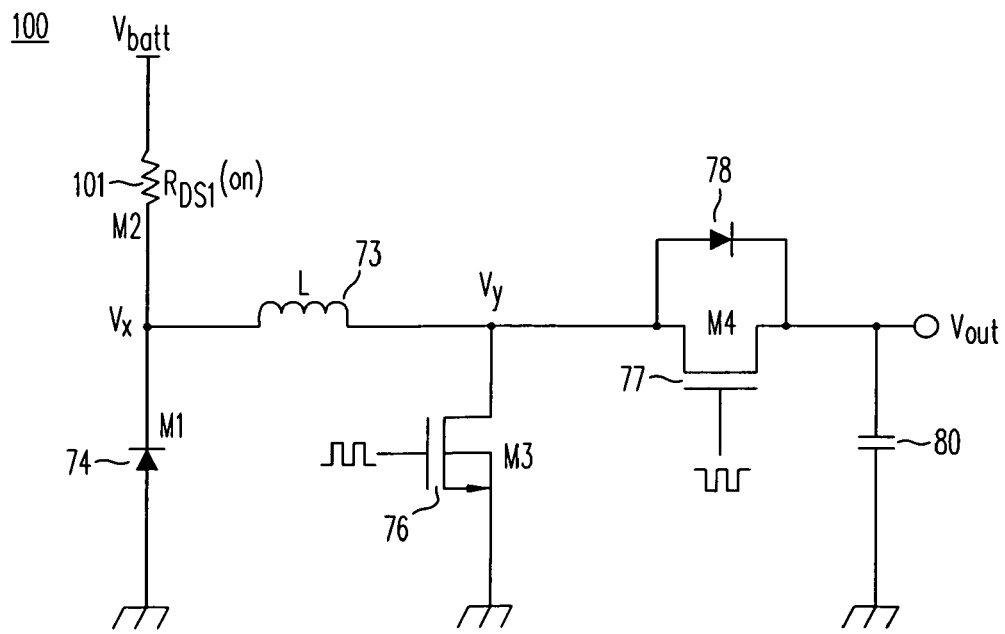
FIG. 6B is an equivalent circuit of the circuit shown in FIG. 6A.
Figure 7:
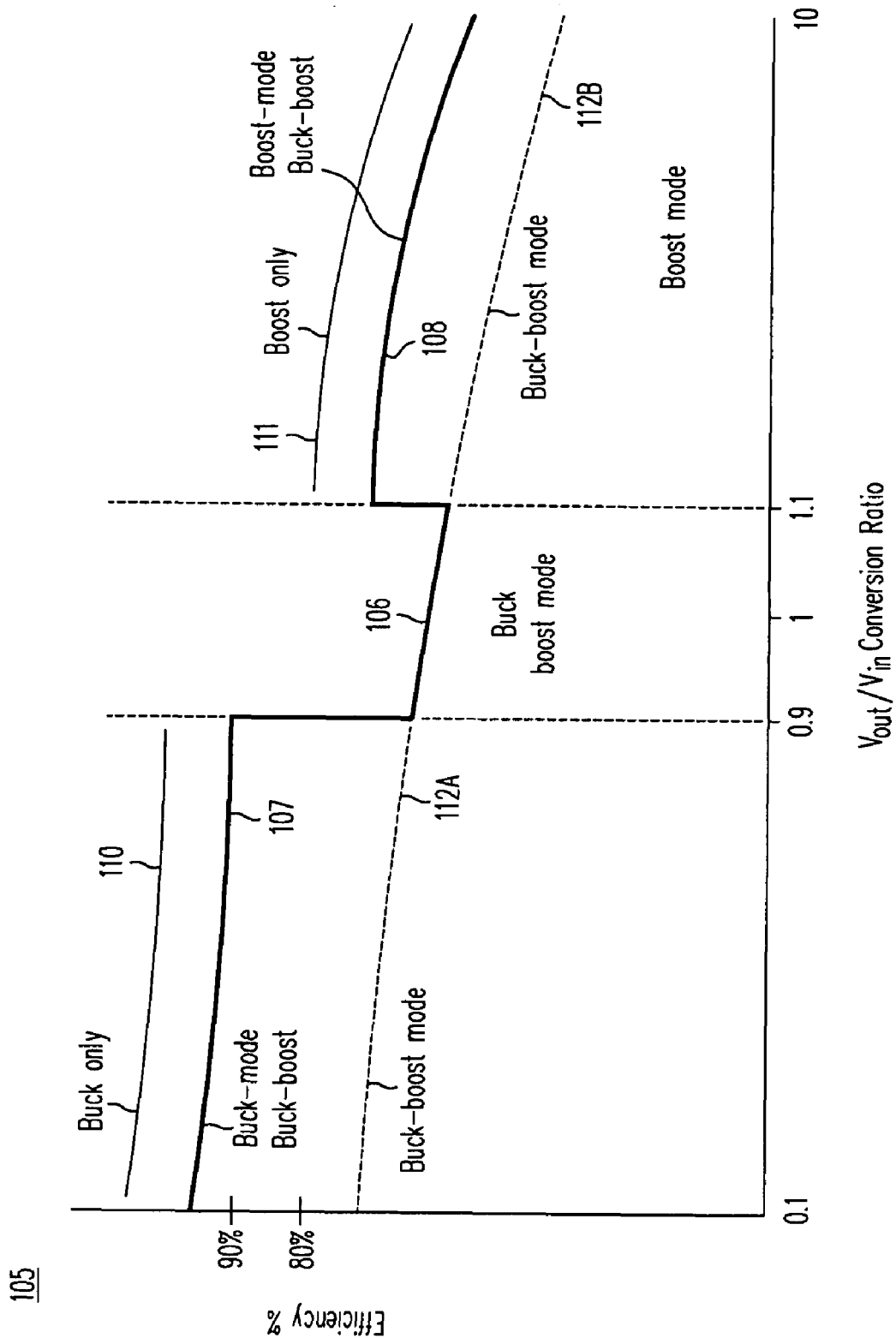
FIG. 7 is a graph illustrating the efficiency of a Buck-boost converter as a function of the conversion ratio.
Figure 8A:
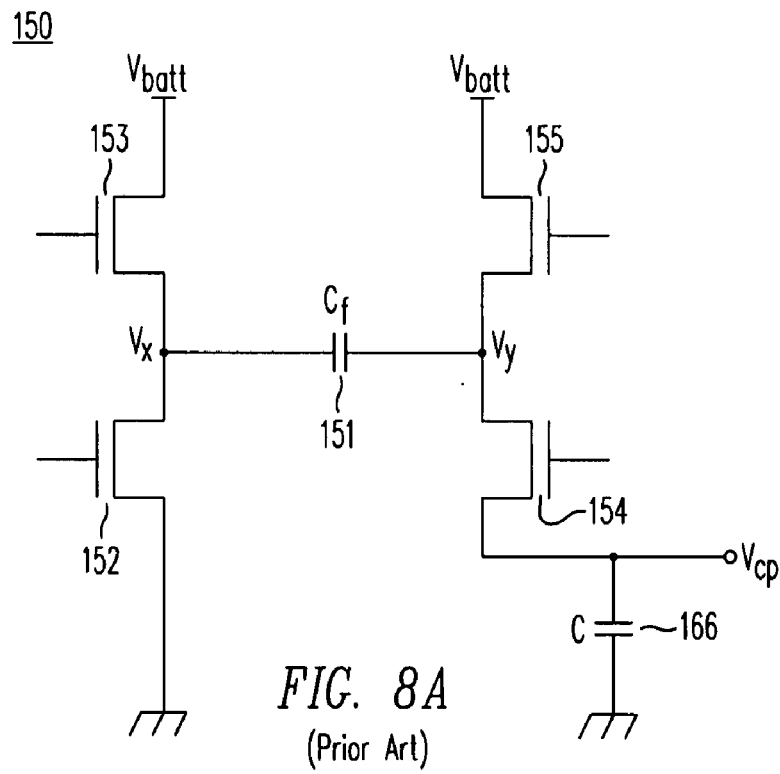
FIG. 8A is a circuit diagram of a prior art charge pump doubler.
Figure 8B:
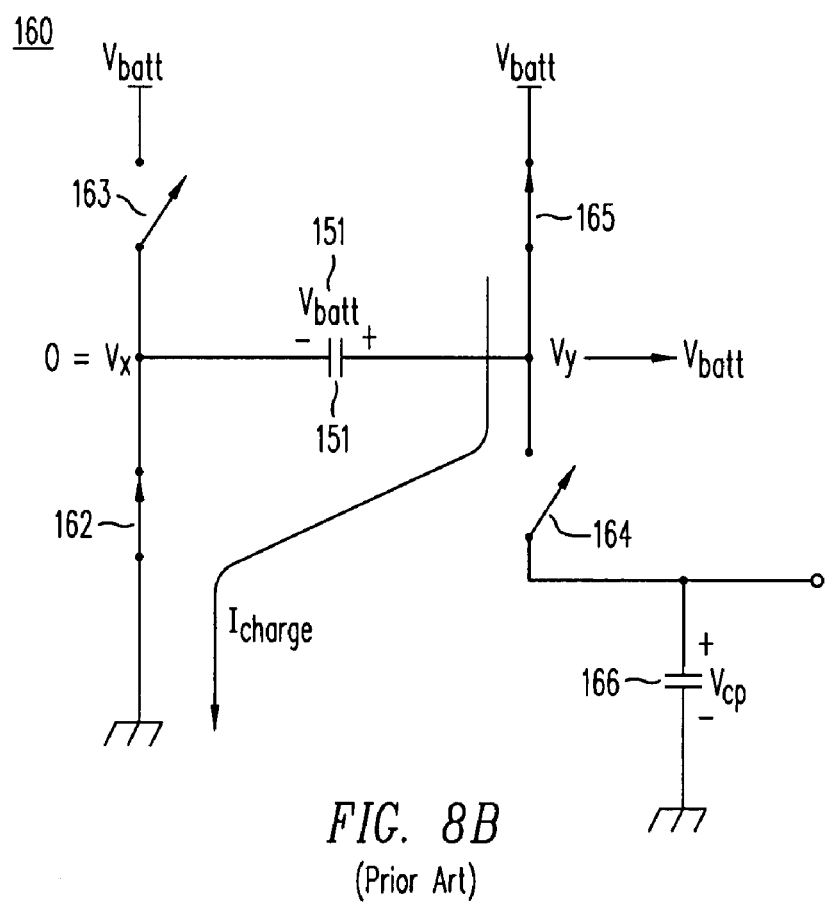
FIG. 8B is a circuit diagram illustrating the charging operation of the charge pump doubler.
Figure 8C:
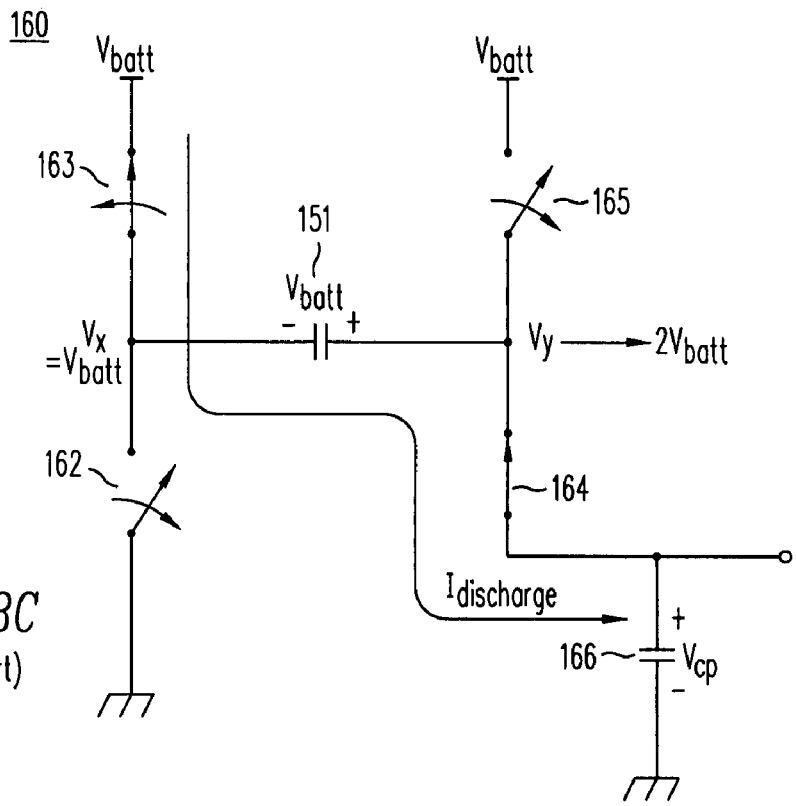
FIG. 8C is a circuit diagram illustrating the discharging operation of the charge pump doubler.
Figure 9A:
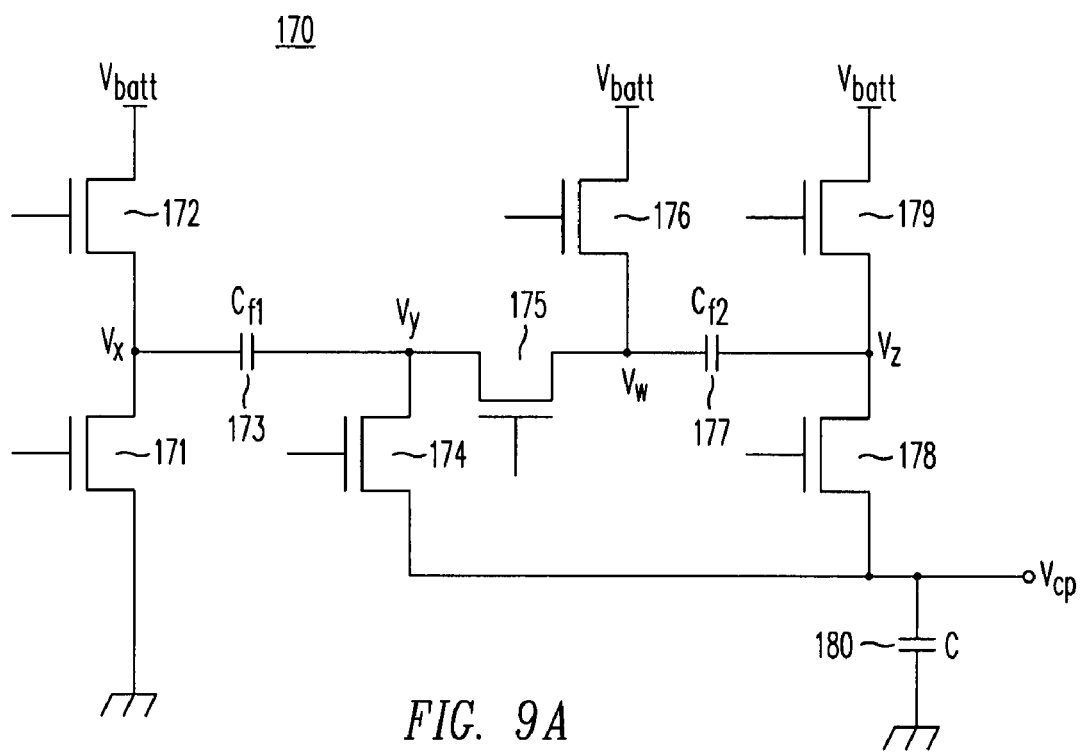
FIG. 9A is a circuit diagram of a prior art fractional charge pump.
Figure 9B:
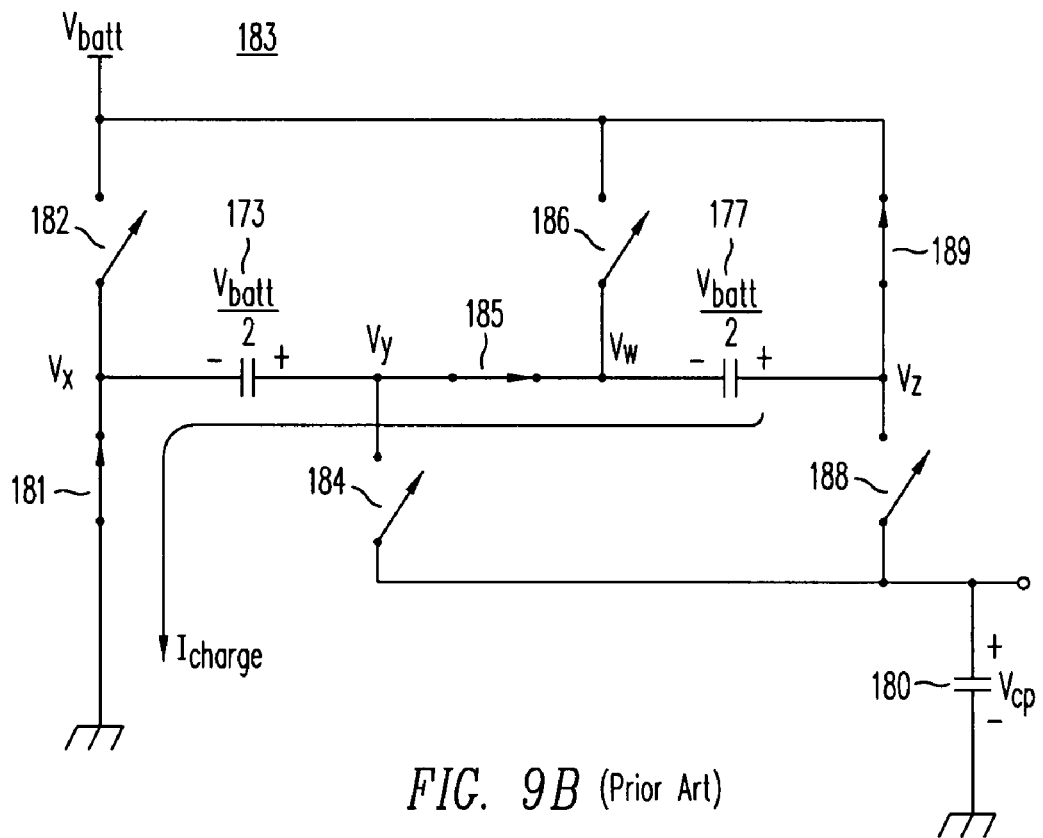
FIG. 9B is a circuit diagram illustrating the charging operation of the fractional charge pump.
Figure 9C:
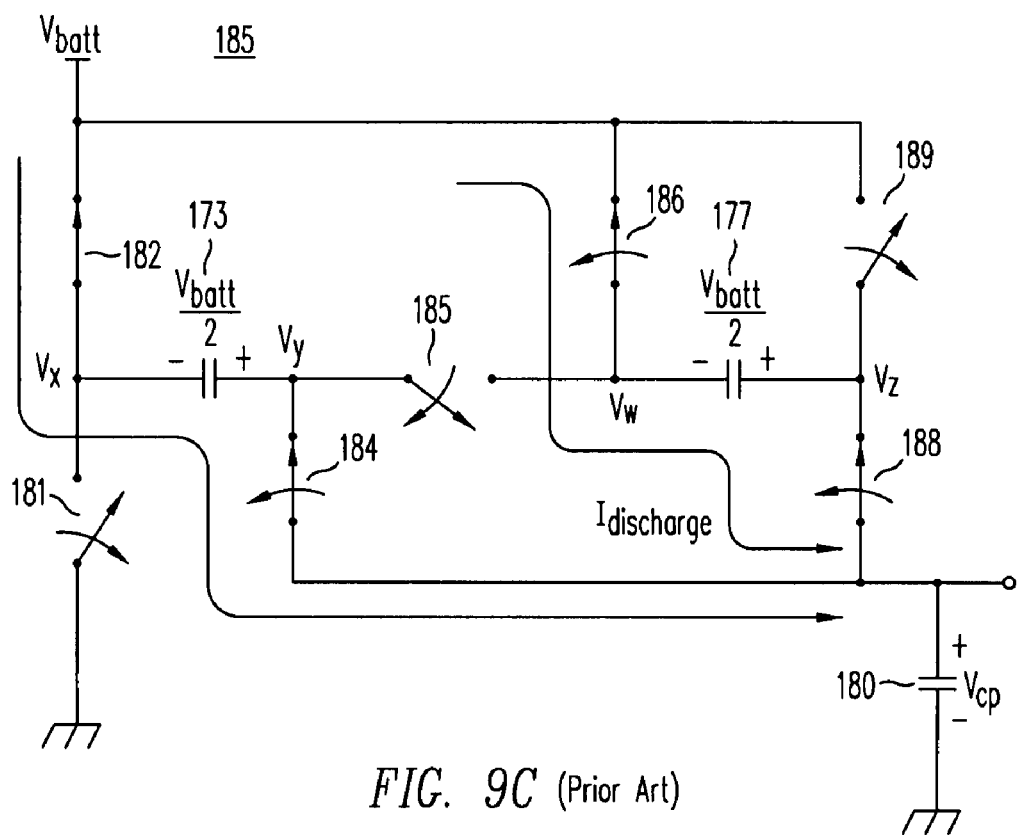
FIG. 9C is a circuit diagram illustrating the discharging operation of the fractional charge pump.
Figure 11A:
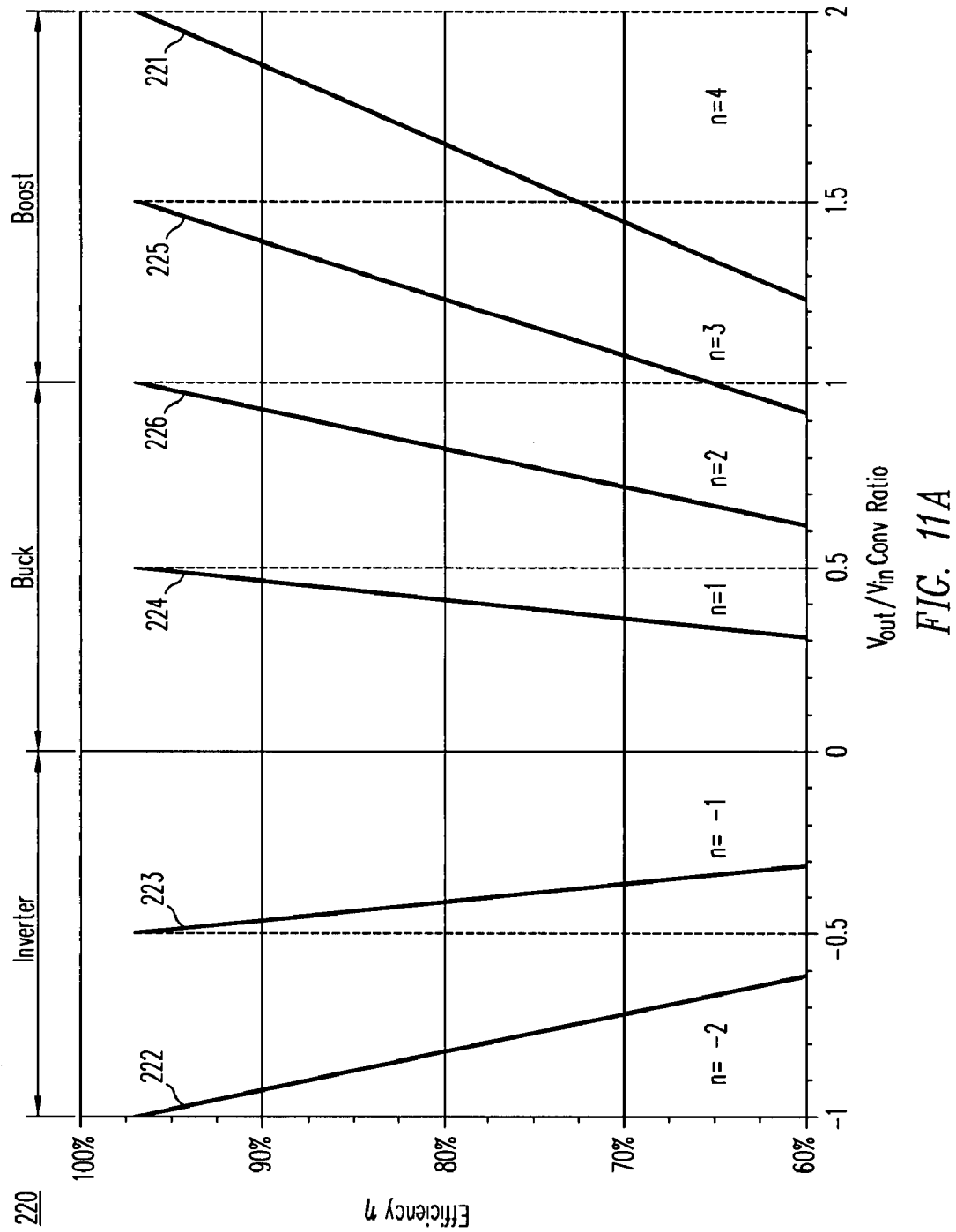
FIG. 11A is a graph showing the efficiency of a single-mode charge pump as a function of its conversion ratio.
Figure 11B:
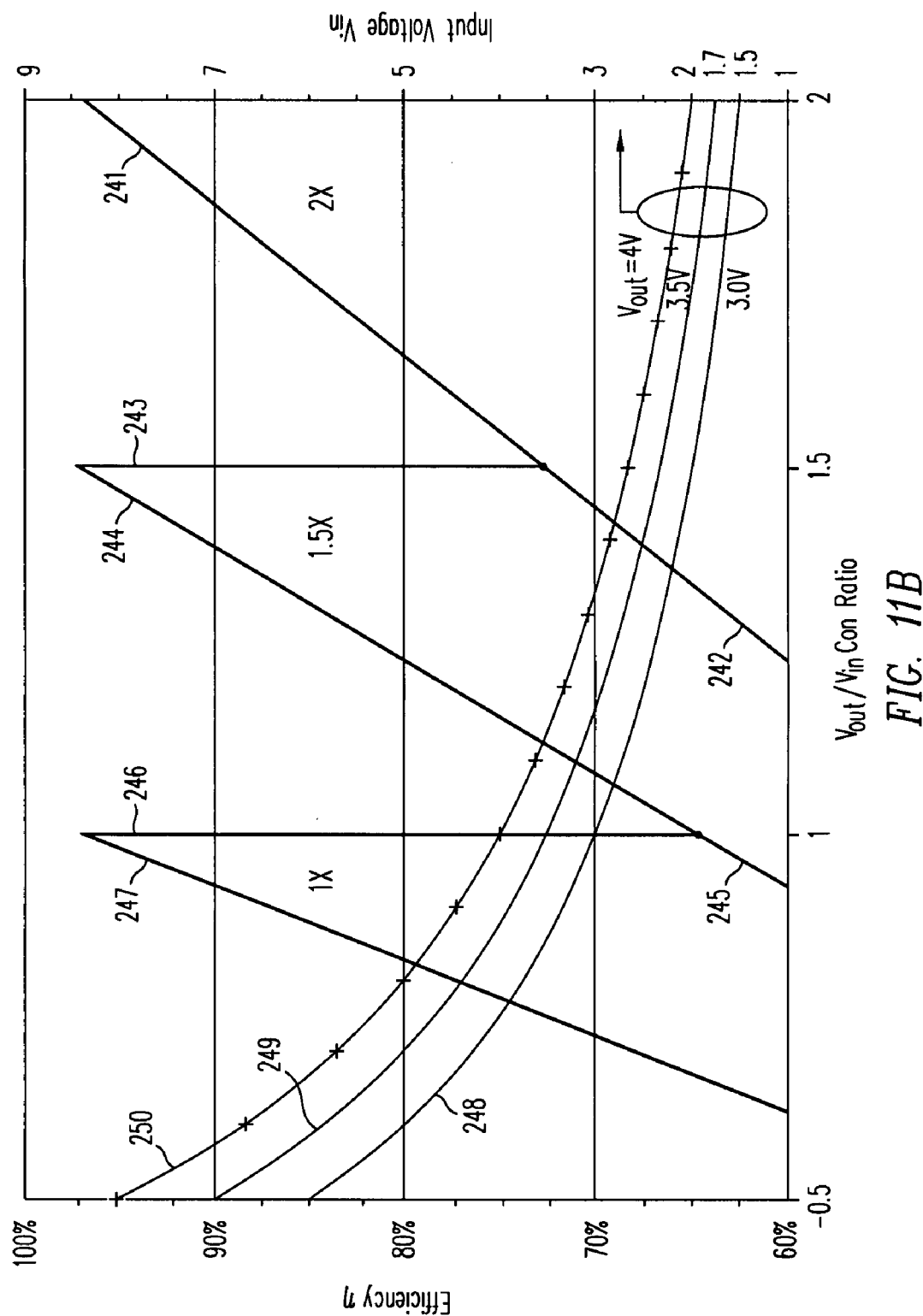
FIG. 11B is a graph showing the efficiency of a tri-mode charge pump as a function of its conversion ratio.
Figure 12A:
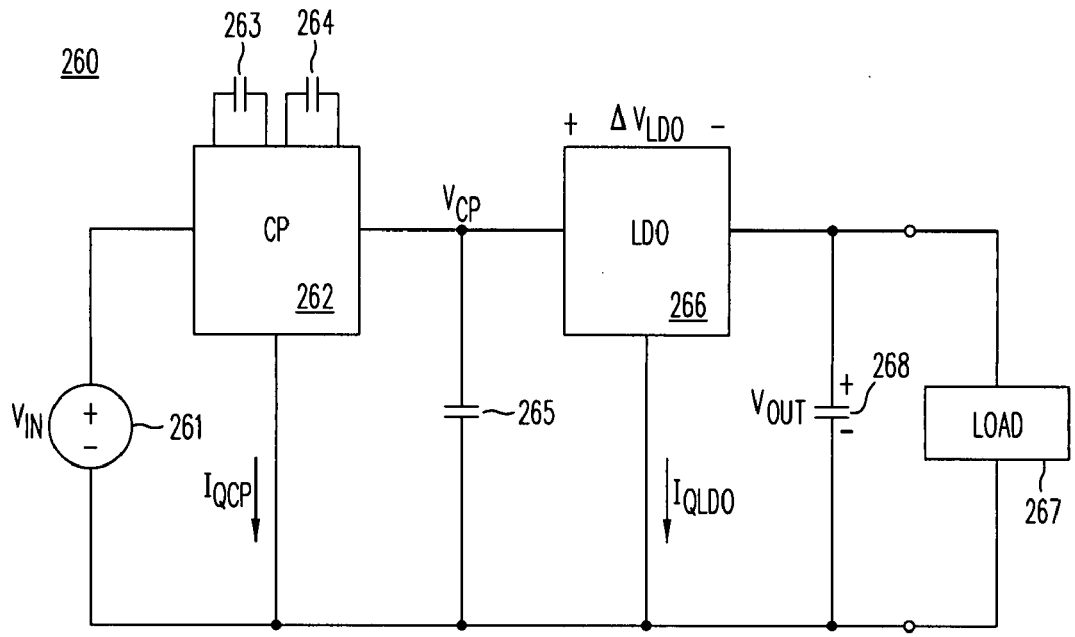
FIG. 12A is an equivalent circuit of a charge pump with LDO post-converter.
Figure 12B:
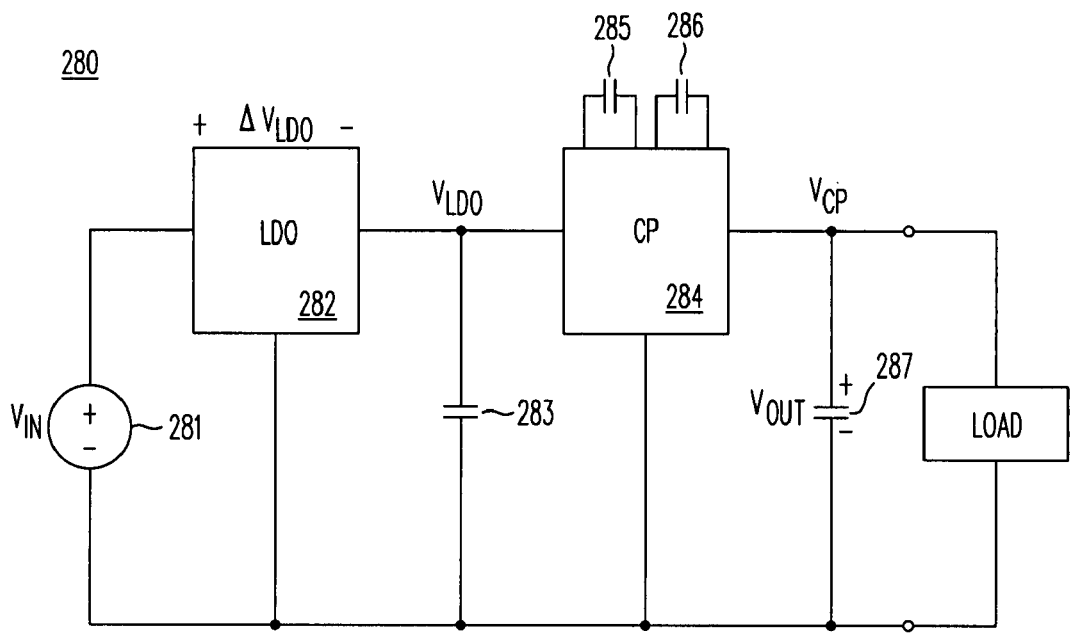
FIG. 12B is an equivalent circuit of a charge pump with LDO pre-regulator.
Figure 12C:
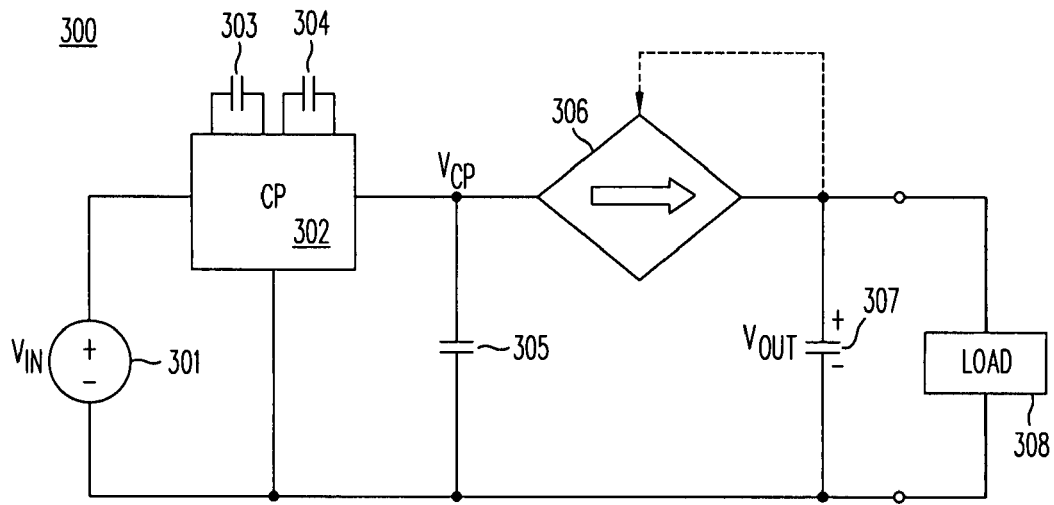
FIG. 12C is an equivalent circuit of a charge pump with current source follower.
Figure 12D:
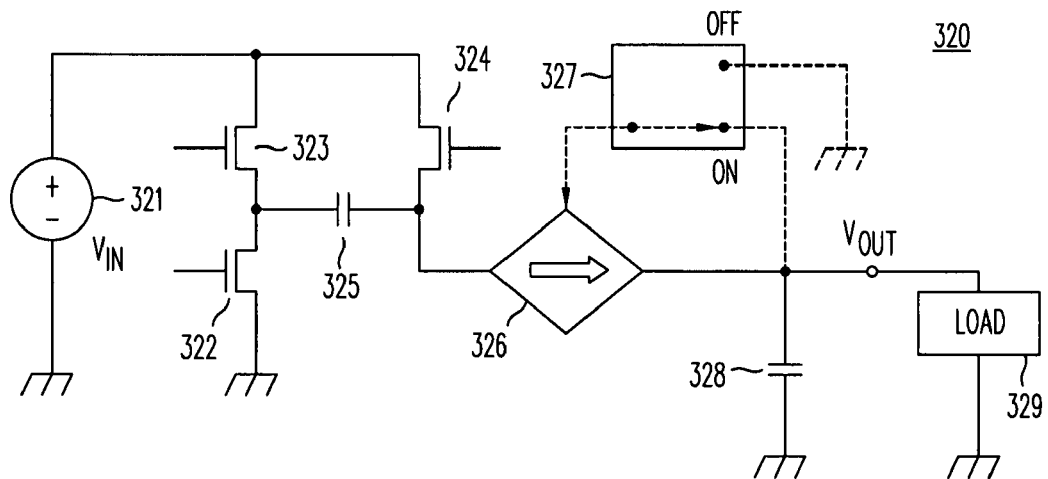
FIG. 12D is an equivalent circuit of a charge pump with integral switched current source.
Figure 12E:
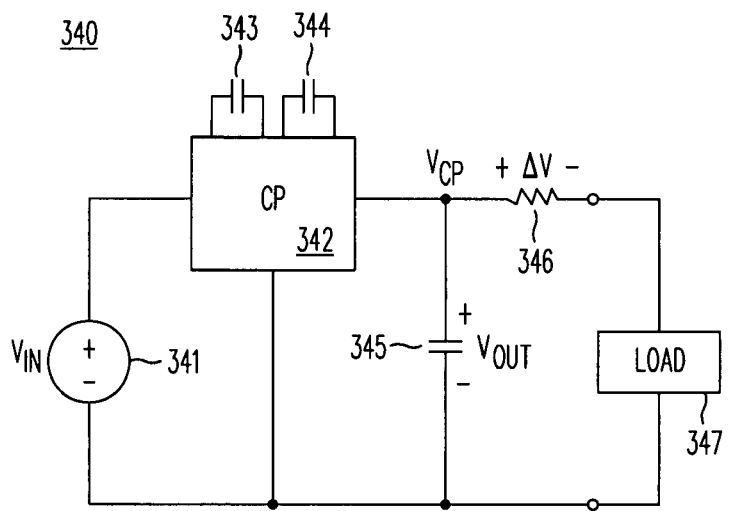
FIG. 12E is an equivalent circuit of a charge pump with series output resistance.
Figure 13:
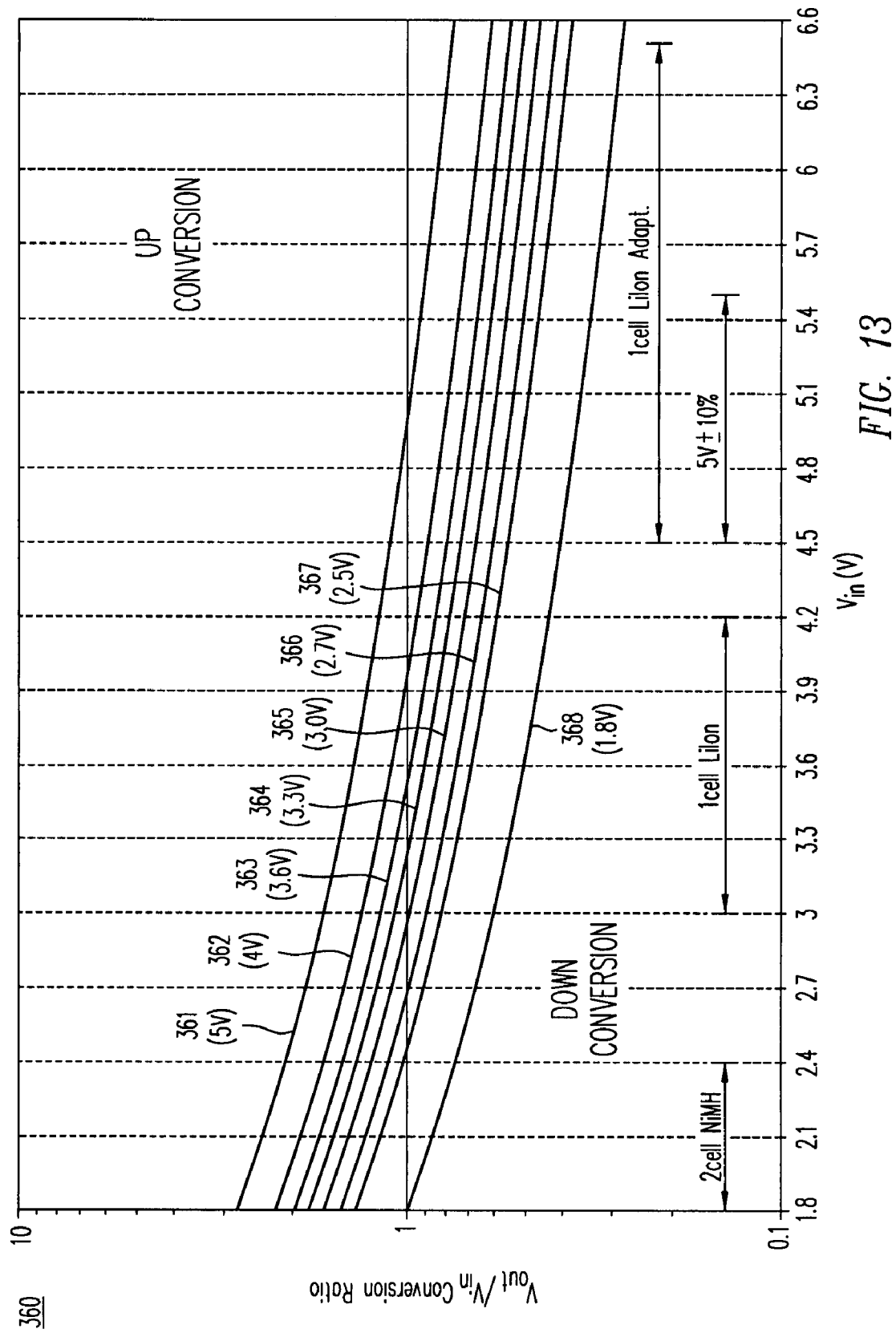
FIG. 13 is a graph showing the requisite voltage conversion ratio $V_{out}/V_{in}$ of a DC/DC converter operating at a variety of voltage outputs and for inputs ranging from 1.8V to 6.6V.

FIG. 13 graphically illustrates the requisite voltage conversion ratio $V_{out}/V_{in}$ of a DC/DC converter operating at a variety of output voltages for various input voltages ranging from 1.8V to 6.6V. For example, curve 361 illustrates that for a 4.5V to 5.5V input range, regulating a 5V output to ±1% accuracy requires operation above and below a unity conversion ratio, meaning an up-down regulating converter is required to hold a tighter tolerance than the ±5% or ±10% accuracy commonly guaranteed by low cost AC/DC wall adapters.

Another need for up-down conversion occurs when using a lithium ion battery to produce a voltage intermediate to its wide voltage range. As examples, curves 362, 363 and 364 in FIG. 13 illustrate outputs at 4V, 3.6V, and 3.3V respectively. Since these load voltages fall within the LiIon battery's normal discharge voltage range of 4.2V to 3V, a converter must regulate in step-down mode with a voltage conversion ratio below unity at the beginning of the cell's discharge cycle, and in step-up mode with a conversion ratio above unity later as the cell voltage decays.

Curve 365 illustrates a 3V output, which theoretically should require only step-down conversion, but because of the aforementioned problem of dropout, a LiIon battery supplying a 3V output must cutoff above 3.2V, thereby wasting useful battery life. New generation LiIon cells under development may allow operation down to 2.7V, requiring up-down conversion for 2.7V outputs as shown by curve 366. At a 2.5V battery condition, dropout issues may also require the use of an up-down converter even to supply a regulated 2.5V output, as shown by curve 367. If, however, up-down conversion results in a loss of efficiency exceeding the extra operating time gained by the extended battery range, then the user lifetime benefit of using a battery capable of lower voltage operation is lost entirely.

Similarly, dropout concerns make it difficult to guarantee a 1.8V regulated output from 2-cell-connected nickel-metal-hydride or nickel-cadmium, i.e. NiMH or NiCd, batteries since those their outputs range from 2.4V down to 1.8V. Stopping usage at a 2V battery condition unacceptably wastes more than half the battery's charge life.

Another situation requiring an efficient low-dropout up-down converter is the use of a power supply designed to operate with two NiMH dry-cells, two alkaline cells, or a single-cell LiIon battery. Since the output voltage of a 2-series-cell NiMH battery pack ranges from 1.8V to 2.4V, the output voltage of 2-series-cell alkaline batteries ranges from 1.8V up to 3.4V during charging, and the output voltage of a single-cell LiIon battery ranges from 4.2V down to 3V or even 2.7V, any load voltage between 4.2V and 1.8V needs an up-down converter to maximize efficiency and battery life.

If we also consider that some systems allow the DC output from the AC/DC wall adapter to be connected without a battery present, the input voltage supplied to a system's DC/DC converter input can be considerably higher than if the battery were present, and may reach as high as 6.5V. When the battery is present and the charger disconnected, the input voltage may be as low as 1.8V. In such cases, every output voltage represented by curves 361 to 368 in FIG. 13, i.e., ranging from 5V down to a 1.8V output, requires an up-down converter.

Today most electrical loads are supplied by an up-only or down-only converter, where the battery is cut off prematurely to avoid requiring up-down conversion, even at the expense of wasting usable stored charge in a battery. Up-down conversion is therefore avoided at any cost except in extreme situations. With the poor efficiency, mode switching, noise glitches, regulation dropout, and poor regulation offered by existing up-down solutions, be they DC/DC converters, charge pumps, or linear regulators, a requirement for up-down conversion and regulation is extremely problematic and cannot meet the needs of today's efficiency-focused consumer marketplace.

A New DC/DC Converter Topology

The new non-isolated DC/DC converter and voltage regulation topology described herein is capable of operating over a wide range of voltage conversion ratios ranging from step-up to step-down conversion without the need for mode switching. Free from mode switching and dropout problems when $V_{out} \approx V_{in}$, the converter does not suffer from noise glitches, poor regulation, and instability, even near unity input-to-output voltage conversion ratios. While the regulator includes switched-inductor operation, it avoids the minimum pulse width problem plaguing conventional switching regulators at very high and very low duty factors, including regulator dropout, narrow pulses and associated high-current spikes, variable frequency operation, inadequate time to perform break-before-make transitions. In contrast, prior-art non-isolated DC/DC converters suffer from one or more of the aforementioned problems at extreme duty factors, and their use near unity voltage conversion ratios remains problematic.

The method and apparatus of this invention can be used in applications requiring up-down conversion, and avoid the problems of existing Buck-boost and flyback converters. While preferred embodiments of this invention specifically address the implementation of up-down converters, variants include improved down-only regulating converters and DC/DC inverters capable of producing negative, i.e. below ground, supply voltages.

Collectively, the new DC/DC converters disclosed herein comprise three new converter topologies and variants thereof, referred to herein by acronym as LCDU—switched-inductor-capacitor down-up converter
LCDD—switched-inductor-capacitor down-down converter
LCDI—switched-inductor-capacitor down-inverting converter (inverter)

Specifically this invention focuses on switched-inductor-capacitor regulating converters comprising an inductive step-down pre-regulator feeding a switched-capacitor implemented step-up, step-down, or inverting post-converter. As a matter of nomenclature, the first L in the acronym represents the energy storage element, i.e. the coil or inductor, in the first stage of the regulator, or pre-regulator. The C represents the energy storage element in the post-converter or second stage of the converter. The third character "D" in the converter's name indicates that the pre-regulator steps the input or battery voltage down and feeds the stepped-down voltage to the post-converter.

The last character refers to the direction of post-converter-up, down or inverting. Hence, the acronyms LCDU, LCDD, or LCDI, respectively. Since the post-converter stage varies by application, this new switched-inductor-capacitor family of DC/DC converter topologies can be collectively described as LCDX regulating converters, the X referring to a variable U for up, D for down, and I for inverting, respectively.

Related U.S. application Ser. No. 11/890,956, titled "High-Efficiency DC/DC Voltage Converter Including Up Inductive Switching Pre-Regulator and Capacitive Switching Post-Converter," filed contemporaneously herewith and incorporated herein by reference, describes switched-inductor-capacitor (LC) converters comprising a switched inductive step-up type pre-regulator followed by a switched-capacitor step-down, step-up, or inverting post-converter. Collectively these LCUX type regulating converters include the following:

LCUD—switched-inductor-capacitor up-down converter
LCUU—switched-inductor-capacitor up-up converter
LCUI—switched-inductor-capacitor up-inverting converter (inverter)

Related U.S. application Ser. Nos. 11/890,941, titled "High-Efficiency DC/DC Voltage Converter Including Capacitive Pre-Converter and Up Inductive Switching Post-Regulator," and 11/890,994, titled "High-Efficiency DC/DC Voltage Converter Including Capacitive Pre-Converter and Down Inductive Switching Post-Regulator," each of which is filed contemporaneously herewith and incorporated herein by reference, describe switched-capacitor-inductor (CL) regulating converters, where pre-conversion is achieved by a switched-capacitor stage and post-regulation is accomplished by a switched-inductor method.

Switched-Inductor-Capacitor (LCDX) Regulating Converters

Figure 14A:
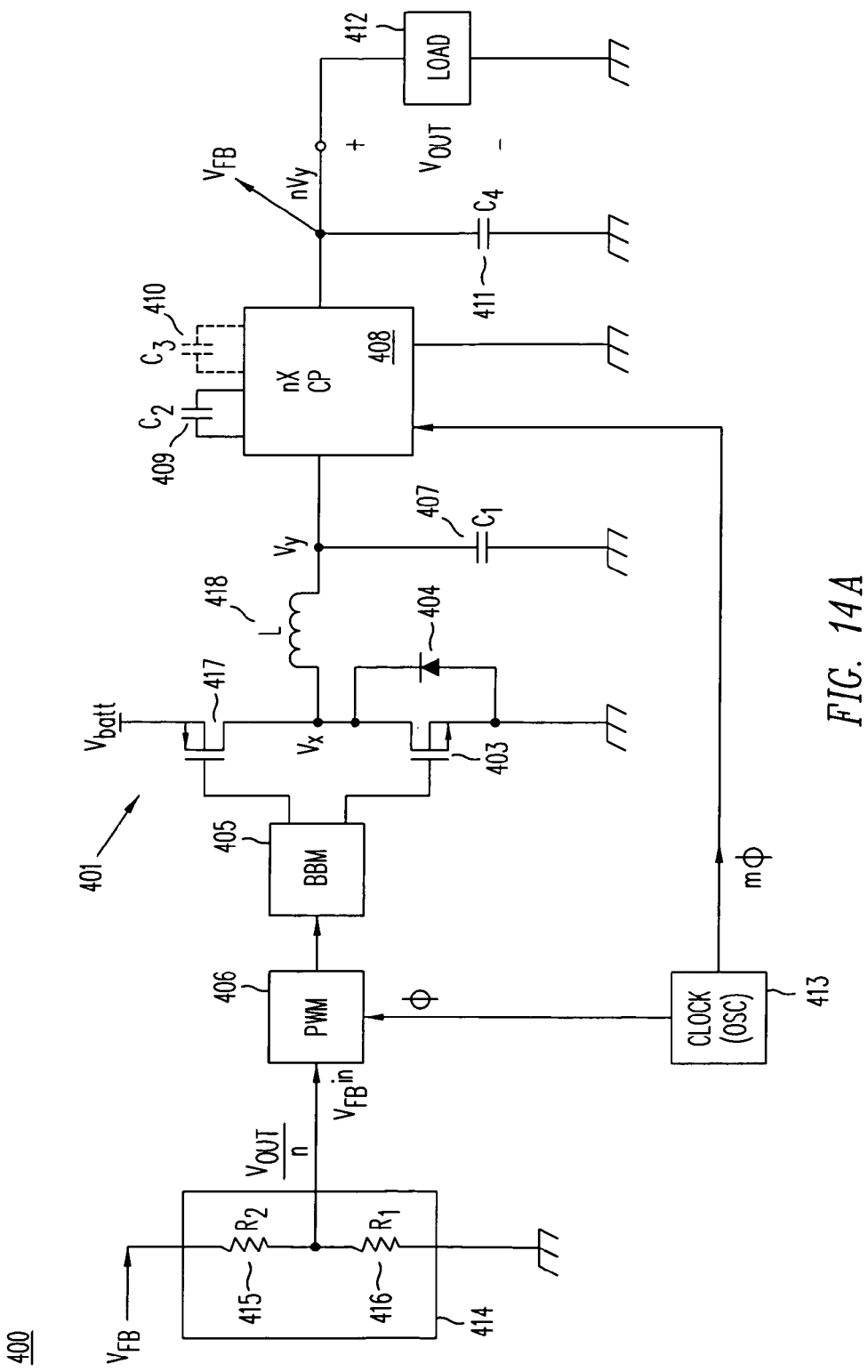
FIG. 14A is a schematic circuit diagram of a switched LCDU down-up regulating converter in accordance with the invention.

FIG. 14A illustrates a schematic circuit diagram of a switched LCDX regulating converter 400 comprising a step-down, switched-inductor pre-regulator 401 supplying a voltage $V_y$ as an input to a switched-capacitor charge-pump post-converter 402 with a conversion ratio n, where the output voltage $V_{OUT}$ is further used as a feedback voltage $V_{FB}$ to control the operating condition and output of the pre-regulator 401. The output voltage $V_y$ of the pre-regulator 401 is thereby dynamically adjusted to a voltage that optimizes the efficiency of the nX charge-pump converter 402 while simultaneously producing a well-regulated output at a desired voltage $V_{OUT}$.

In converter 400 the switched-inductor pre-regulator 401 comprises a PWM controller 406, a break-before-make gate buffer 405, a high-side P-channel power MOSFET 417, a low-side N-channel synchronous rectifier power MOSFET 403 with an intrinsic PN diode 404, and an inductor 418. An optional filter capacitor 407 is connected across the output of pre-regulator 401 to reduce ripple and improve transient response. In this embodiment of the invention, the step-down switched-inductor pre-regulator 401 is topologically configured as a synchronous Buck converter, although any step-down switched-inductor DC/DC converter may be used. For example N-channel MOSFET 403 may be eliminated and diode 404 replaced by a Schottky rectifier to implement a Buck converter in lieu of the synchronous Buck converter shown.

PWM controller 406 controls the on-time of high-side P-channel MOSFET 417 by varying the duty factor D in response to its feedback input, operating at a fixed frequency $\Phi$ as determined by a ramp-clock/oscillator 413. Alternatively, PWM controller 406 may operate at a variable frequency with either a fixed or variable on-time for P-channel MOSFET 417.

Whenever P-channel MOSFET 417 is on, current flows from input power source $V_{batt}$ through inductor 418. The coil is thereby magnetized, storing energy in an amount equal to ½LI² and resisting any rapid changes in current. Compared to the switching frequency Φ, current in inductor 418 cannot react to the rapid switching of MOSFET 417, so that inductor 418 behaves as a nearly lossless current source, whose average current changes slowly, over many clock cycles in response to pulse width modulation controlled by PWM circuit 406.

Whenever high-side MOSFET 417 is not conducting, inductor 418 drives the voltage at node $V_x$ below ground, forward biasing diode 404 and allowing current in inductor 418 to flow uninterrupted, i.e. to recirculate. With both MOSFETs 403 and 417 turned off, the power dissipated in diode 404 is $I_L \cdot V_f$ where $V_f$ is the forward voltage of P-N junction diode 404. N-channel synchronous rectifier MOSFET 403 conducts all or some portion of the time during which P-channel MOSFET 417 is off, shunting the current in diode 404 and redirecting the recirculation current through the channel of low-side MOSFET 403. Since MOSFET 403 only conducts when rectifier diode 404 is conducting, it operates as a "synchronous" rectifier. During conduction, the voltage drop across the synchronous rectifier is given by $I_L \cdot R_{DS}$(on) and its instantaneous power dissipation is $I_L^2 \cdot R_{DS}$(on).

Break-before make (BBM) buffer 405 insures that high-side power MOSFET 417 and low-side power MOSFET 403 never conduct simultaneously to prevent shoot-through conduction. Shoot-through conduction is an undesirable condition leading to wasted power and a loss in efficiency, and potentially resulting in MOSFET device damage. While the BBM intervals must be sufficiently long to prevent shoot-through, excessively long BBM intervals are, however, also undesirable since they force diode 404 to carry current for longer times and to dissipate more power.

Except for the BBM period, synchronous rectifier MOSFET 403 ideally should be turned on and conducting whenever high-side MOSFET 417 is off. In some circumstances, however, it may be advantageous to turn off synchronous rectifier MOSFET 403 prematurely or not to turn it on at all. For example at very low output currents, unwanted oscillations and reverse current flow may occur if MOSFET 403 is left on for an extended duration. Shutting MOSFET 403 off disables channel conduction, and diode 404 under a reverse-bias condition prevents reverse current conduction, improving the converter's light load efficiency.

Alternatively, as described in application Ser. No. 11/890,947, titled "Low-Noise DC/DC Converter With Controlled Diode Conduction," filed contemporaneously herewith and incorporated herein by reference in its entirety, the synchronous rectifier MOSFET may remain on but controlled in a manner to limit the magnitude of its drain current, when it is not being operated as a fully-on device. By alternating between a resistive switch state and a low-current constant-current mode, the method reduces electrical noise in switched-inductor converters.

Intermediate voltage $V_y$, the output of the switched-inductor pre-regulator 401, then supplies the power input to a charge pump 408 within switched-capacitor post-converter 402, which also includes a reservoir capacitor 411. Charge pump 408 converts this input voltage $V_y$ to an output voltage $nV_y$, using a switched-capacitor network with flying capacitors 409 and (optionally) 410. The conversion ratio nX of charge pump 408 may be step-up, step down, and inverting. Step-up conversion in the post-converter of a switched LCDU converter may comprise, for example, a single-capacitor doubler, n=2, or a dual-capacitor fractional implementation, n=1.5.

The output of the charge pump 408, filtered by reservoir capacitor 411, supplies a load 412 with a regulated voltage $V_{out}$. In a preferred embodiment, this output is used to provide feedback to the pre-regulator 401 with a feedback signal $V_{FB}$ which is converted by level shifter 414 to a voltage used to control PWM circuit 406. Alternatively, the intermediate voltage $V_y$ can be used as a feedback signal to control PWM circuit 406. As will later be shown, the value of Vy produced by the pre-regulator circuit 401 is important in setting the overall efficiency of DC/DC converter 400.

Figure 14B:
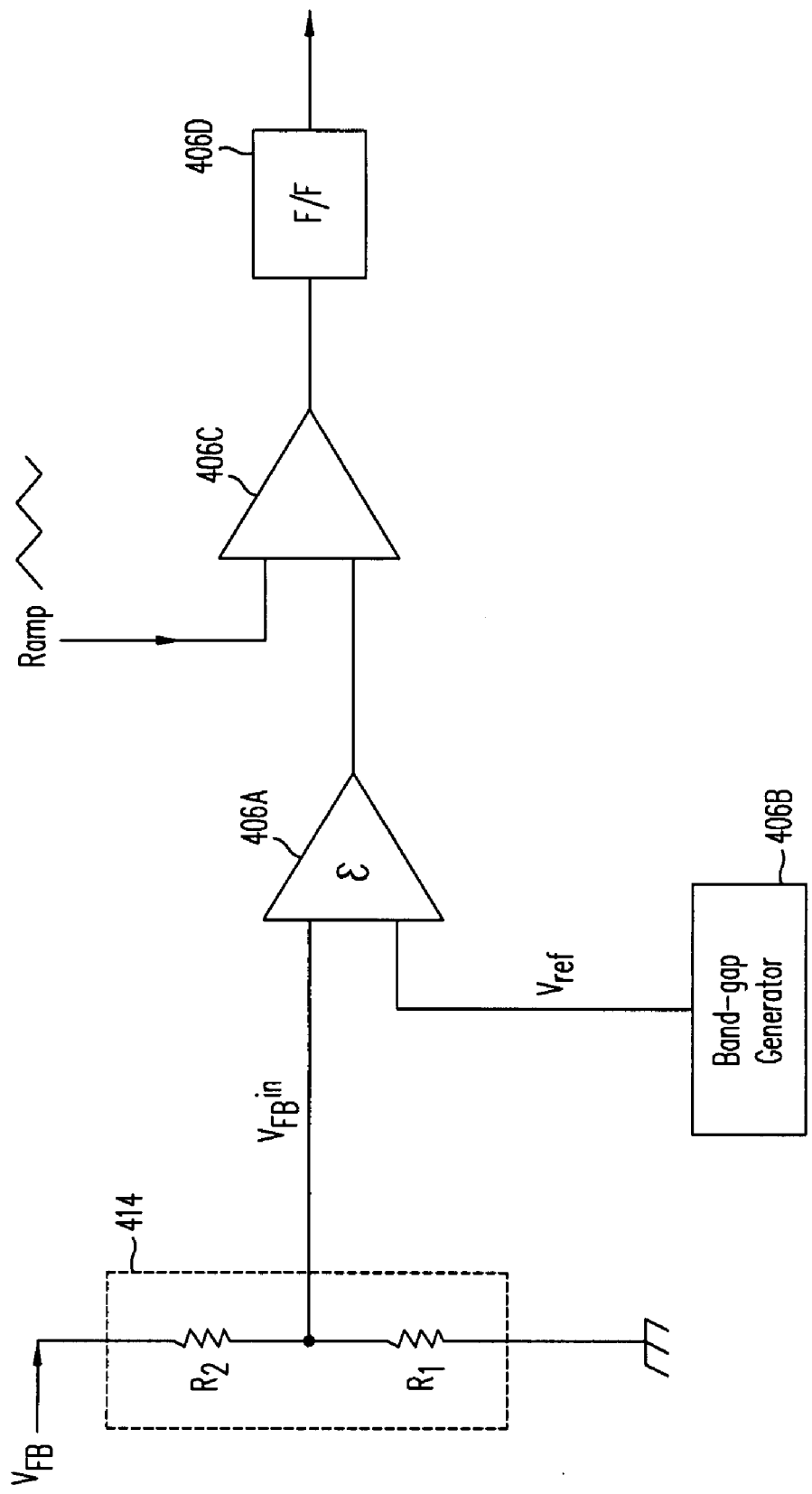
FIG. 14B is a circuit diagram of a feedback circuit that may used to control the output voltage of the converter.

In a preferred embodiment, the output voltage of level shifter 414 should force the value of $V_y$ to a voltage equal to $V_{out}/n$. In the case of the LCDU converter 400, level shifter 414 comprises a network of two resistors 415 and 416 acting as a voltage divider. In LCDD and LCDI inverters an alternative circuit can be employed for level shifting, as described below. PWM circuit 406 includes an error circuit whereby the output voltage of level shifter 414 is compared against a reference voltage and the result of the comparison is used to control the switching MOSFETs 403 and 417. For example, as shown in FIG. 14B, the output voltage $V_{FBin}$ from level shifter 414 may be compared in an error amplifier 406A against a reference voltage $V_{ref}$ generated by a band-gap generator 406B, and the error signal generated by error amplifier 406A may in turn be compared to an oscillating ramp signal in a comparator 406C. Comparator 406C generates a digital output which is fed through a flip-flop circuit 406D and a BBM buffer 405 to control the switching of MOSFETs 403 and 417 and in particular the duty factor of MOSFET 417. In this example, level shifter 414 is constructed such that when $V_{out}$ is at the target level, the error amplifier 406A produces an output which maintains the duty factor constant. Conversely, when $V_{out}$ is either above or below its target value, error amplifier 406A produces a output which causes the comparator 406C to reduce or increase the duty factor at which high-side MOSFET 417 is operating such that $V_y = V_{out}/n$. For a further description of alternative feedback circuitry in DC/DC converters, see U.S. Pat. No. 6,580,258 to Wilcox et al., issued Jun. 17, 2003, which is incorporated herein by reference in its entirety.

Another feature of LCDX converter 400 is the use of clock/oscillator 413 to control the switching of MOSFETs 417 and 403 in pre-regulator 401 as well as the switching elements in charge pump 408. By synchronizing the switched-inductor pre-regulator 401 and switched-capacitor post-converter 402, the size of intermediate filter capacitor 407 can be greatly reduced or in some cases, capacitor 407 may be eliminated altogether.

Regulating Vout Through $V_y$ Pre-Regulation

One novel aspect of the LCDX converter 400 is the dependence of its overall efficiency η on the value of intermediate voltage $V_y$, the output of the pre-regulator 401. Another important consideration is the way the voltage $V_y$ is controlled with closed loop feedback to improve the converter's transient regulation.

Figure 15A:
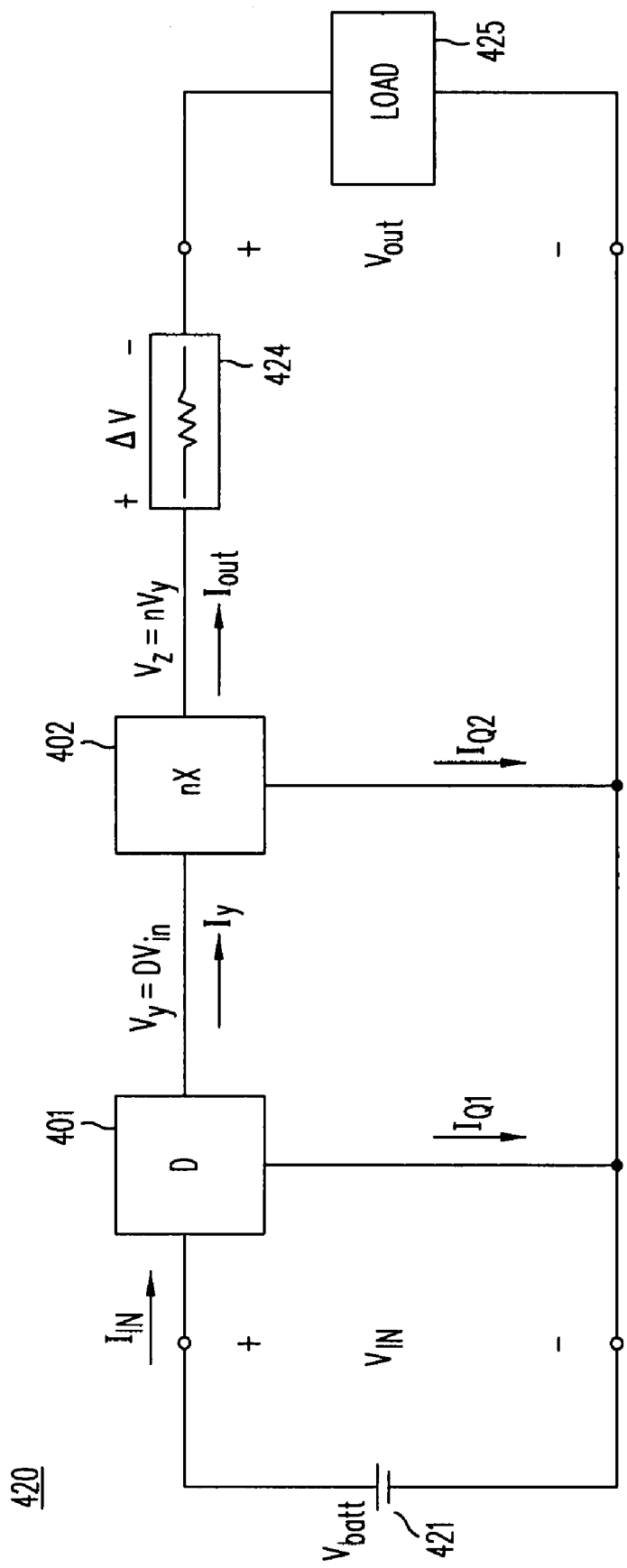
FIG. 15A is a behavioral model of the switched LCDU regulating converter of this invention.

To better understand these considerations, behavioral model 420 of FIG. 15A can be used for control analysis and for estimating efficiency. As shown, step-down pre-regulator 401 is powered from input voltage $V_{in}$, producing an intermediate voltage $V_y$. In the LCDX topology, the pre-regulator 401 operates as a step-down converter, given by $$V_y = D \cdot V_{in}$$

where D is the duty cycle of the high side MOSFET, ranging between 0% and 100%. This down conversion is illustrated graphically in FIG. 15B, where $V_{out}$ versus $V_{in}$ chart 426 of a switched LCDU 3.3V regulator illustrates that the battery input voltage $V_{batt}$ 427 results in a constant $V_y$ voltage of 1.65V shown by line 428.

Figure 15B:
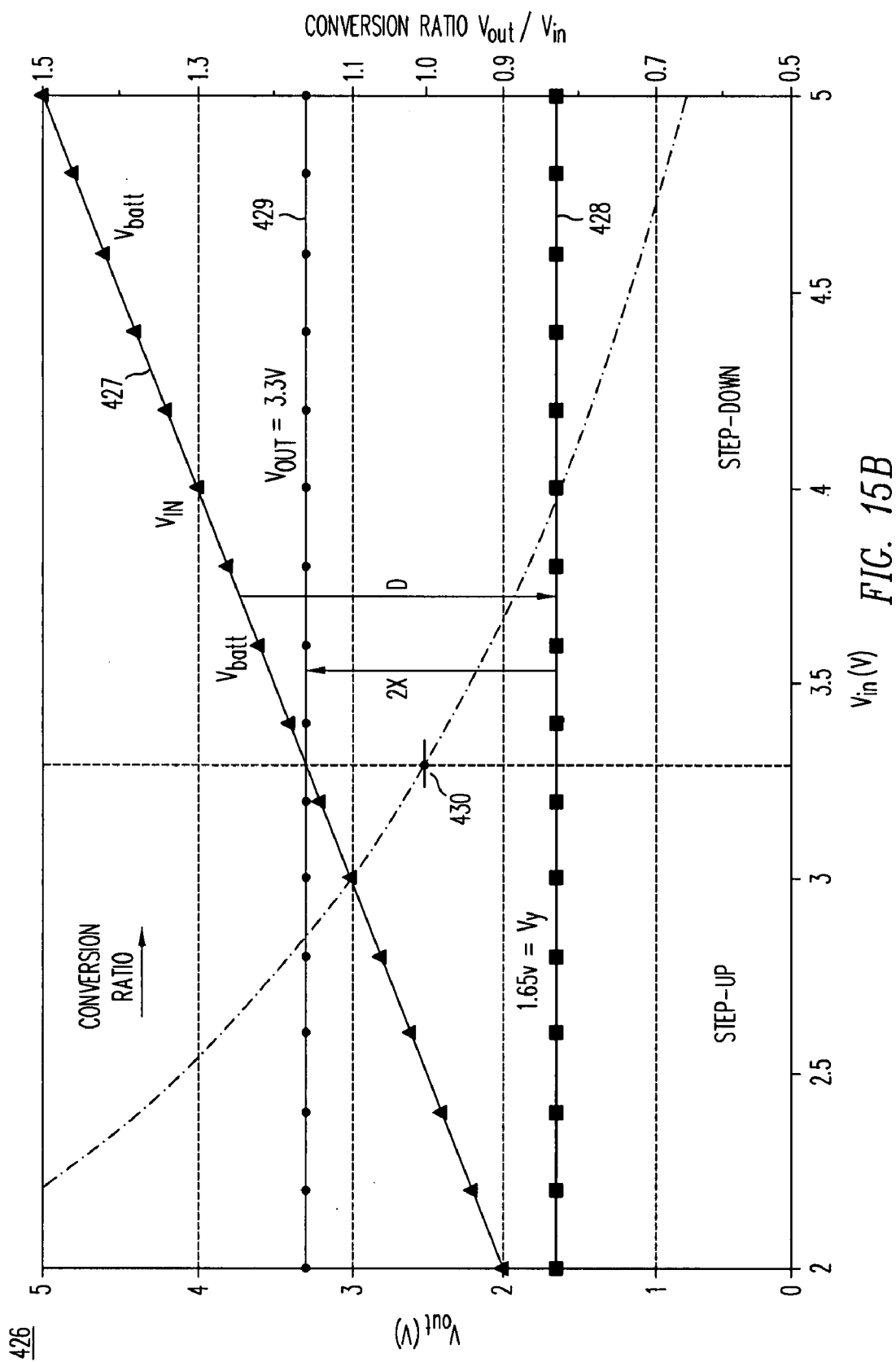
FIG. 15B is a graph showing the input voltage dependence of output voltage $V_{out}$, intermediate voltage $V_y$; and voltage conversion ratio for a 3.3V LCDU regulator of this invention.

Referring again to FIG. 15A, the $V_y$ output of the pre-regulator 401, in turn, powers switched-capacitor post-converter 402, outputting a voltage $V_z$. The conversion ratio of the post-converter 402 is given by $$V_z = n \cdot V_y$$

or expressed as a voltage conversion ratio $V_z/V_y$ for post-converter 402, the ratio equals $$\frac{V_z}{V_y} = n$$

where n has discrete, quantized values, e.g., n={2, 1.5, 0.5, −0.5, −1.0}, depending on the number of capacitors and the switch configuration in the charge pump 408. For example as shown in FIG. 15B if n=2, the step-up post-converter 402 doubles the $V_y$ intermediate voltage 428 to a constant 3.3V $V_{out}$ shown by line 429.

Referring again to FIG. 15A, the input voltage source 421 powers the entire LCDX converter. This power source may represent the output of any power supply but commonly comprises a LiIon battery. In the case of a battery, the cell voltage $V_{batt}$ is substantially equal to $V_{in}$ except in the event of high-current transients when some voltage drop may occur inside the battery pack, further exemplifying the need for regulating voltage converters.

As shown, the output of the switching LCDX regulator powers a load 425, operating at a voltage $V_{out}$, the desired output voltage of the regulator. The parasitic lossy element 424 is included schematically to model the impact of a voltage mismatch between the output $V_z$ of the post-converter 402 and the load's desired supply voltage $V_{out}$. Assuming that the output voltage $V_z$ of post-converter 402 is substantially the same as the desired output voltage $V_{out}$, then the voltage $\Delta V$ across lossy parasitic element 424 is negligible, and $V_{out} \approx V_z$. Combining the above equations, yields the relation $$V_{out} \approx V_z = n \cdot V_y = n \cdot D \cdot V_{in}$$

The voltage conversion ratio of a LCDX converter is then given by $$\frac{V_{out}}{V_{in}} = nD$$

From this relation, we can make the important observation for the LCDX converter 400 that the product of the duty-factor D of its pre-regulator 401 and the ratio "n" of its post-converter 402 equals the output to input ratio of converter 400. In essence, to properly regulate and output, the duty factor D, the conversion ratio n, or both must be varied dynamically to compensate for changes in input voltage.

Using a 2× post-converter, i.e. a doubler, as an example, the LCDX converter transfer equation specifically becomes $$\frac{V_{out}}{V_{in}} = 2D$$

Figure 15C:
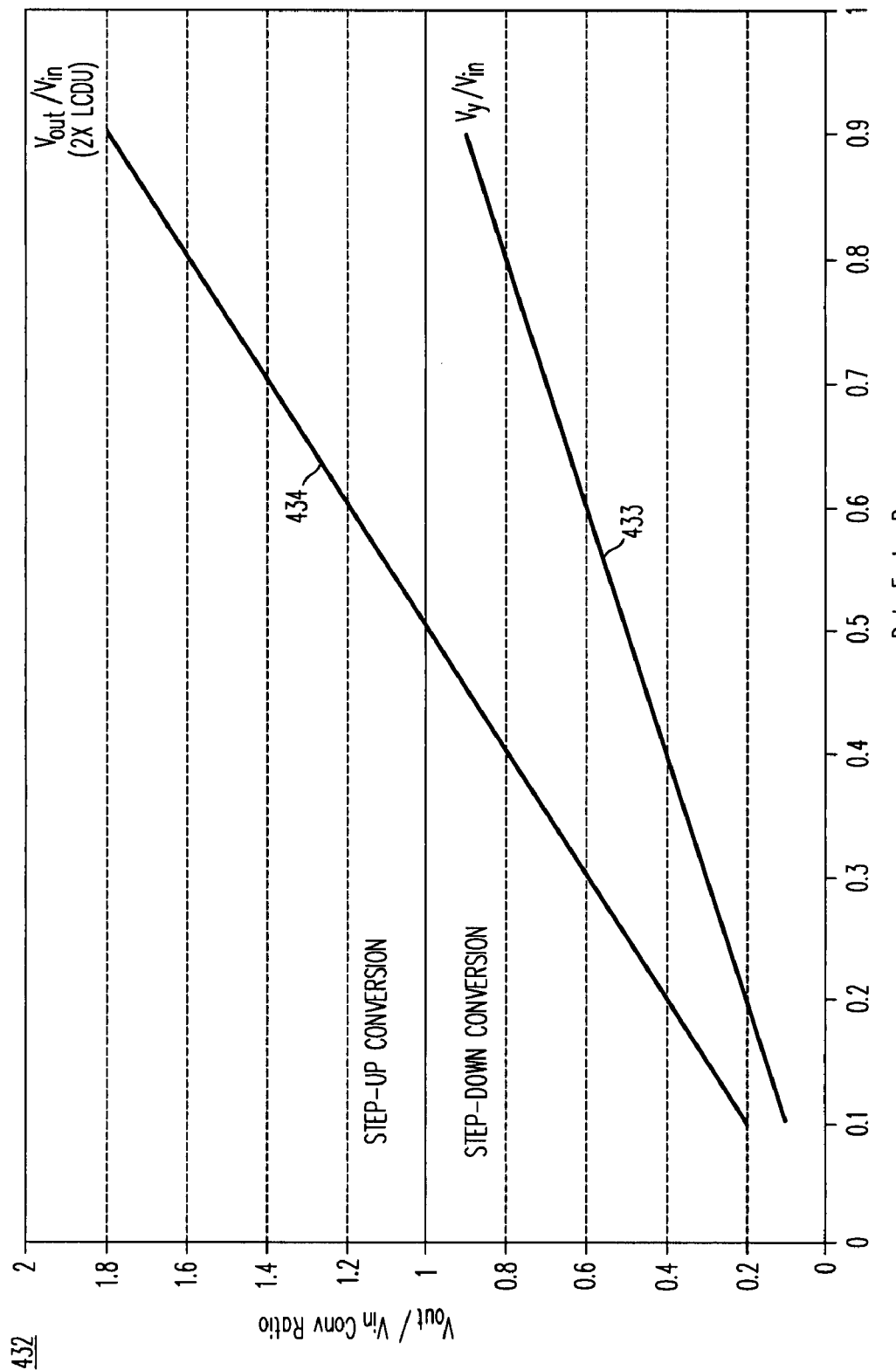
FIG. 15C is a graph showing the voltage conversion ratio as a function of the duty factor for a 2×LCDU converter of this invention.

The conversion ratio of this 2×-type LCDU converter voltage is illustrated by the dashed line in FIG. 15B and by line 434 in FIG. 15C. In FIG. 15B the dashed curve varies above and below unity, having a magnitude ranging roughly between 0.67 to over 1.5. At point 430, i.e. where $V_{in}$=3.3V, the voltage conversion ratio is unity, and the converter is operating at the edge between step-up and step-down conversion. Notice that the LCDU converter 400 passes through this unity conversion condition without ever changing operating modes.

Further analyzing the 2×-type LCDU converter, graph 432 of FIG. 15C illustrates that the voltage conversion ratio of converter 400 is linearly dependent on its duty factor D, shown by line 434, having twice the slope of line 433 describing only the output to input ratio of pre-regulator 401. While theoretically the converter is able to regulate output voltages ratios from zero to twice the input voltage, operation below 10% and above 90% duty factors is complicated by the need for narrow on or off pulses which are difficult to control. Instead, even by limiting the converter to duty factors ranging from 10% to 90%, the output voltage of the 2×LCDU converter covers a wide range, from a minimum step-down factor 0.2 times the input to a maximum step-up factor 1.8 times the input—a voltage conversion range twice that of a Buck converter.

At a unity conversion ratio of converter 400, the duty factor of the pre-regulator 401 is only 50%. At only a 50% duty factor, a switching converter can easily be implemented for operation at high frequencies without being limited by problematic extremes in duty factor suffered by conventional Buck, boost, and Buck-boost converter topologies.

Operation of the LCDX converter 400 for other factors of n is considered below. An LCDU regulator containing a doubling or 2×-type post-converter is included here as an example.

Controlling $V_y$ for Maximum Converter Efficiency

The overall efficiency of the LCDX converter 400 can also be estimated using behavioral model 420 shown in FIG. 15B. For pre-regulator 401, input power is given by $P_{in1} = I_{in} \cdot V_{in}$ while $P_{out1} = I_y \cdot V_y$. The efficiency of the pre-regulator 401 can then be expressed as $$\eta_1 = \frac{P_{out1}}{P_{in1}} = \frac{I_y \cdot V_y}{I_{in} \cdot V_{in}}$$

Figure 15D:
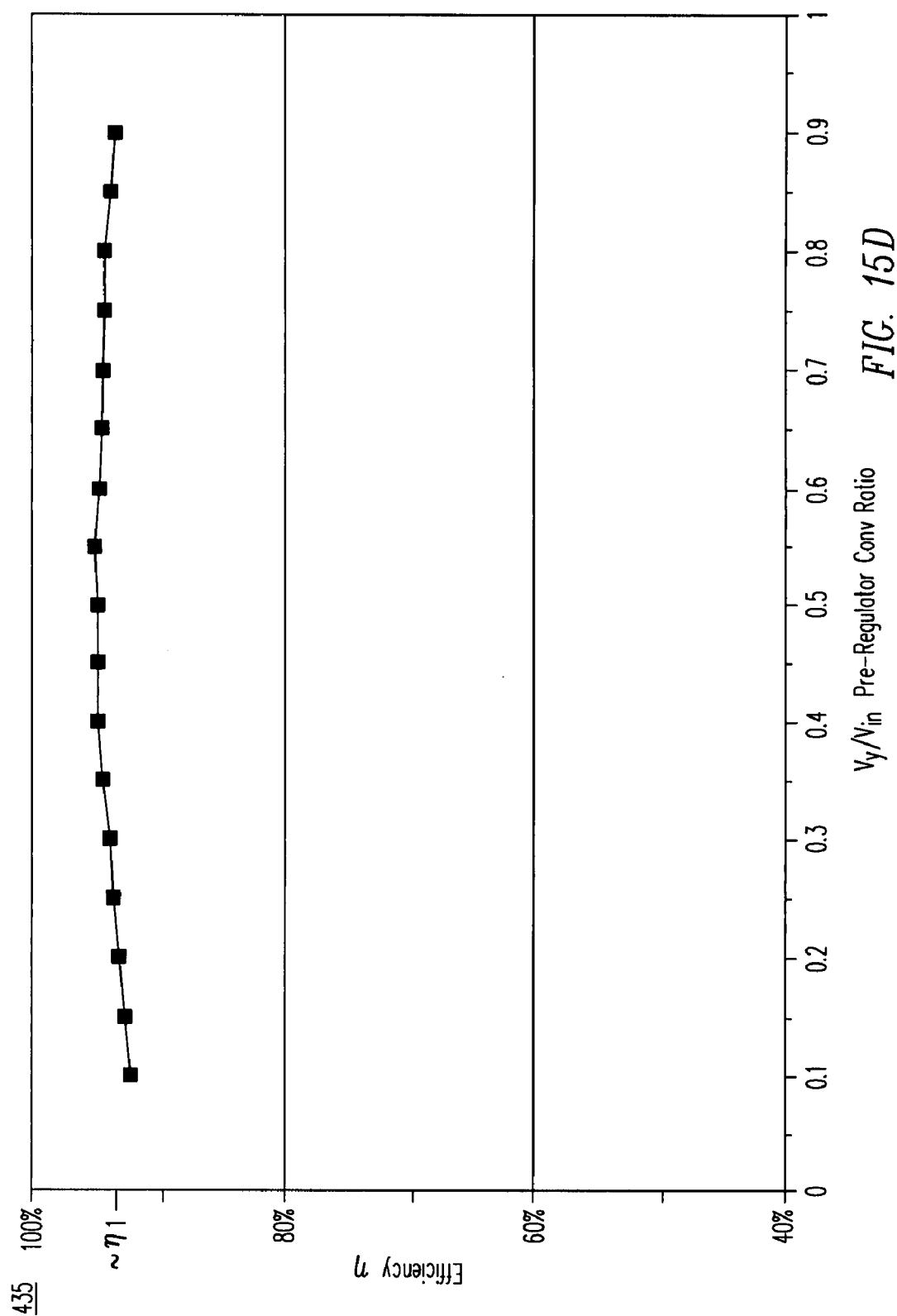
FIG. 15D is a graph showing the efficiency of the LCDU converter as a function of the pre-regulator voltage conversion ratio $V_y/V_{in}$.

FIG. 15D illustrates that the efficiency $\eta_1$ of pre-regulator 401 is relatively constant and independent of its voltage conversion ratio $V_y/V_{in}$. Typical values range from 96% to 90%, depending on operating conditions, power MOSFET resistance and operating currents.

The post-converter 402, including charge pump 408, typically has a maximum efficiency in the range of 96% when delivering power to a load operating at its output voltage $V_z$. Since a charge pump is simply a converter and not a regulator, an analysis of its efficiency must consider the case when there is a mismatch between its output and the desired voltage needed to power an electrical load. Specifically, if for any reason, the output $V_z$ of post-converter 402 is different from the desired output voltage $V_{out}$ (e.g., if the output voltage is clamped by the load), the voltage error $\Delta V = V_z - V_{out}$ is no longer negligible and an additional loss of efficiency will result. This $\Delta V$ mismatch results in a loss that has the same mathematical form $\Delta V/V_{in}$ as the losses in a linear regulator, even though lossy element 424 is not really regulating voltage per se. Specifically the loss may be defined as $$P_{loss\,3} = I_{out} \cdot \Delta V = I_{out}(V_z - V_{out})$$

where $V_z > V_{out}$. The efficiency of the third stage, related to the lossy component, is then given by $$\eta_3 = \frac{P_{out}}{P_z} = \frac{P_z - P_{loss3}}{P_z} = \frac{I_{out}(V_z - V_{out})}{I_{out} \cdot V_z} = \frac{V_{out}}{V_z}$$

and where $V_{out} \leq V_z$, i.e. the maximum theoretical efficiency is limited to 100%. From the converter transfer function $V_z = n \cdot V_y$, then $$\eta_3 = \frac{V_{out}}{V_z} = \frac{V_{out}}{nV_y}$$

Together with the internal efficiency of the charge pump 408, post-converter 402 has an efficiency given by $$\eta_{CP} = \eta_2 \eta_3 = \eta_2 \frac{V_{out}}{V_z} = \frac{\eta_2}{n} \frac{V_{out}}{V_y}$$

Figure 15E:
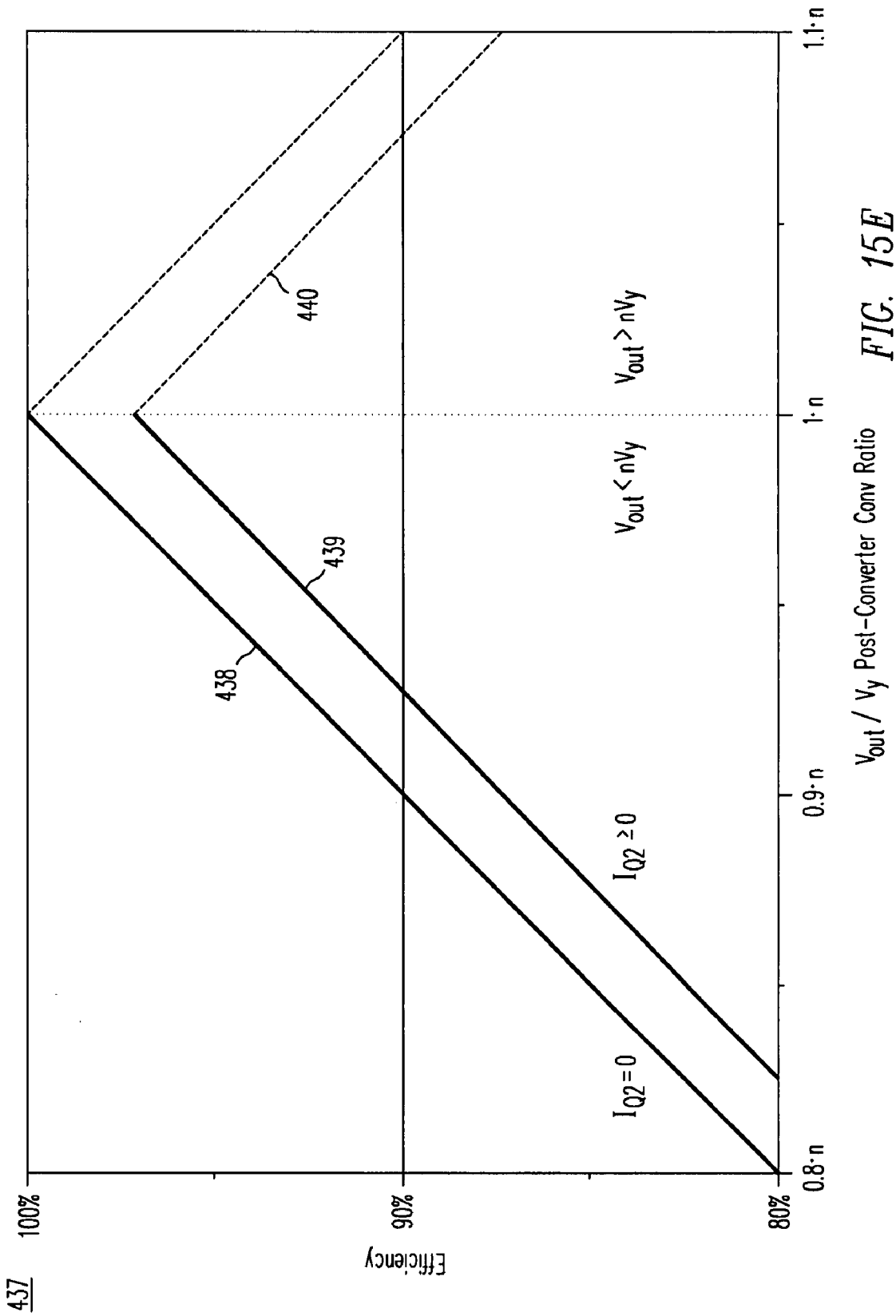
FIG. 15E is a graph showing the efficiency of the up converter as a function of the voltage conversion ratio $V_{out}/V_y$.

This efficiency equation of post-converter 402, including ΔV load mismatch, is illustrated in FIG. 15E, where the post-converter's voltage conversion ratio $V_{out}/V_y$ is plotted against its efficiency $\eta_{CP}$ in graph 437 for both ideal and real quiescent currents shown by curves 438 and 439, respectively. In both cases the efficiency of the post-converter reaches its peak value when $V_{out}/V_y$ equals the conversion ratio "n", i.e. when $V_{out} = n \cdot V_y$.

For example, in a doubler where n=2, the maximum output voltage of the LCDU converter occurs when $V_{out} = 2V_y$. Any deviation in $V_y$ from that condition reduces the LCDU converter's overall efficiency.

In the ideal case (curve 438), quiescent operating current $I_{Q2}$ is substantially zero in the charge pump 408 and its peak theoretical efficiency approaches 100%. In a real charge pump, some energy is lost operating the charge pump, its quiescent current $I_{Q2}$ is not zero and the peak efficiency is limited to less than 100%, specifically to some value $\eta_2$, typically 95 to 97% as shown by curve 439.

Since the charge pump 408 cannot produce an output voltage greater than "n" times its input, the efficiency for $V_{out}/V_y$ ratios above n is not meaningful, but it does describe the shortfall of the charge pump output voltage $V_z$ from meeting the desired output voltage $V_{out}$. The curve shown as dashed line 440 is symmetrical with curve 439 about the condition $V_{out}/V_y = n$. It is included here for completeness.

From the converter transfer function $V_z = n \cdot V_y = n \cdot D \cdot V_{in}$, the efficiency can be re-expressed in terms of duty factor D rather than in terms of the intermediate voltage $V_y$. Accordingly the efficiency impact of the ΔV mismatch can be described as $$\eta_3 = \frac{V_{out}}{V_z} = \frac{V_{out}}{nDV_{in}}$$

and the efficiency of charge pump 408 can be described as $$\eta_{CP} = \eta_2 \eta_3 = \eta_2 \frac{V_{out}}{V_z} = \frac{\eta_2}{nD} \frac{V_{out}}{V_{in}}$$

The total efficiency of LCDX converter 400 is then the product of the individual efficiencies, i.e.

$$\eta = \eta_1 \cdot \eta_2 \cdot \eta_3 = \left(\eta_1 \cdot \eta_2 \frac{1}{nD}\right) \frac{V_{out}}{V_{in}}$$

Figure 15F:
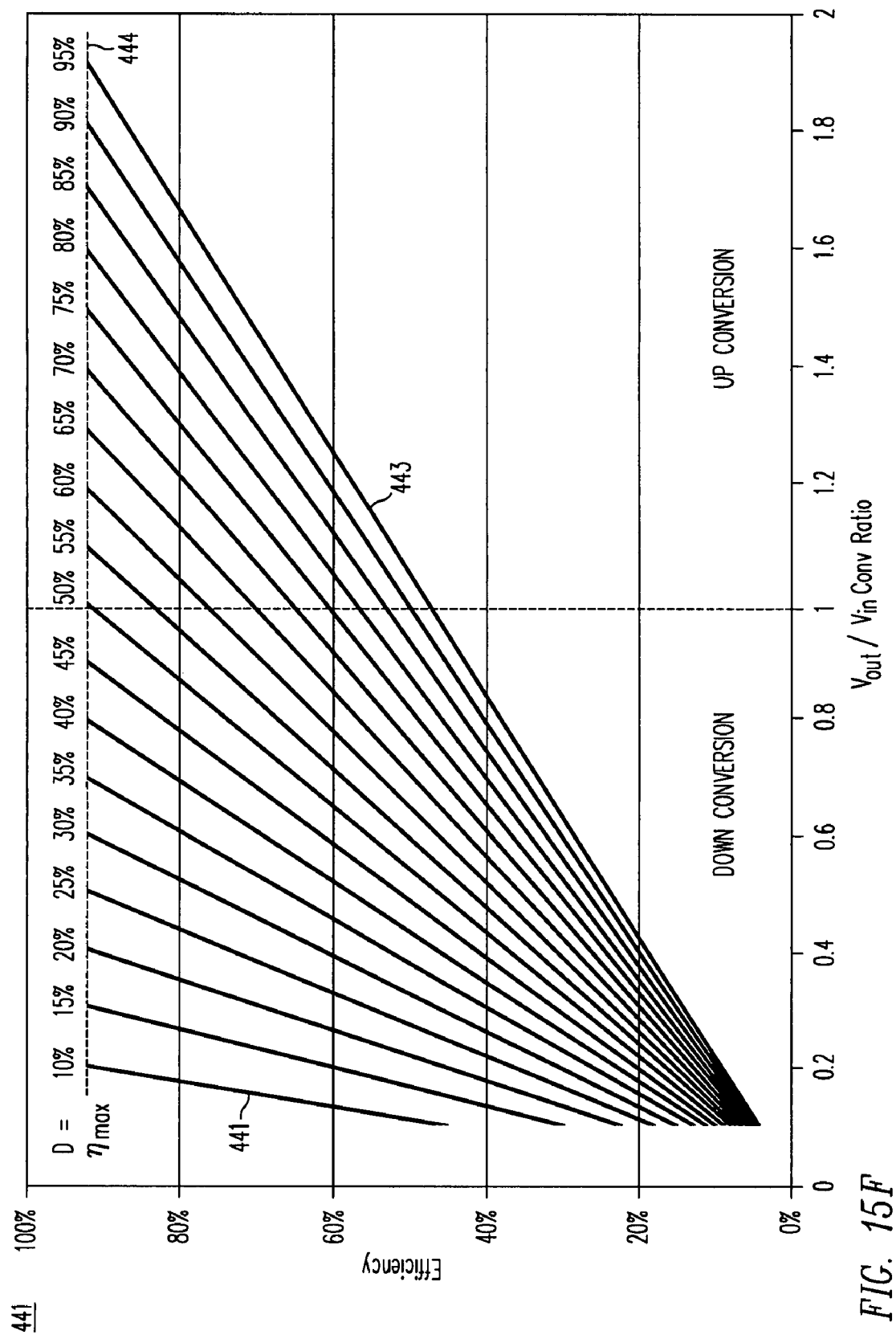
FIG. 15F is a graph showing the overall efficiency of the converter as a function of the conversion ratio of $V_{out}/V_{in}$.

This overall efficiency of a 2×-type LCDU regulator is plotted in FIG. 15F, for a variety of duty factors, revealing that the peak efficiency occurs when D=50% and n·D=1.

Figure 15G:
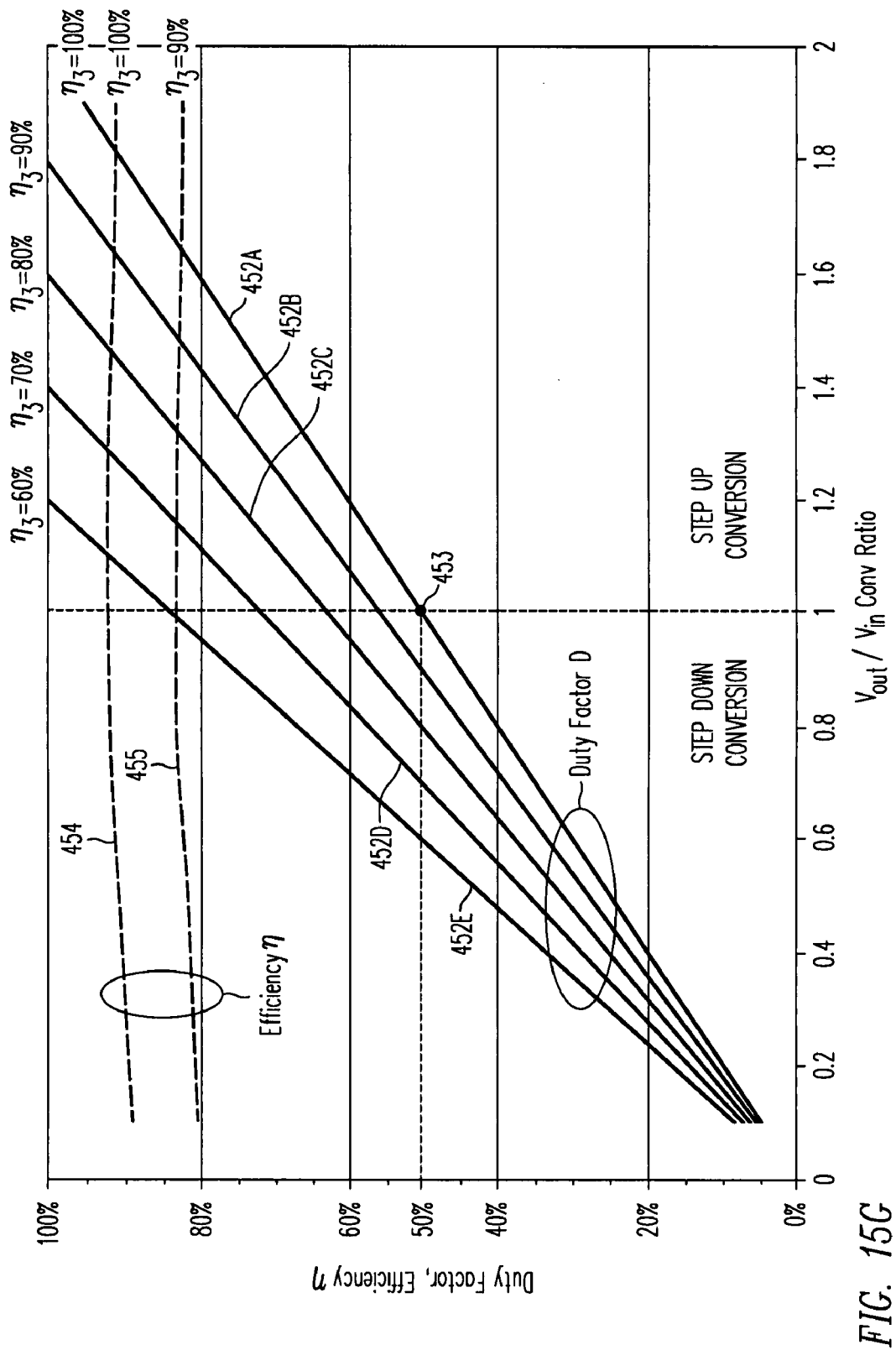
FIG. 15G is a graph showing the efficiency of the converter as a function of the duty factor and voltage conversion ratio.

FIG. 15G illustrates the same expression plotted as duty factor D versus the $V_{out}/V_{in}$ voltage conversion ratio for lines of constant $\eta_3$ efficiency. As shown, lines 452A through 452E represent the duty factor dependence for $\eta_3$ efficiencies of 100%, 90%, 80%, 70% and 60% respectively. Specifically, line 452 describes the duty factor where the 2×LCDU converter exhibits maximum efficiency for any given $V_{out}/V_{in}$ conversion ratio. For example, point 453 indicates that the maximum efficiency occurs when D=50% for a unity transfer characteristic, i.e. when $V_{out} = V_{in}$. The optimum duty factor D is over 50% for step-up conversion, and below 50% for step-down conversion.

The overall efficiency of the converter is the product of $\eta_1 \cdot \eta_2 \cdot \eta_3$, where $\eta_1$ represents the efficiency of switched-inductor pre-regulator 401, $\eta_2$ represents the efficiency of switched-capacitor post-converter 402, and $\eta_3$ accounts for a mismatch between the output $V_z$ of converter 400 and the desired output voltage $V_{out}$. Even when $V_{out} = V_z$ and $\eta_3 = 100\%$, the maximum converter efficiency is limited to $\eta_1 \cdot \eta_2$ and cannot reach a 100% efficiency. Typically, $\eta_1$ is in the ninety percentile range, and an optimized charge pump can exhibit a nearly constant $\eta_2 = 97\%$. The converter's total efficiency, i.e. the $\eta_1 \cdot \eta_2 \cdot \eta_3$ product, is shown by curve 454 for $\eta_3 = 100\%$. As predicted, for each $V_{out}/V_{in}$ voltage conversion ratio a single duty factor D exists that optimizes the efficiency of the LCDU converter.

If for some reason it was determined to drive the output $V_z$ of converter 400 slightly above the desired output $V_{out}$, i.e. where $V_z > V_{out}$, then the $\eta_3$ efficiency and the total converter efficiency $\eta$ will suffer. This condition is illustrated for $\eta_3 = 90\%$ by a duty factor curve 452B and a corresponding efficiency curve 455.

Figure 15H:
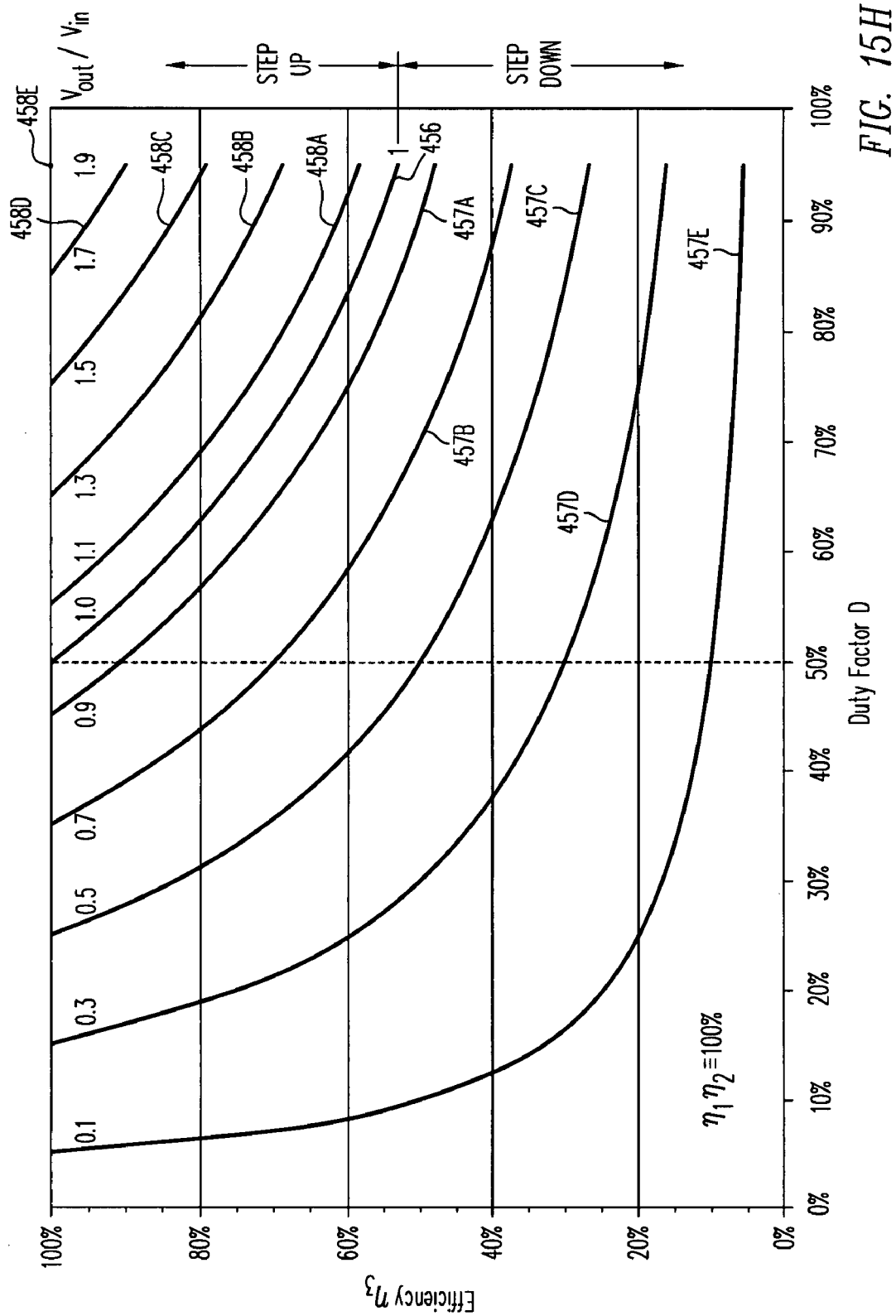
FIG. 15H is a graph of the efficiency of an idealized 2×-type LCDU converter as a function of the duty factor for various voltage conversion ratios.

FIG. 15H is a plot of the efficiency of an LCDU converter containing a 2×-type post-converter as a function of the duty factor D and the voltage conversion ratio $V_{out}/V_{in}$, assuming $\eta_1 \cdot \eta_2 = 100\%$. Curve 456 illustrates the efficiency at unity conversion, i.e. where $V_{out} = V_{in}$. Curve 456 also illustrates that the 2×LCDU converter reaches its peak efficiency at D=50% and for duty factors above 50% the efficiency declines hyperbolically, indicating the converter is producing a higher voltage than required, resulting in a ΔV mismatch between the converter and the desired load voltage, i.e. where $\Delta V = \{V_z - V_{out}\} > 0$.

Curves 457A through 457E describe the duty factor dependence of overall efficiency at $V_{out}/V_{in}$ conversion ratios of 0.9, 0.7, 0.5, 0.3 and 0.1, respectively. Like the case at a unity conversion ratio, increased duty factors result in declining efficiency, meaning the output of the converter is higher than required. Similarly, curves 458A through 458E describe the overall efficiency at $V_{out}/V_{in}$ conversion ratios of 1.1, 1.3, 1.5, 1.7 and 1.9 respectively. Notice for curve 458E, only a single point remains where the pre-regulator exhibits a duty factor D=95%, and a conversion ratio of 1.9 results.

Clearly it is important that the converter maintains operation in its high efficiency region of operation by controlling the duty factor D through the use of feedback control techniques, specifically to maintain an adequate but not excessive duty factor. Without feedback, open loop operation could easily suffer loss of efficiency as well as degraded regulation. Insufficient duty factors result in an output voltage that is too low; when the duty factor is too high, the efficiency is degraded.

Figure 15I:
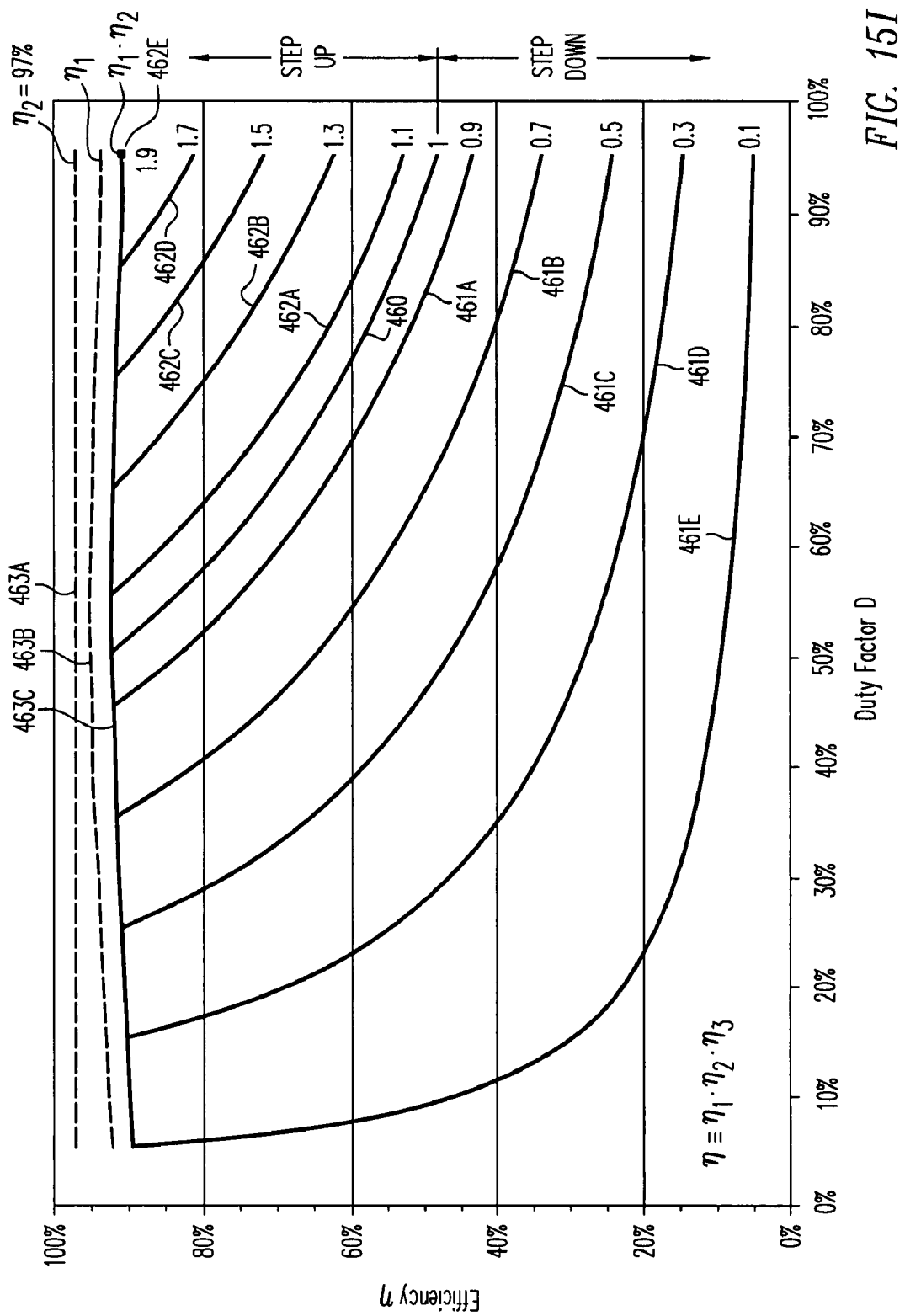
FIG. 15I is a graph of the efficiency of a non-idealized 2×-type LCDU converter as a function of the duty factor for various voltage conversion ratios.

Real efficiencies are lower than the curves shown in FIG. 15H because $\eta_1 \cdot \eta_2 < 100\%$, i.e. in reality, some power is lost in the switched-inductor pre-regulator 401 and in the switched-capacitor post-converter 402. These effects are included in the graph of FIG. 15I, where the maximum efficiency 463C, the product of $\eta_1 \cdot \eta_2$, is shown together with a semi-constant $\eta_2$ curve 463A and a $\eta_1$ curve 463B, showing a slight dependence on duty factor D. As in the prior graph, the greatest deviation from the maximum efficiency occurs from excessive duty factors, over-pumping the converter's output $V_z$ in excess of the desired voltage $V_{out}$.

As shown, curve 460 illustrates the unity transfer characteristic where $V_{out}=V_{in}$. Below this line, curves 461A through 461E describe step-down conversion for voltage conversion ratios of 0.9, 0.7, 0.5, 0.3 and 0.1 respectively. Above curve 460, curves 462A through 462E describe a step-up converter with output-to-input voltage ratios of 1.1, 1.3, 1.5, 1.7 and 1.9 respectively. The 2× type LCDU converter cannot exceed a step up ratio of 2, and in practice should not be used above step up ratios of 1.8 to 1.9 to avoid narrow pulses.

Properly controlled, the switching LCDU regulator of this invention can produce a well regulated output in either step-up or step-down modes without exhibiting any mode changes, narrow pulse, or dropout effects near unity voltage conversion ratios, i.e. when $V_{out} \approx V_{in}$. The LCDU regulator is able to operate over a range of output to input voltage ratios far beyond that of a Buck converter, boost converter or charge pump. Assuming a practical limitation on duty factor ranges between 10% and 90%, Table 2 compares the usable range of voltage conversion ratios of the LCDU regulator to those of a charge pump doubler, Buck converter, and boost converter.

TABLE 2

| Converter Topology | Range of $V_{out}/V_{in}$ | Range of Efficiency | Unity Ratio Efficiency |
| --- | --- | --- | --- |
| 2X Charge Pump | 0.1 to 0.9 | Above 1.8 | Poor, $\eta < 50\%$ |
| Boost Converter | 1.1 to 15 | Good up to ~4 | Dropout above 0.9 |
| Buck Converter | 0.1 to 0.9 | Good over range | Dropout below 1.1 |
| 2X LCDU | 0.1 to 1.9 | Good over range | Good, $\eta > 90\%$ |

Figure 16:
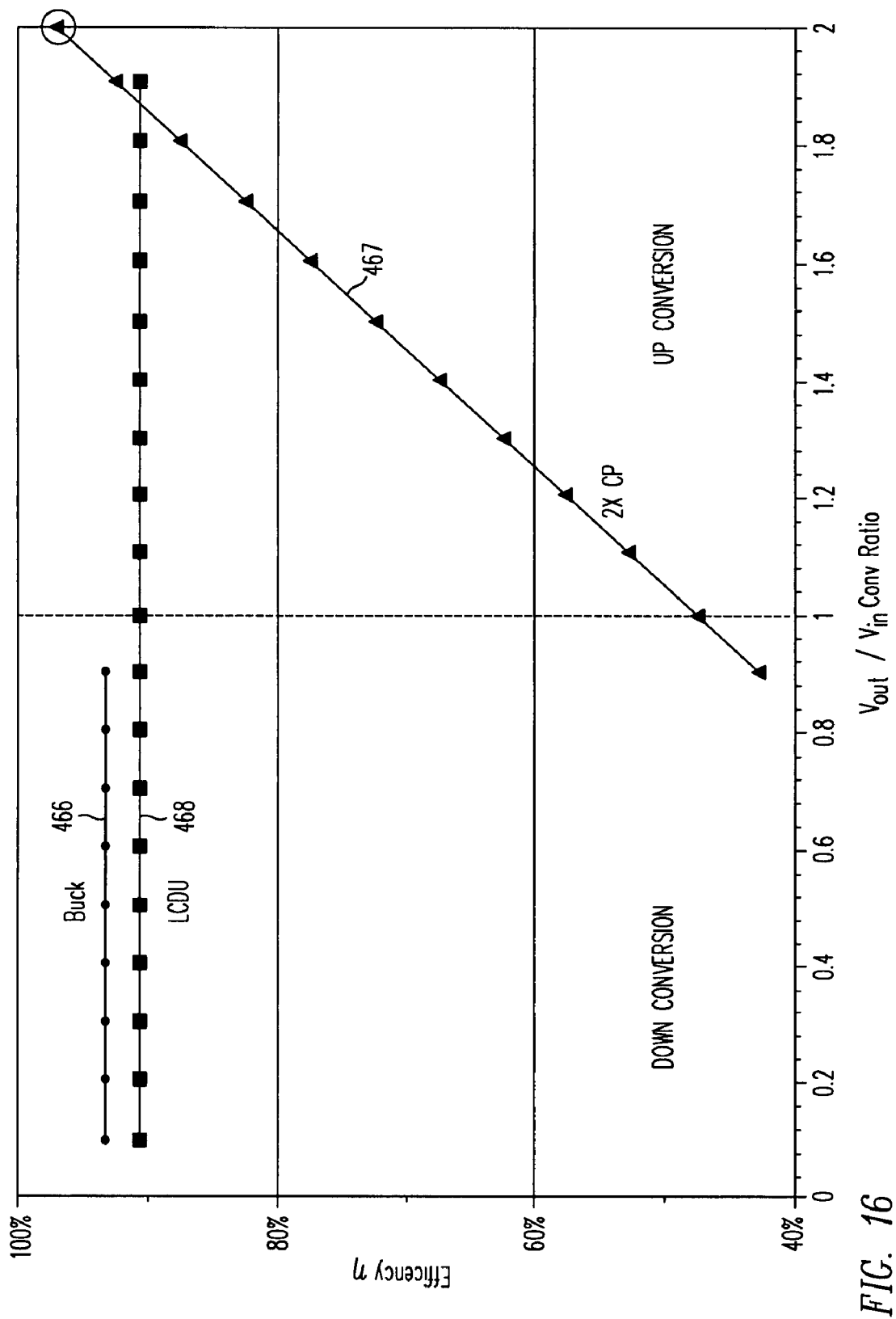
FIG. 16 is a graph comparing the efficiency of Buck, CP and switched LCDU converters as a function of voltage conversion ratio.

As shown in FIG. 16, despite its high efficiency characteristic 466, a Buck converter operating at a 10% to 90% duty factor is only capable of step-down conversion ratios, i.e. where $V_{out}=\{0.1V_{in}$ to $0.9V_{in}\}$. Conversely, the efficiency of a 2× charge pump (curve 467) is high only for conversion ratios exceeding 1.8. In contrast, the efficiency of an LCDU converter (curve 468) is high over a wide range of voltage conversion ratios, i.e. where $V_{out}=\{0.1V_{in}$ to $1.9V_{in}\}$. This result is unexpected, considering that the LCDU regulator combines elements of the charge pump and the Buck converter, yet regulates over a much wider range of operating conditions than either of them.

Figure 17:
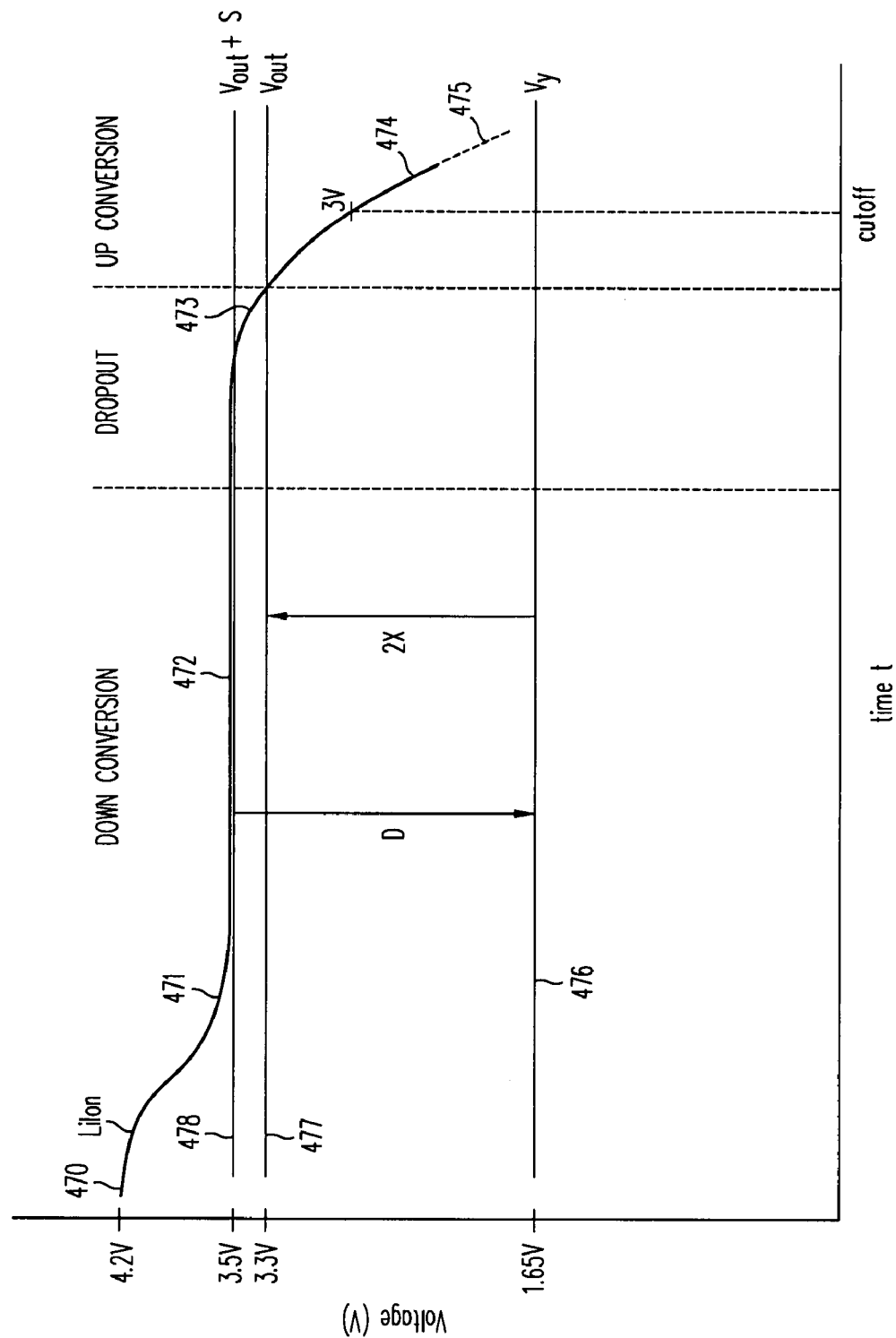
FIG. 17 is a graph showing the input voltage, intermediate voltage Vy, and output voltage of a switched LCDU regulating converter during the discharge of single-cell LiIon battery.

An example of a switched LCDU regulating converter in operation is illustrated in FIG. 17, where the voltage of a single-cell LiIon battery is used to generate a regulated a 3.3V output during the entire battery discharge cycle. After charging, the cell voltage starts at 4.2V and then decays during interval 471 to around 3.5V to 3.6V, where the voltage remains during most of the discharge cycle (curve 472). Later, curve 473 illustrates that the battery voltage decays below 3.5V into a range $\{V_{out} < V_{batt} < (V_{out}+\delta)\}$ between lines 477 and 478, a condition where a normal converter would suffer dropout or mode switching problems. Finally in the region represented by curve 474, the battery voltage is well below the 3.3V output of the converter. Only specialized LiIon batteries 475 can operate down to 2.7V without growing crystallites that short out the cell.

Regardless of the LiIon cell voltage, the LCDU converter steps the battery voltage down by duty factor D to a constant pre-regulated voltage $V_y$ shown by curve 476, then steps the voltage back up by 2× in the charge pump post-converter to produce a regulated 3.3V output $V_{out}$ (curve 477). The converter's condition can be described as shown in Table 3:

TABLE 3

| Phase | Up/Down | $V_{batt}$ | D | $V_y$ | nX | $V_{out}$ | $V_{out}/V_{in}$ |
| --- | --- | --- | --- | --- | --- | --- | --- |
| 470. Full charge | Down | 4.2 V | 39% | 1.65 V | 2X | 3.3 V | 0.52 |
| 471. Decay | Down | 3.6 V | 46% | 1.65 V | 2X | 3.3 V | 0.92 |
| 472. Plateau | Down | 3.5 V | 47% | 1.65 V | 2X | 3.3 V | 0.94 |
| 473. $V_{batt} \approx V_{out}$ | Unity | 3.3 V | 50% | 1.65 V | 2X | 3.3 V | 1.00 |
| 474. Discharged | Up | 3.0 V | 55% | 1.65 V | 2X | 3.3 V | 1.10 |
| 475. Extend Range | Up | 2.7 V | 61% | 1.65 V | 2X | 3.3 V | 1.22 |

One common application using a single cell LiIon battery and requiring a 3.3V regulated supply is a cell phone. No present day regulator is able to operate with high efficiency over the battery's entire voltage range. Handset designers today must employ step-down-only Buck regulators that cut off around 3.5V, thereby throwing away the battery life in discharge phases 475, 474, 473 and a portion of voltage-plateau-phase 472, because the added use-life of these later phases of discharge is completely compensated by the efficiency loss of a conventional Buck-boost converter.

Switched-Inductor-Capacitor Down-Up (2×LCDU) Regulating Converters

Figure 18:
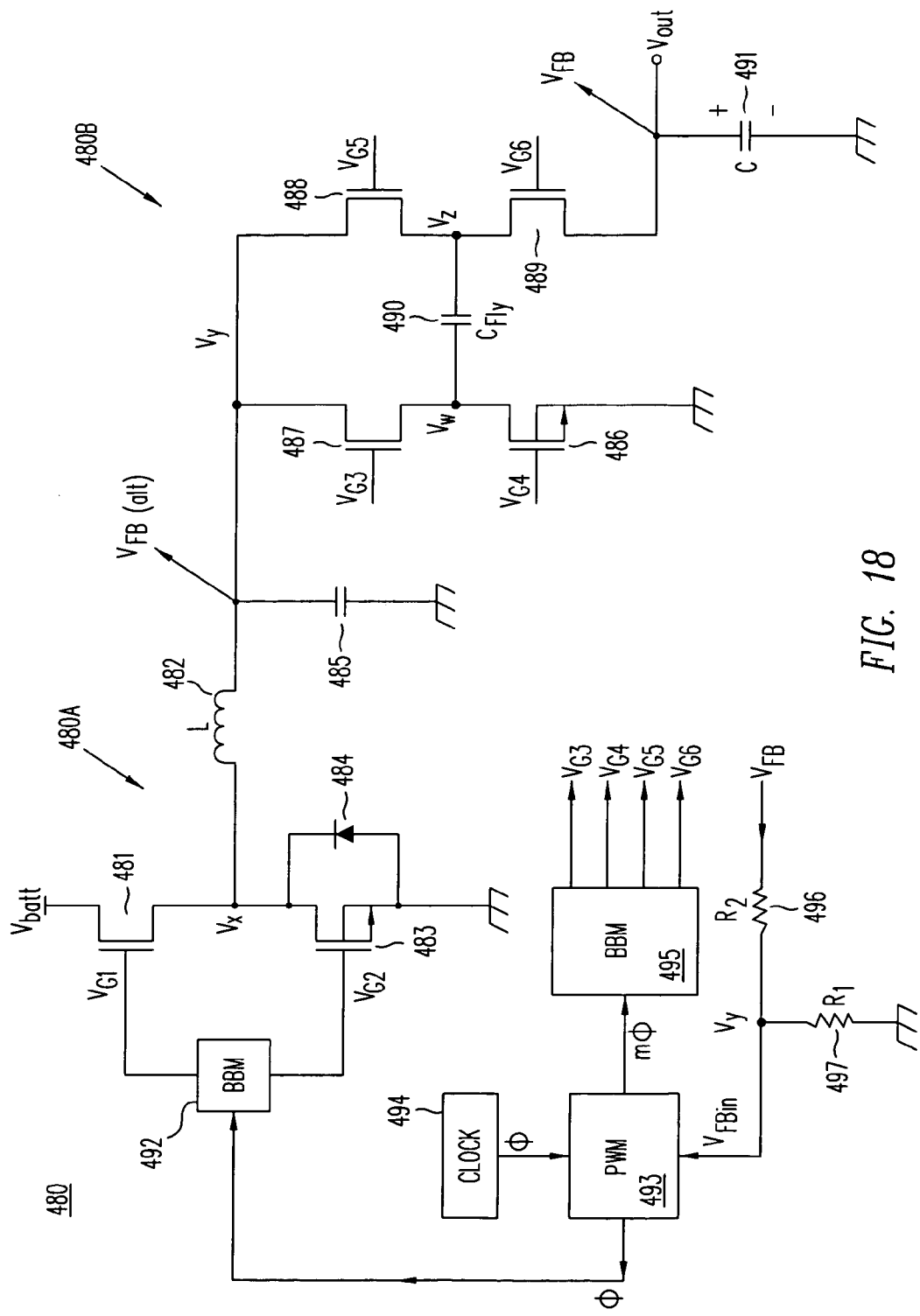
FIG. 18 is a schematic circuit diagram of a doubler-type switched LCDU regulating converter of this invention.

FIG. 18 illustrates a schematic circuit diagram of a doubler-type switched LCDU regulating converter 480.

As shown, the LCDU switching converter 480 includes a high-side power MOSFET 481, a low-side N-channel synchronous rectifier 483 with an intrinsic P-N diode 484 and an inductor 482. These elements are included in a pre-regulator 480A, converting an input voltage $V_{batt}$ to an intermediate voltage $V_y$. The voltage $V_y$ across an optional filter capacitor 485 forms the input to a 2×-type charge pump post-converter 480B, comprising power MOSFETs 486, 487, 488 and 489 together sequentially charging and discharging a flying capacitor 490 from pre-regulator 480A into an output filter capacitor 491.

High-side configured power MOSFETs 481, 487, and 488, along with floating power MOSFET 489 may be either N-channel or P-channel devices, with appropriate changes in the gate drive signal and gate buffer circuitry. Low-side power MOSFETs 483 and 486 are preferably implemented as N-channel devices. Output voltage $V_{out}$ is used as a feedback signal $V_{FB}$, scaled by level shift resistors 496 and 497 to produce a voltage as a control input to an error amplifier within PWM controller 493. This control voltage is chosen to force the output of the pre-regulator 480A to an intermediate voltage $V_y$ having a magnitude equal to one-half of the magnitude of the output voltage $V_{out}$.

PWM controller 493, synchronized to a clock and ramp generator circuit 494, switches at a clock frequency (and drives a break-before-make (BBM) buffer 492 at the same frequency. BBM buffer 492 drives high-side MOSFET 481 and synchronous rectifier MOSFET 483 out of phase with gate biases $V_{G1}$ and $V_{G2}$ to prevent shoot-through conduction. The polarity of $V_{G1}$ is positive with respect to the source of MOSFET 481 if MOSFET 481 is an N-channel device, and negative if MOSFET 481 is a P-channel device. Synchronous rectifier MOSFET 483 is controlled to conduct all or some portion of the time when MOSFET 481 is off, but never to conduct significant current when MOSFET 481 is on.

The clock signal controlling PWM controller 493 also controls BBM buffer 495, producing gate signals $V_{GS3}$, $V_{GS4}$, $V_{GS5}$ and $V_{GS6}$ to control the sequenced switching of charge pump MOSFETs 487, 486, 488, and 489, respectively. These MOSFETs conduct in diagonal fashion, with MOSFETs 488 and 486 conducting while MOSFETs 487 and 489 are off so as to charge capacitor 490; and then MOSFETs 487 and 489 conducting while MOSFETs 486 and 488 are off so as to discharge capacitor 490 by transferring its charge onto reservoir capacitor 491. BBM buffer 495 prevents shoot-through conduction between MOSFETs 487 and 486, and also between MOSFETs 488 and 489.

The MOSFETs in post-converter 480B may be switched synchronously to those in pre-regulator 480A at the frequency Φ or at some higher multiple of the clock frequency, i.e. mΦ, or alternatively at a frequency independent of the clock frequency used to switch MOSFETs 481 and 483 in pre-regulator 480A. In a preferred embodiment, all of the power MOSFETs in pre-regulator 480A and charge pump post-converter 480B are switched in synchronous fashion whereby filter capacitor 485 can be made small or may be eliminated. In contrast, if the clock frequency used to switch charge pump post-converter 480B is independent of the clock frequency used to switch pre-regulator 480A, capacitor 485 is required to temporarily store energy needed to support momentary load and line transients.

Figure 19A:
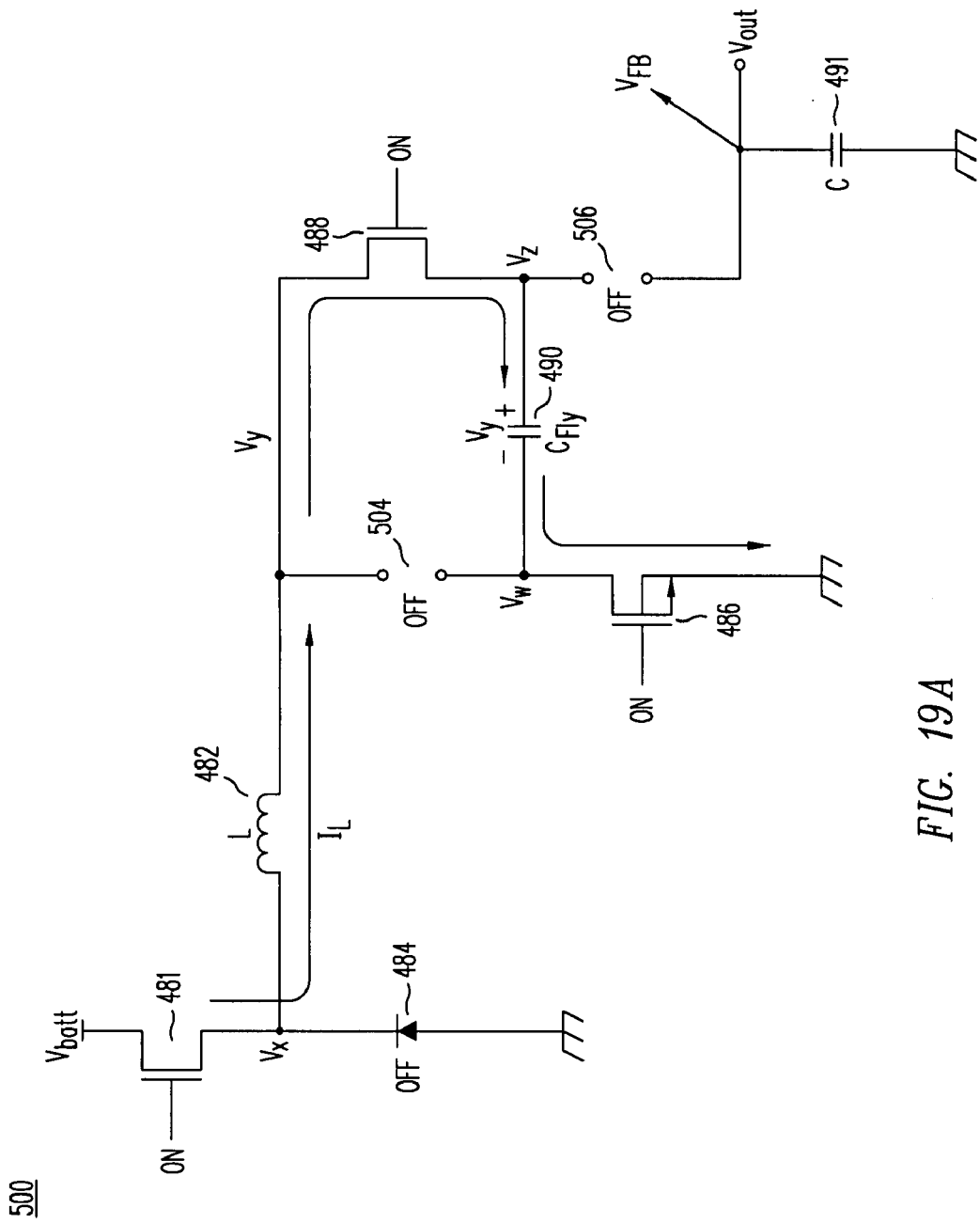
FIG. 19A is a circuit diagram illustrating the operation of a switched LCDU regulating converter during the magnetizing-charging stage.
Figure 19B:
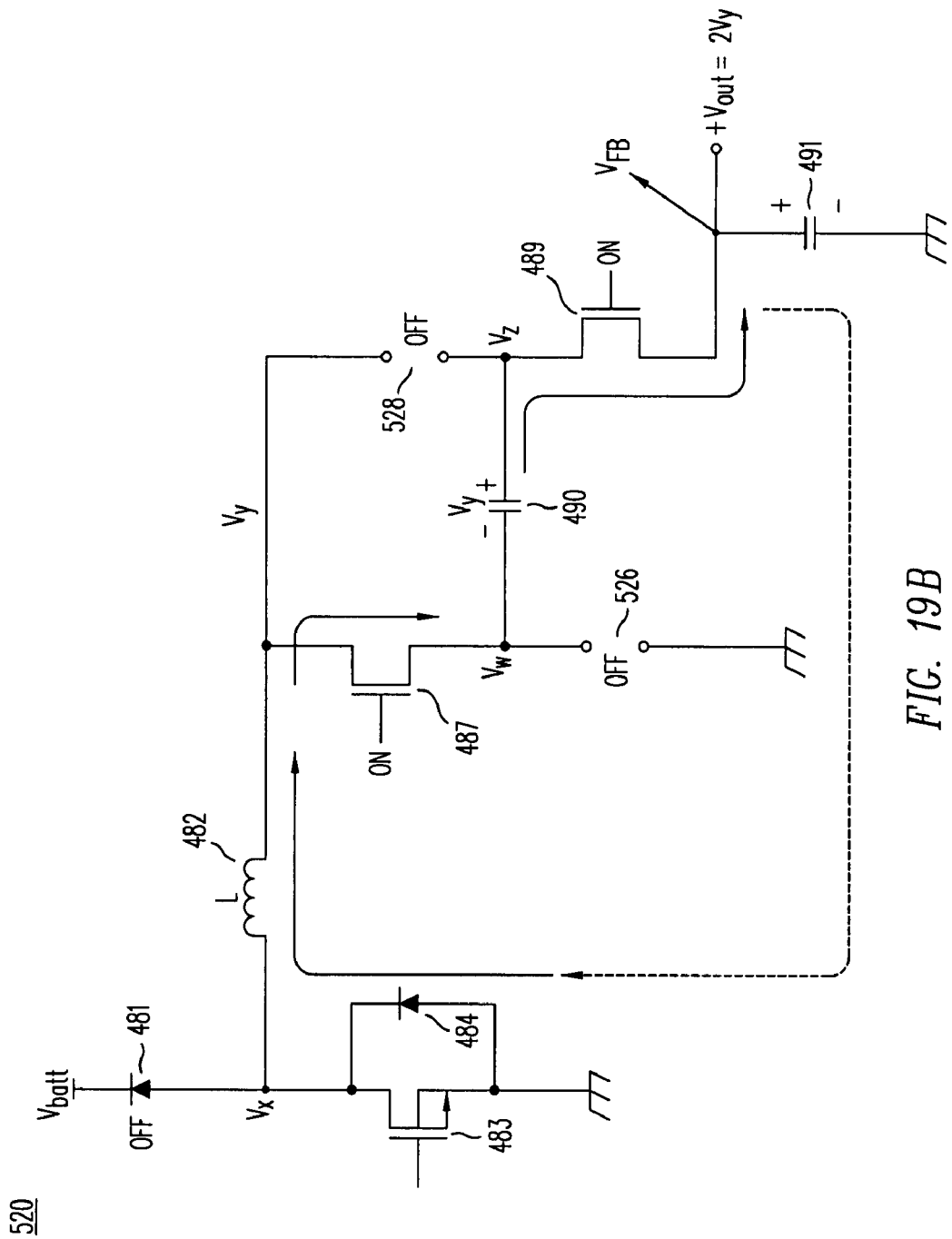
FIG. 19B is a circuit diagram illustrating the operation of a switched LCDU regulating converter during the recirculating-transferring stage.

Synchronous operation of the pre-regulator 480A and post-converter 480B in 2×-type LCDU converter 480 is illustrated in FIGS. 19A and 19B. In FIG. 19A schematic diagram 500 represents converter 480 during magnetizing of inductor 482 and the simultaneous charging of flying capacitor 490, with current flowing from $V_{batt}$ through on-state MOSFETs 481, 488 and 486 and during which time $V_x$ is biased to $V_{batt}$, $V_w$ is grounded, $V_z$ is biased to $V_y$, and flying capacitor 490 charges to a voltage +$V_y$. Off MOSFET 483 is represented by reversed bias diode 484. Off MOSFETs 487 and 489 are represented by open circuits 504 and 506 respectively.

In FIG. 19B, schematic diagram 520 represents LCDU converter 480 during the recirculation of current through inductor 482 and the discharge of flying capacitor 490. During this time, an inductive recirculation current flows through forward-biased diode 484, shunted by on-state MOSFET 483, and through MOSFETs 487 and 489, charging output capacitor 491. During recirculation, the voltage $V_x$ is biased near, but slightly below ground, specifically within a diode's forward bias $V_f$ of ground.

By connecting the negative terminal of capacitor 490 to voltage $V_w = V_y$ and its positive terminal to the output, the voltage $V_z$ instantly jumps to $2V_y$, driving the output voltage $V_{out}$ across output capacitor 491. In this state, high-side MOSFET 481 is represented by reverse-biased P-N diode 481. Off MOSFETs 488 and 486 are represented by open circuits 528 and 526.

To summarize the operation of the switched-inductor pre-regulator 480A and switched-capacitor post-converter 480B, a first terminal of the inductor 482 is coupled to a first voltage ($V_{batt}$) during a first time interval and to a second voltage (ground) during a second time interval. During the first time interval, inductor 482 is magnetizing and during the second time interval the current is recirculating through inductor 482. This cycle is repeated, and as a result of the electric characteristics of inductor 482 an intermediate voltage ($V_y$) is produced at a second terminal of inductor 482. The first time interval as a percentage of the total time of each cycle defines the duty factor of pre-regulator 480A. The intermediate voltage $V_y$ is a percentage of $V_{batt}$, which percentage is determined by the duty factor. Normally, the first and second time intervals are separated by a break-before-make (BBM) interval.

As for the charge pump within post-converter 480B, during a third time interval a first terminal of the flying capacitor 490 is coupled to a the intermediate voltage ($V_y$) and a second terminal of capacitor 490 is coupled to a third voltage (ground). During the third time interval, capacitor 490 charges to approximately the intermediate voltage ($V_y$). During a fourth time interval the second terminal of capacitor 490 is coupled to the intermediate voltage ($V_y$) and the first terminal of capacitor 490 is coupled to the output terminal of the charge pump. During the third time interval capacitor 490 is charging, and during the fourth time interval capacitor 490 is discharging. Normally, the third and fourth time intervals are separated by a BBM interval.

Pre-regulator 480A and post-converter 480B can be operated synchronously such that the first and third time intervals overlap and the second and fourth time intervals overlap. If so, the first terminal of inductor 482 is coupled to the first voltage ($V_{batt}$) during all or at least part of the time that the capacitor 490 is charging, and the first terminal of the inductor 482 is coupled to the second voltage (ground) during all or at least part of the time that the capacitor 490 is discharging.

It is understood that in some embodiments there may be additional components (e.g., resistors) in the pre-regulator and/or post-converter. The word "coupled," as used herein, is intended to indicate that the components referenced above may be connected to the voltages specified through the additional components, if any.

Figure 20:
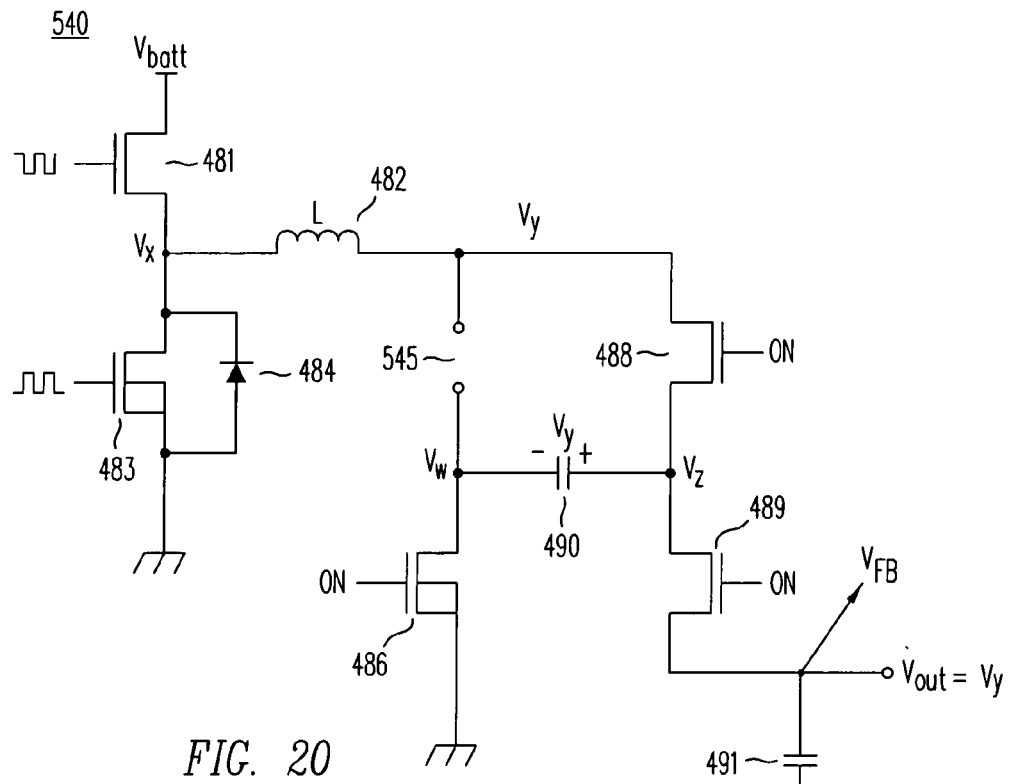
FIG. 20 is a circuit diagram illustrating the operation of a switched LCDU converter in CP-bypass down-only mode.
Figure 21A:
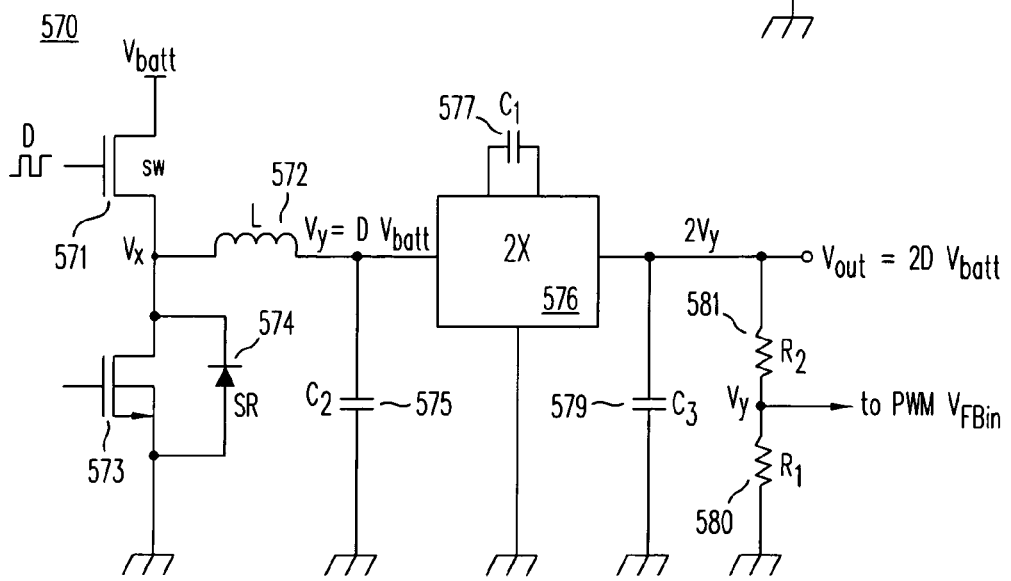
FIG. 21A is a circuit diagram of a doubler type LCDU converter.
Figure 21B:
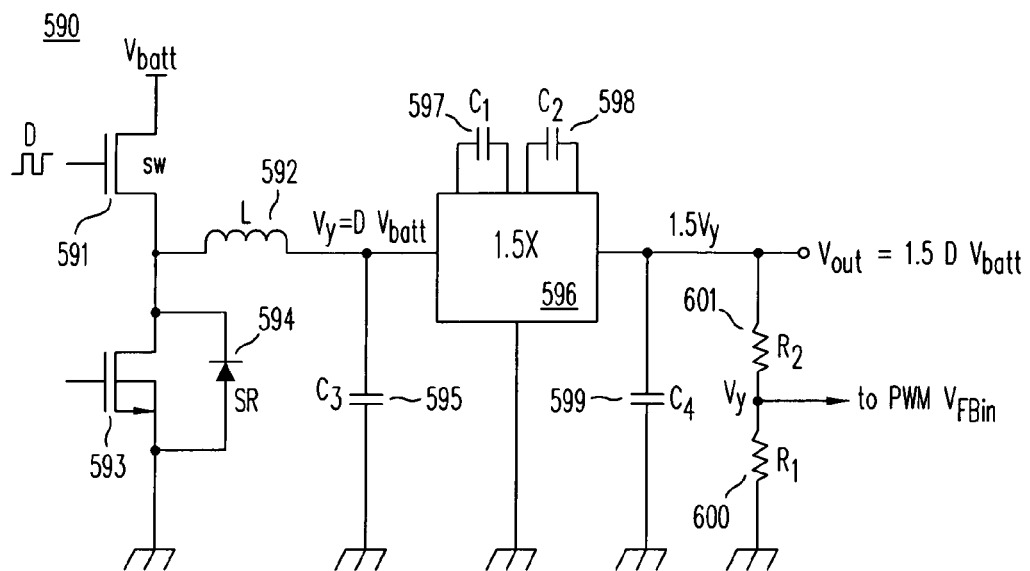
FIG. 21B is a circuit diagram of a fractional type LCDU converter.
Figure 21C:
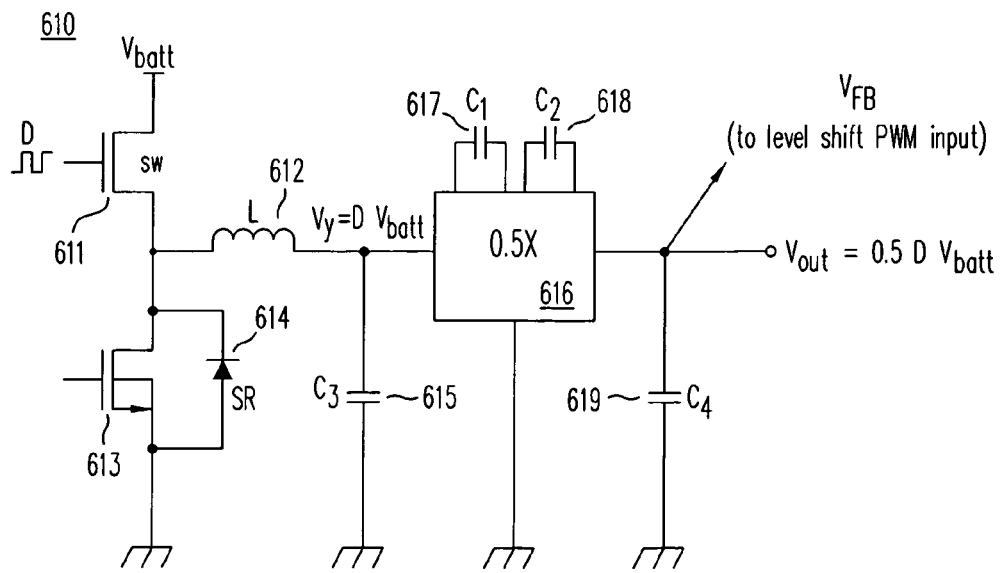
FIG. 21C is a circuit diagram of a fractional type LCDD converter.

In an alternative embodiment shown in schematic diagram 540 of FIG. 20, 2× post-conversion can be eliminated by discontinuing the switching of the charge pump MOSFETs and turning on both MOSFET 488 and 489 so that $V_y \approx V_z \approx V_{out}$, the voltage across output capacitor 491. During this operating condition, MOSFET 487 is biased off, represented here as open circuit 545. With MOSFETs 486 and 488 biased on, $V_w$ is grounded and $V_z$ is connected to $V_y$, pre-charging capacitor 490 to +$V_y$, essentially in parallel with output capacitor 491. MOSFETs 481 and 483 with parallel diode 484 continue to switch under PWM control to regulate the voltage at node $V_y$. This condition may be considered a charge pump bypass mode.

Other LCDX Switching Regulators

As stated previously, an LCDX switching regulator exhibits an output-to-input voltage conversion ratio governed by the equation $$\frac{V_{out}}{V_{in}} = nD$$

where n has discrete, quantized values, e.g., n={2, 1.5, 0.5, −0.5, −1.0}, depending on the number of capacitors and the switch configuration and where D is dynamically adjusted using feedback to maximize the converter's overall efficiency.

Various topologies of LCDX converters of this invention are illustrated in FIGS. 21A-21D, in simplified form. For example, a 2×LCDU converter 570 in FIG. 21A employs a single-capacitor 2×-type charge pump 576 to produce an output given by the relation $V_{out}=2DV_{batt}$, where D is dynamically adjusted through feedback to force the converter to operate at or near its optimum efficiency.

Feedback using a doubler-type charge-pump post-converter requires only a resistor divider comprising resistors 581 and 582 to adjust the signal for the PWM converter's control input. The output voltage $V_{FB}$ is twice the magnitude of the desired voltage $V_y$. The feedback divider may utilize equal size resistors to divide the output signal in half as an input to the PWM controller $V_{FBin}$.

For present purposes, the feedback input voltage $V_{FBin}$ to the PWM controller is defined as the voltage that will cause the PWM controller will try to force $V_y$ to a voltage equal to $V_{out}/2$, i.e. so under closed loop control $V_y \to V_{out}/2$.

The disclosed LCDX family of converters may also utilize a step-up fractional charge pump in place of a doubler. Fractional LCDU converter 590 in FIG. 21B employs a dual-capacitor 1.5×-type charge pump 596 to produce an output given by the relation $V_{out}=1.5DV_{batt}$, where D is dynamically adjusted through feedback to force the converter to operate at or near its optimum efficiency. The feedback from the converter's output to the $V_{FBin}$ pin is scaled, i.e. level shifted, by a network of resistors 600 and 601 so that under closed loop control $V_y \to (V_{out}/1.5)$.

Figure 22:
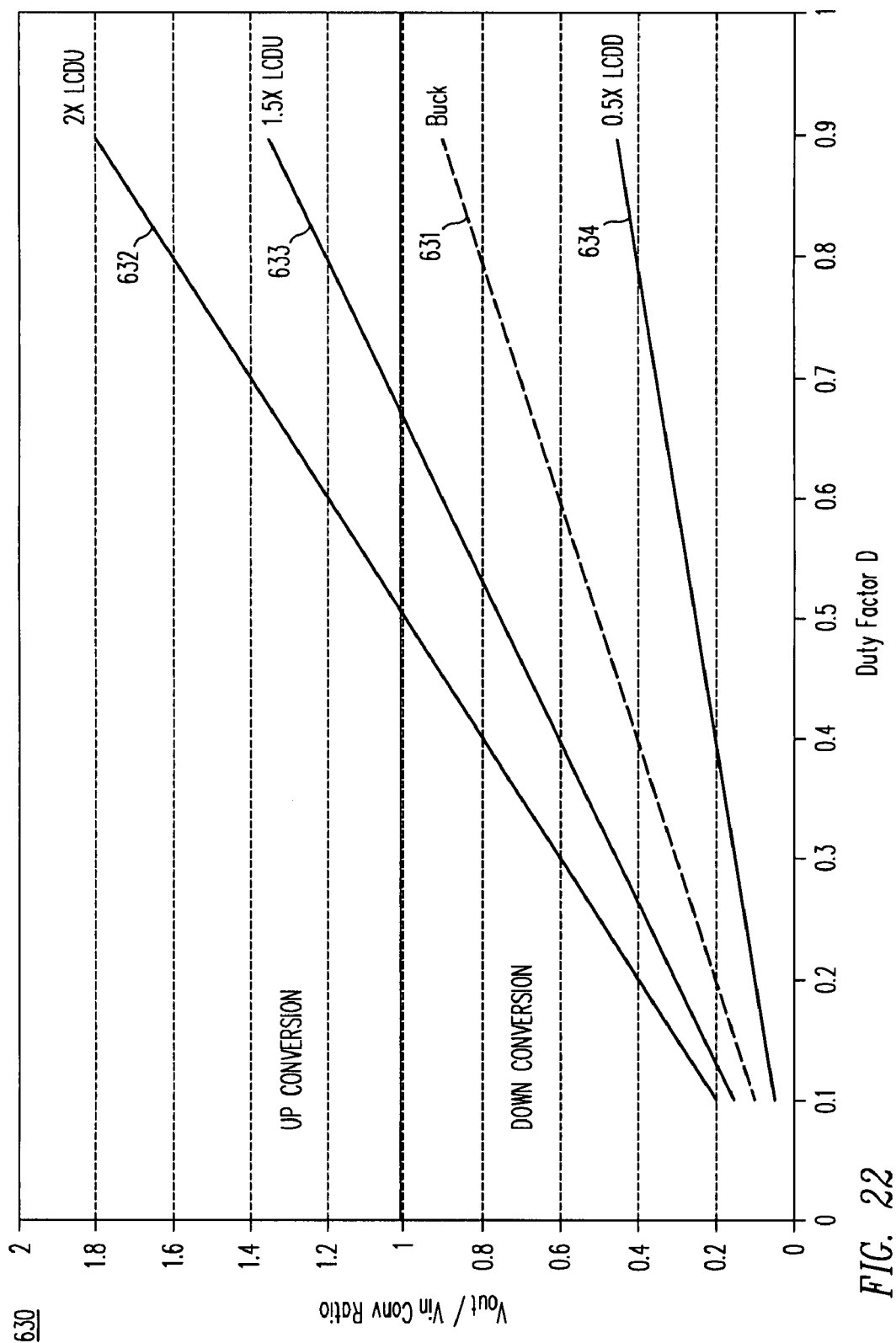
FIG. 22 is a graph showing the voltage conversion ratio as a function of duty factor for various LCDX-type regulating converters.

The relationship between duty factor D and the voltage conversion ratio $V_{out}/V_{in}$ of various LCDX converters is illustrated in graph 630 of FIG. 22, with the characteristics of a 2×-type LCDU converter (curve 632) and a 1.5×-type LCDU converter (curve 633) contrasted with those of a Buck converter (curve 631). While the Buck converter must reach a 100% duty factor to achieve a unity voltage conversion ratio, the 2×-type LCDU converter achieves this condition at 50% duty factor, i.e. at a duty factor of D=1/n where n=2.

It follows that the fractional LCDU converter described by curve 633 where n=1.5 achieves unity conversion at a duty factor of D=⅔ or 67%. At a 50% duty factor its conversion ratio is given by n·D=1.5(50%) so that $V_{out}=0.75V_{in}$. Compared to the 2× type LCDU converter where $V_{out}=V_{in}$ at a 50% duty factor, the 1.5×-type LCDU regulator supplies a lower output voltage at the same duty factor.

At high frequencies, where operation near a 50% duty factor is preferable to avoid narrow pulses, the 1.5×-type LCDU regulator is preferable over the doubler type when delivering lower output voltages. For example delivering a 3.0V output from a LiIon battery charged to 4.2V, a doubler-type LCDU regulator must operate at a 35% duty factor while the 1.5×-type LCDU regulator operates at a 48% duty factor. Operating near a 50% duty factor allows higher-frequency switching than operation at extreme duty factors.

Another version of the LCDX converter utilizes a step-down fractional charge pump, where the output voltage of the charge-pump post-converter is equal to, for example, one-half its input voltage. In such a case, both the pre-regulator and post-converter stages perform a step-down function. The resulting converter can be referred to as a down-down or LCDD switching converter. For example, fractional LCDD converter 610 in FIG. 21C employs a dual-capacitor 0.5×-type charge pump 616 to produce an output given by the relation $V_{out}=0.5DV_{batt}$, where D is dynamically adjusted through feedback to force the converter to operate at or near its optimum efficiency.

The feedback from the converter's output to the $V_{FBin}$ pin is scaled by a level shifting circuit to the desired voltage $V_y$, so that under closed loop control $V_y \to (V_{out}/0.5)$. Since the level shifted feedback signal $V_{FBin}$ may higher than $V_{FB}$, not lower, a level shift circuit containing active transistor devices may be required in place of the passive resistor voltage-divider network of LCDU converters 570 and 590. Examples of active level shift feedback networks are described below.

While 1.5×-type fractional LCDU converter 590 offers similar benefits to 2×-type LCDU converter 570 by performing both step-up and step-down conversion without the need for mode switching and without suffering dropout, the benefit and motivation for 0.5×-type LCDD converter 610 is different. As a step-down only converter it should be compared to the Buck converter in its operating characteristics and not against LCDU down-up converters.

Because of its $V_{out}=0.5DV_{batt}$ transfer characteristic, LCDD converter 610 is able to output a lower voltage at any given duty cycle than an equivalent Buck converter. This characteristic is evidenced by graph 630 in FIG. 22 by comparing curve 634 for the LCDD converter against curve 631 for a Buck converter. For example, at a 50% duty cycle, a 0.5×-type LCDD regulates its output voltage at 25% of its input voltage while a Buck converter's output voltage is equal to 50% of its input voltage.

To generate a 0.9V output from a LiIon battery having a nominal voltage of 3.6V, a voltage conversion ratio of 0.25, the LCDD regulator can operate at D=50% while the Buck converter must modulate at D=25%. Under the high battery condition when $V_{batt}=4.2V$, the Buck converter must regulate at a 21% duty factor while the 0.5×-type LCDD converter is still operating at a relatively high 42% duty ratio.

Table 4 contrasts the D=50% preferred conversion ratio for a 2×LCDU converter, a 1.5×LCDU converter, a Buck converter, and a 0.5×LCDD converter and illustrates the duty factor range needed to output several common output voltages from a LiIon battery.

TABLE 4

| | Condition | | | |
|---|---|---|---|---|
| D = 50% | 2X LCDU $V_{out}/V_{in}$ = 1.00 | 1.5X LCDU $V_{out}/V_{in}$ = 0.67 | Buck $V_{out}/V_{in}$ = 0.50 | 0.5X LCDD $V_{out}/V_{in}$ = 0.25 |
| LiIon → 3.3 V | 40% < D < 55% | 53% < D < 73% | N/A | N/A |
| LiIon → 3.0 V | 36% < D < 50% | 47% < D < 67% | 71% < D < 100%* | N/A |
| LiIon → 2.7 V | 32% < D < 45% | 43% < D < 60% | 64% < D < 90% | N/A |
| LiIon → 1.8 V | 21% < D < 30%* | 29% < D < 38% | 43% < D < 60% | N/A |
| LiIon → 0.9 V | 10% < D < 15%* | 14% < D < 20%* | 21% < D < 30%* | 42% < D < 60% |

Those conditions marked with an asterisk (*) may require limiting the converter's operating frequency in order to meet the full range in required duty factors. Those marked with N/A require both step-up and step-down conversion, not possible with a Buck or a down-down converter.

Fractional Down-Up (LCDU) and Down-Down (LCDD) Regulating Converters

Figure 23A:
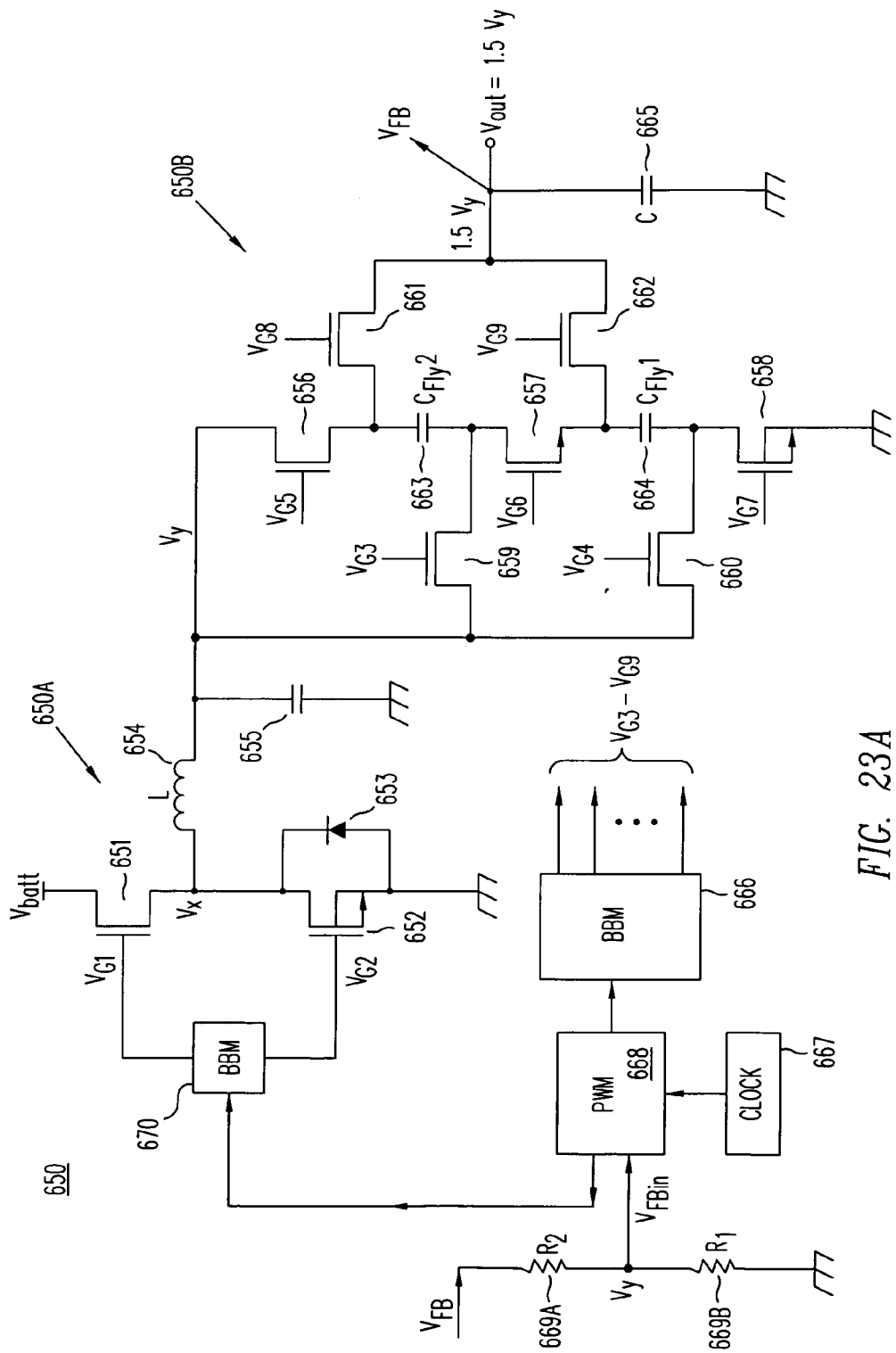
FIG. 23A is a circuit diagram of a fractional 1.5×LCDU regulating converter.

FIG. 23A illustrates schematic diagram of a fractional 1.5×-type LCDU regulating converter 650.

A step-down pre-regulator 650A comprises a PWM controller 668; a clock 667; a BBM buffer 670; a high-side power MOSFET 651; an N-channel synchronous rectifier MOSFET 652 with an intrinsic P-N diode 653; an inductor 654; and an optional filter capacitor 655. Powered from the $V_y$ output of the pre-regulator, a fractional charge pump post-converter 650B comprises a high-side MOSFET 656, a middle MOSFET 657 and a low-side MOSFET 658 with flying capacitors 663 and 664. The discharge path comprises output connected MOSFETs 661 and 662 connected to output capacitor 665 and $V_y$ connected MOSFETs 659 and 660.

Grounded MOSFETs 652 and 658 are N-channel devices. The remaining devices may comprise either N-channel or P-channel MOSFETs with appropriate modification to the gate drive polarity and circuitry. The charge pump MOSFETs are controlled by a BBM buffer 666, circuitry ideally synchronized to the same clock 667 controlling pre-regulator MOSFETs 651 and 652. The output $V_{out}$, having a voltage 1.5 times $V_y$ is used to control PWM circuit 668 via feedback $V_{FB}$. The $V_{FB}$ signal is appropriately level shifted by resistors 669A and 669B to produce a $V_{FBin}$ signal equal to a voltage equal to $V_{out}/1.5$, the desired voltage $V_y$ for optimum converter efficiency. In alternative embodiments, BBM buffer 666 need not be driven by PWM 668, but preferably the MOSFETs in the post-converter 650B are turned on simultaneously with the MOSFETs in the pre-regulator 650A.

Figures 23B, 23C:
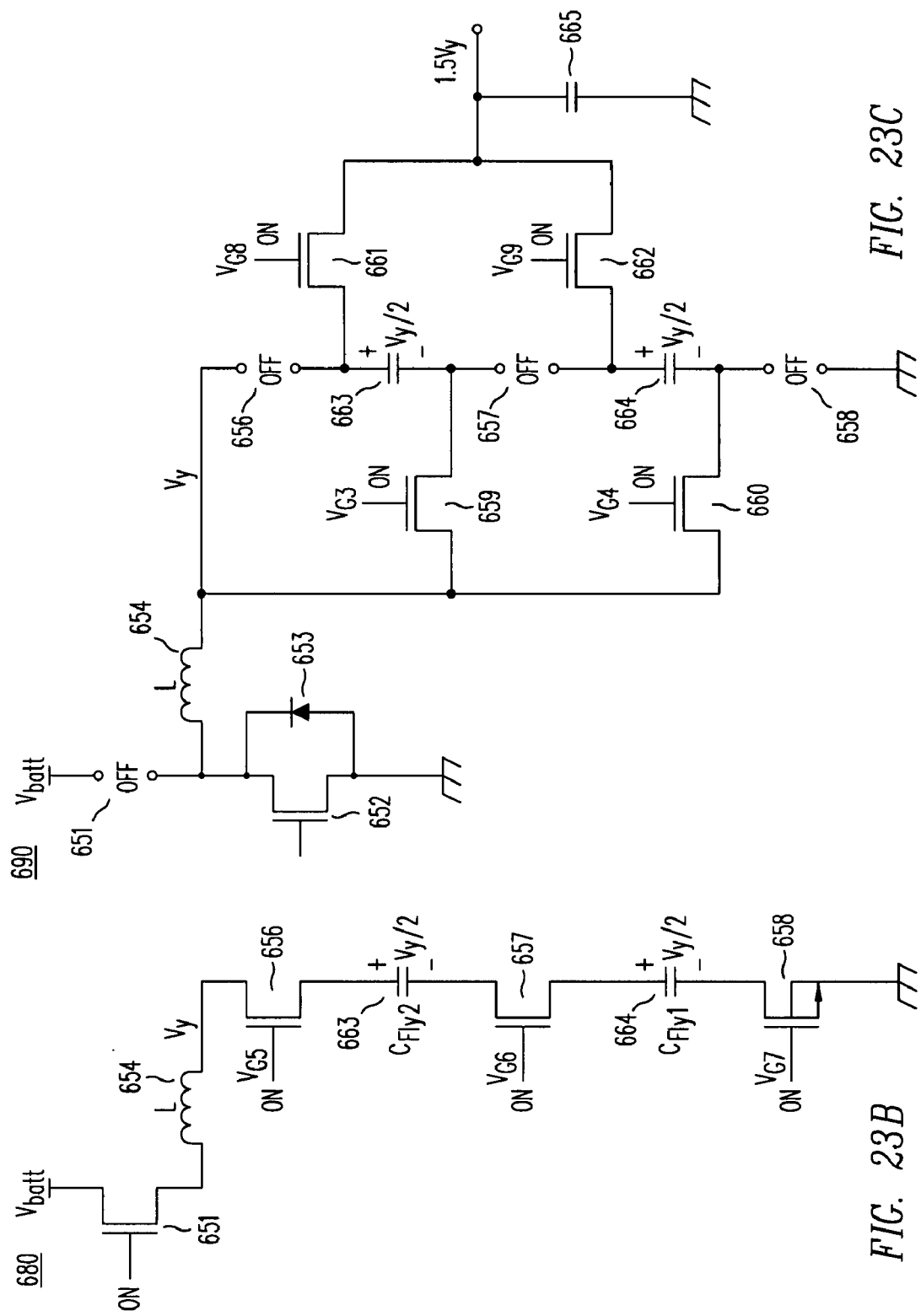
FIG. 23B is a circuit diagram of the fractional 1.5×LCDU regulating converter during the magnetizing-charging stage.
FIG. 23C is a circuit diagram of a fractional 1.5×LCDU regulating converter during the recirculating-transferring stage.

FIG. 23B illustrates the equivalent circuit 680 of converter 650 during the cycle when inductor 654 is magnetized and capacitors 663 and 664 are charged, during which time MOSFETs 651, 656, 657, and 658 are conducting and all other MOSFETs are off. During this cycle, series connected capacitors 656 and 664 each charge to a voltage $V_y/2$.

FIG. 23C illustrates the equivalent circuit 690 of converter 650 in the next phase when the inductor current re-circulates and the flying capacitors 663 and 664 transfer their charge onto output capacitor 665. In this phase MOSFETs 651, 656, 657 and 658 are shut off, and MOSFET 652 is turned on shunting a significant portion of inductor recirculation current from forward-biased diode 653. The positive terminals of flying capacitors 663 and 664 are shorted together and connected to output capacitor 665 through on MOSFETs 661 and 662. The negative terminals of capacitors 663 and 664 are shorted together and connected to voltage $V_y$ by on MOSFETs 659 and 660.

In this discharge phase, capacitors 663 and 664 are therefore connected in parallel, each being previously charged to a voltage $V_y/2$. By attaching the negative terminals of these flying capacitors to the $V_y$ terminal, the voltage at their positive terminals connected to the output is the sum of $V_y$ and $0.5V_y$, for a total output voltage of $+1.5V_y$ relative to ground.

Figure 24A:
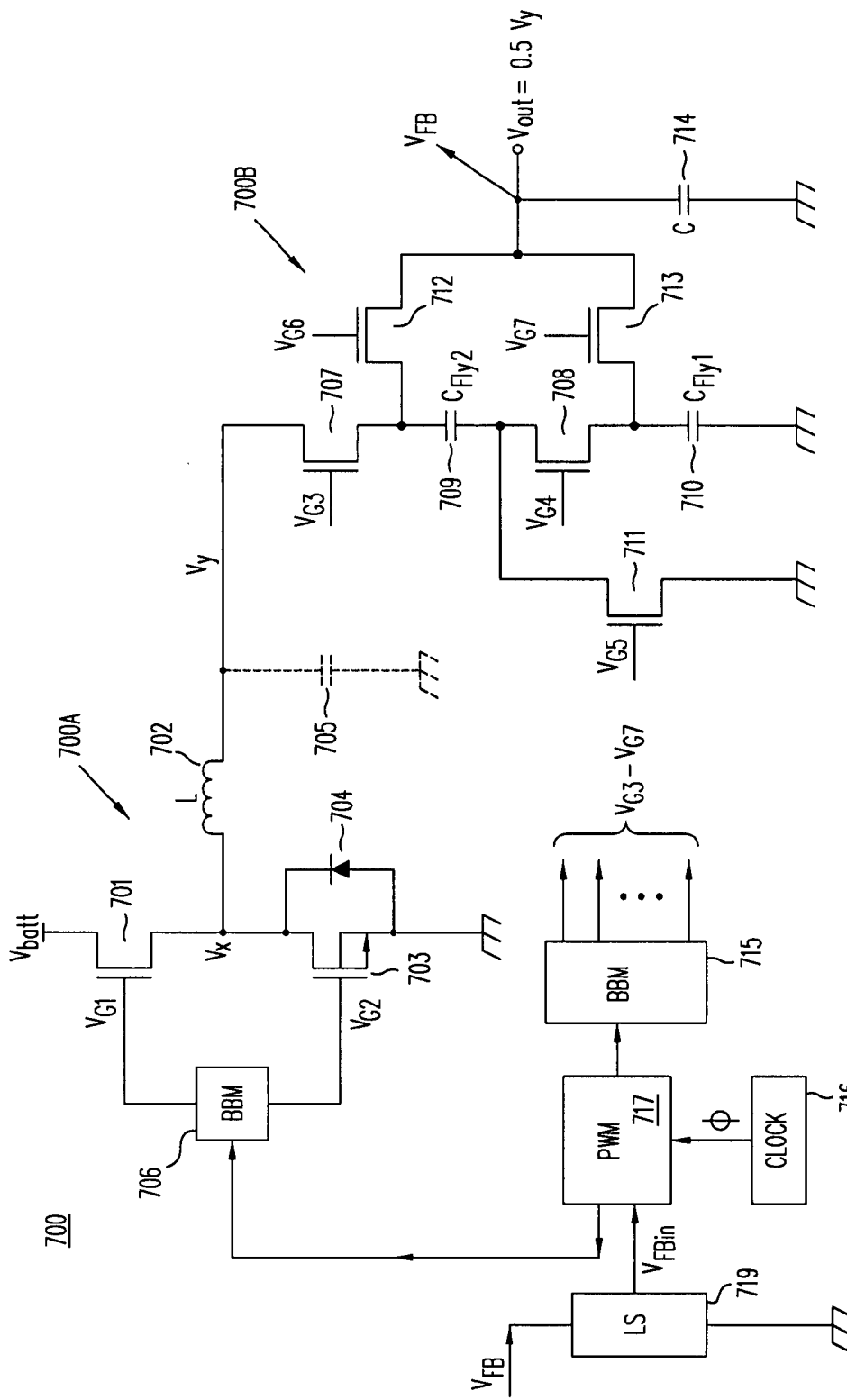
FIG. 24A is a circuit diagram of a fractional 0.5×LCDD regulating converter.

FIG. 24A illustrates a schematic circuit diagram of a fractional 0.5×-type LCDD regulating converter 700, also referred to herein as a "down-down" converter. A step-down pre-regulator 700A comprises a PWM controller 717; a clock 716; a BBM buffer 706; a high-side power MOSFET 701; an N-channel synchronous rectifier MOSFET 703 with an intrinsic P-N diode 704; an inductor 702; and an optional filter capacitor 705. Powered from the $V_y$ output of pre-regulator 700A, a fractional charge pump post-converter 700B comprises MOSFETs 707 and 708, which are used to charge flying capacitors 709 and 710. The discharge path comprises output connected MOSFETs 712 and 713 connected to an output capacitor 714 and a ground-connected MOSFET 711. The negative terminal of capacitor 710 is hard wired to ground.

Grounded synchronous rectifier MOSFET 703 is an N-channel device. The remaining devices may comprise either N-channel or P-channel MOSFETs with appropriate modification to the gate drive polarity and circuitry. MOSFETs 707, 708, 712 and 713 within charge pump post-converter 700B are controlled by a BBM buffer 715, which ideally is driven by the same clock generator 716 that controls the switching of MOSFETs 701 and 703 within pre-regulator 700A. The output voltage $V_{out}$, equal to +0.5 times $V_y$, is used to control PWM controller 717 via a feedback voltage $V_{FB}$. The $V_{FB}$ signal is appropriately level-shifted by a level shift circuit 719 to produce a $V_{FBin}$ signal that drives the intermediate voltage $V_y$ to a voltage equal to $V_{out}/0.5$, the desired level of $V_y$ for optimum converter efficiency.

Figures 24B, 24C:
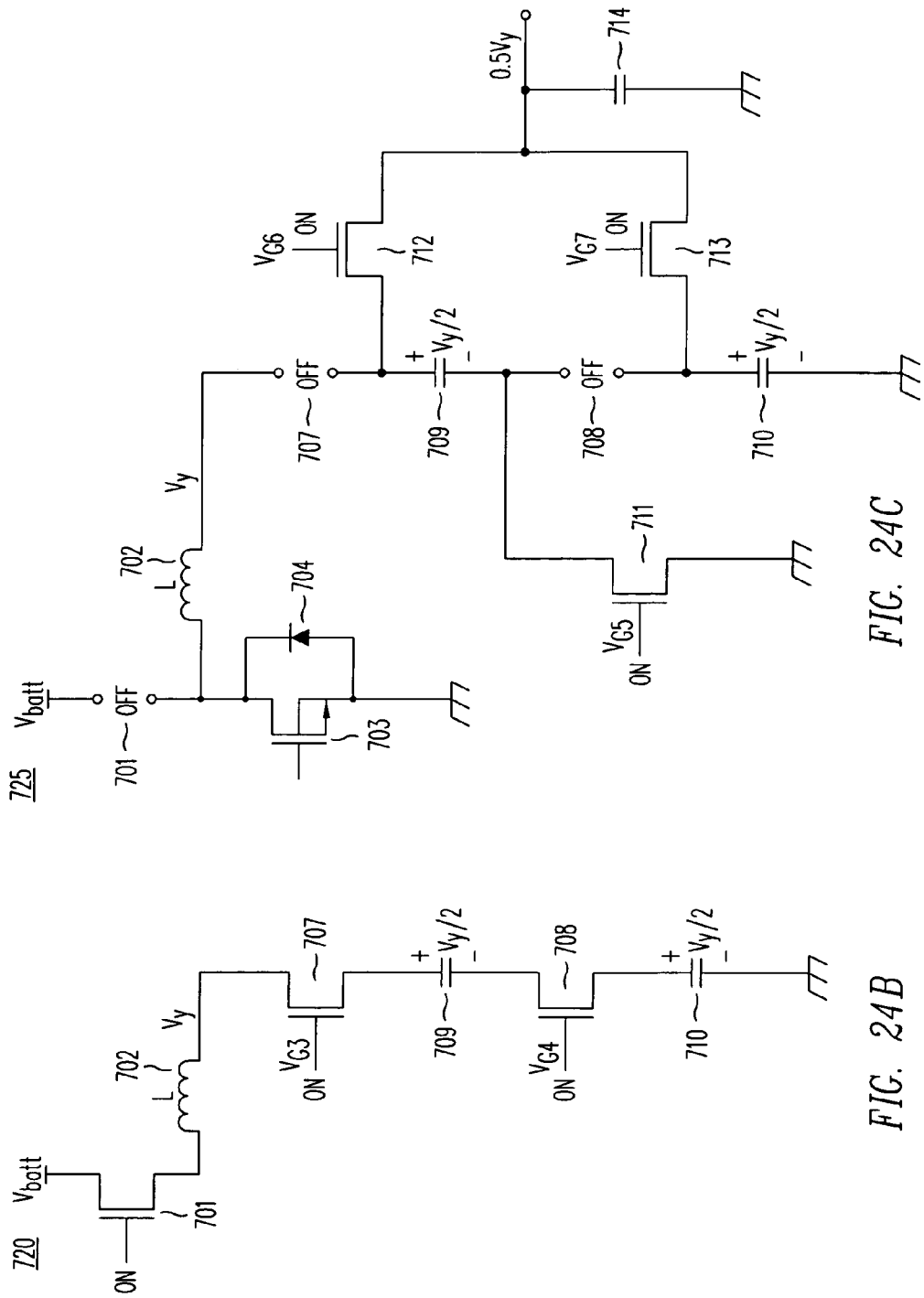
FIG. 24B is a circuit diagram of a fractional 0.5×LCDD regulating converter during the magnetizing-charging stage.
FIG. 24C is a circuit diagram of a fractional 0.5×LCDD regulating converter during the recirculating-transferring stage.

FIG. 24B illustrates the equivalent circuit 720 of converter 700 during the cycle when inductor 702 is magnetized and capacitors 709 and 710 are charged, during which time MOSFETs 701, 707, and 708 are conducting and all other MOSFETs are off. During this cycle, series connected capacitors 709 and 710 each charge to a voltage $V_y/2$.

FIG. 24C illustrates the equivalent circuit 725 of same circuit 700 in the next phase when the inductor current re-circulates and the flying capacitors 709 and 710 transfer their charge onto output capacitor 714. In this phase MOSFETs 701, 707, and 708 are shut off, and MOSFET 703 is turned on shunting a significant portion of inductor recirculation current from forward-biased diode 704. The positive terminals of flying capacitors 709 and 710 are shorted together and connected to output capacitor 714 through on MOSFETs 712 and 713. The negative terminal of capacitor 702 is connected to ground by turning on MOSFET 711. The negative terminal of capacitor 710 is hard wired shorted to ground.

In this discharge phase, capacitors 709 and 710 are therefore connected in parallel, each being previously charged to a voltage $V_y/2$. By attaching the negative terminals of these flying capacitors to ground, the voltage at their positive terminals connected to the output is $0.5V_y$ relative to ground.

Thus the operation of the fractional charge pump is similar to the operation of a voltage-raising charge pump, described above, except that during the fourth time interval the second terminal of the capacitor is coupled to a fourth voltage instead of the second terminal of the inductor. The fourth voltage may be equal to the third voltage.

Inverting Switched-Inductor-Capacitor (LCDI) Regulating Converters (Inverter)

An LCDX switching regulator can also be used to generate an output voltage below ground, i.e. inverted. As stated previously, an LCDX switching regulator exhibits an output-to-input voltage conversion ratio governed by the equation $$\frac{V_{out}}{V_{in}} = nD$$

where n has discrete, quantized values, e.g., n={2, 1.5, 0.5, −0.5, −1.0}, depending on the number of capacitors and the switch configuration in the post-converter, and where D is dynamically adjusted using feedback to maximize the converter's overall efficiency. When n is negative, the output voltage of the converter is negative. A converter that generates a negative output voltage from a positive voltage input is referred to as an inverter, and using the aforementioned nomenclature is herein described as a LCDI switching regulator.

Figure 25A:
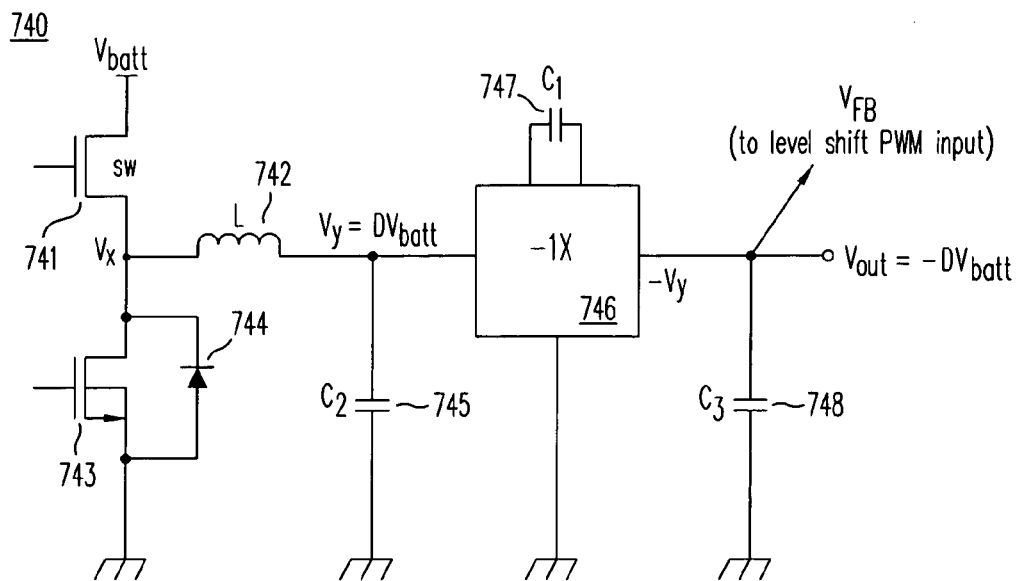
FIG. 25A is a circuit diagram of a −1×LCDI regulating inverter.
Figure 25B:
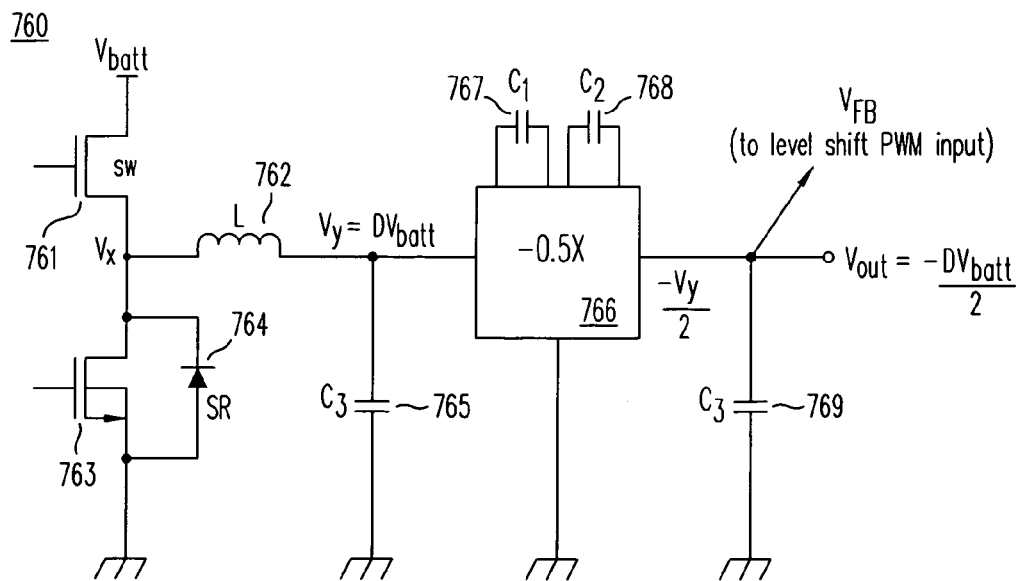
FIG. 25B is a circuit diagram of a −0.5×LCDI fractional regulating inverter.

As illustrated in FIGS. 25A and 25B, various topologies of LCDI converters fall within the numerous embodiments of this invention. For example LCDI converter 740 in FIG. 25A employs single-capacitor −1× type charge pump 746 to produce an output given by the relation $V_{out}=-DV_{batt}$ and where D is dynamically adjusted through feedback to force the converter to operate at or near its optimum efficiency.

Feedback using an inverting-type charge-pump post-converter requires an inverting level shifter to adjust the below ground signal into a positive value appropriate for the PWM converter's control input. The output voltage $V_{FB}$ is equal to the magnitude of the desired voltage $V_y$ but opposite in polarity. The level shift circuit may invert the $-V_{FB}$ signal into $+V_{FB}$ for use as an input to the PWM controller $V_{FBin}$.

For present purposes, the feedback input voltage $V_{FBin}$ to the PWM controller is defined as the voltage that will cause the PWM controller to force the intermediate voltage $V_y$ to $-V_{out}$, i.e., under closed loop control $V_y\rightarrow(-V_{out})$. $V_y$ is a positive voltage if $V_{out}$ is a negative voltage.

The disclosed LCDI family of inverters may also utilize a inverting fractional charge pump. Fractional LCDI converter 760 in FIG. 25B employs a dual-capacitor −0.5× type charge pump 766 to produce an output given by the relation $V_{out}=-0.5DV_{batt}$, where D is dynamically adjusted through feedback to force the converter to operate at or near its optimum efficiency. The feedback from the converter's output to the $V_{FBin}$ pin is scaled, i.e. level shifted, by a level shift circuit to force the intermediate voltage $V_y$ to $-V_{out}/0.5$, i.e., under closed loop control $V_y\rightarrow(-V_{out}/0.5)$. $V_y$ is a positive voltage if $V_{out}$ is a negative voltage.

Figure 26:
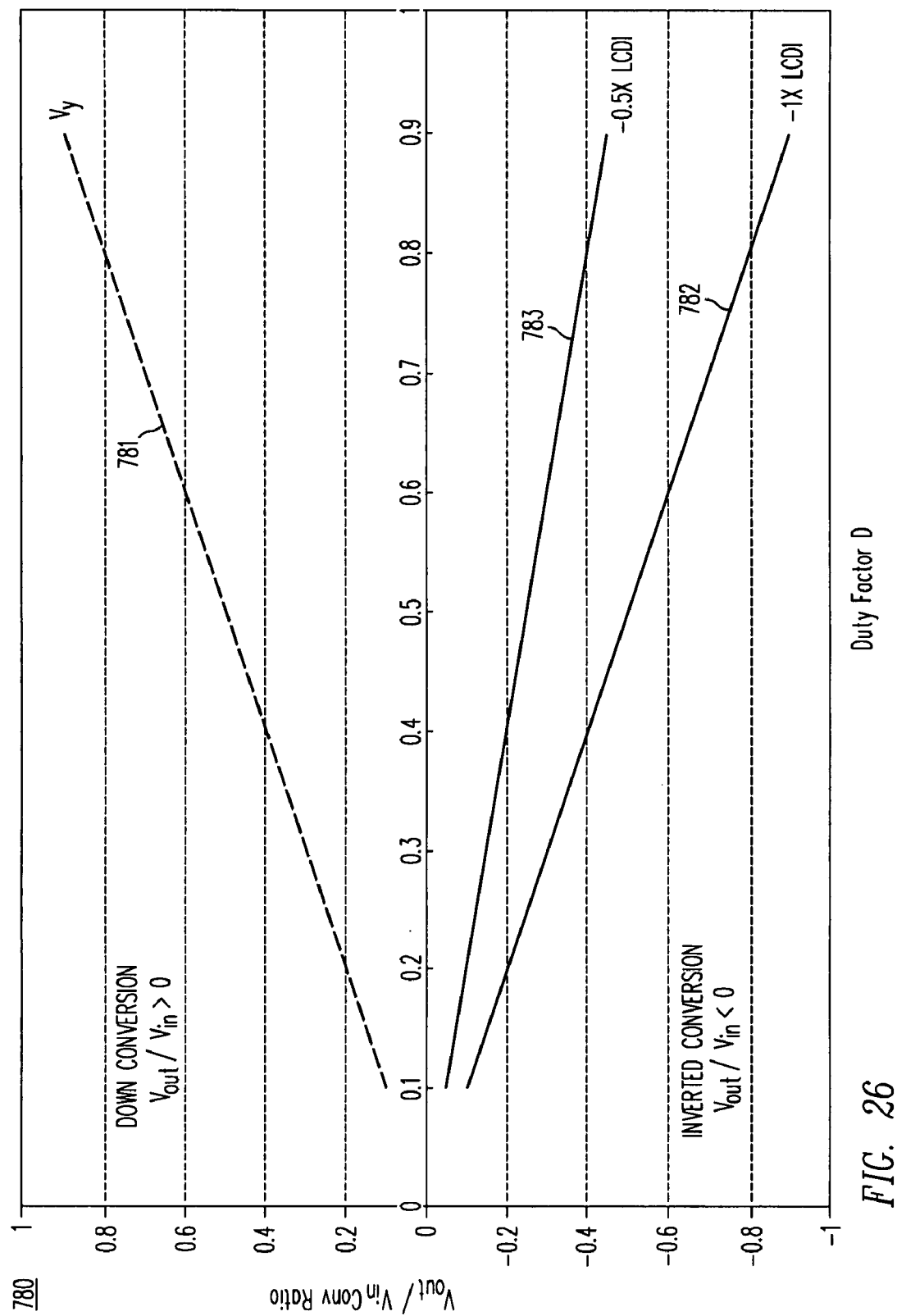
FIG. 26 is a graph showing the voltage conversion ratios for several LCDI-type regulating inverters as a function of the duty cycle.

The relationship between the duty factor D and the voltage conversion ratio $V_{out}/V_{in}$ of various LCDI converters is illustrated in graph 780 of FIG. 26, including −1×LCDI (curve 782) and the −0.5× type LCDI (curve 683) characteristics contrasted to the positive polarity $V_y$ signal 781 used in generating the negative supply. Specifically, the −1×-type LCDX converter has a characteristic which is a mirror image of $V_y$. Specifically when D=50%, the −1×LCDI switching regulator produces a voltage regulated output where $V_{out}=-0.5V_{batt}$. At low duty factors, the output approaches zero while at high duty factors, e.g. at 90%, the output approaches $-V_{batt}$.

It follows that the fractional LCDI converter is described by line 783 where n=−0.5. At 50% duty factor the −0.5×LCDI conversion ratio is given by n·D=−0.5(50%) so that $V_{out}=-0.25V_{in}$. Compared to the −1× type LCDI converter where $V_{out}=-0.5V_{in}$ at a 50% duty factor, the −0.5×-type LCDI regulator supplies a smaller negative output voltage at the same duty factor.

At high frequencies where operation near 50% duty factor is preferable to avoid narrow pulses, the −0.5×-type LCDI regulator is preferable over the −1× inverter type when delivering smaller negative output voltages. For example delivering a −0.9V output from a Lilon battery charged to 4.2V, a −1×LCDI regulator must operate at 21% duty factor while the −0.5× type LCDI regulator operates at 42%. Operating near 50% duty factor allows higher-frequency switching than operation at extreme duty factors.

Table 5 contrasts the D=50% preferred conversion ratio for the −1×LCDI and −0.5×LCDI converters and illustrates the duty factor range needed to output several negative output voltages from a Lilon battery.

TABLE 5

| | Condition | | |
|---|---|---|---|
| D = 50% | −0.5X LCDU $V_{out}/V_{in} = -0.25$ | −1X LCDU $V_{out}/V_{in} = -0.50$ | Buck (Positive) $V_{out}/V_{in} = 0.50$ |
| Lilon → 3.0 V | N/A | 71% < D < 100%* | 71% < D < 100%* |
| Lilon → 2.7 V | N/A | 64% < D < 90% | 64% < D < 90% |
| Lilon → 1.8 V | N/A | 43% < D < 60% | 43% < D < 60% |
| Lilon → 0.9 V | 42% < D < 60% | 21% < D < 30%* | 21% < D < 30%* |

Those conditions marked with an asterisk (*) may require limiting the converter's operating frequency in order to meet the full range in required duty factors. Those marked with N/A require both step-up and step-down inversion.

Figure 27A:
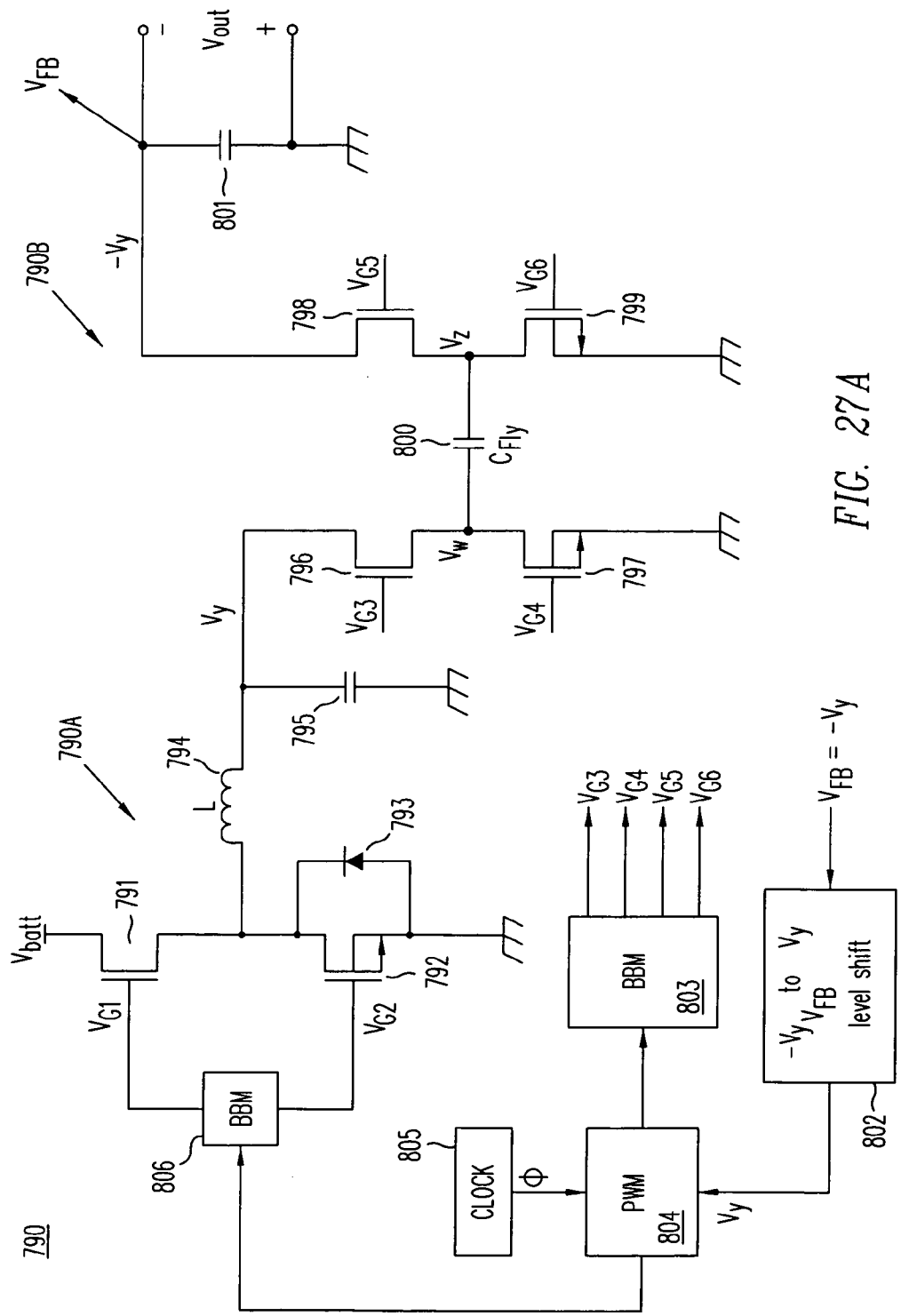
FIG. 27A is a circuit diagram of a −1× type LCDI regulating inverter.

Examining the implementation of the LCDX-type inverters in greater detail, FIG. 27A illustrates a circuit diagram of a −1× switched LCDI regulating converter 790. As shown, LCDI switching converter 790 includes a high-side power MOSFET 791, a low-side N-channel synchronous rectifier MOSFET 792 with an intrinsic P-N diode 793 and an inductor 794. These elements are included in a pre-regulator 790A converting an input voltage $V_{batt}$ to an intermediate voltage $V_y$. The intermediate voltage $V_y$ across an optional filter capacitor 795 forms the input to a −1× type charge pump inverting post-converter 790B comprising power MOSFETs 796, 797, 798 and 799 together sequentially charging and discharging a flying capacitor 800 from pre-regulator 790A into the an output filter capacitor 801.

High-side configured power MOSFETs 791, 796, and 798 may be either N-channel or P-channel devices, with appropriate changes in the gate drive signal and gate buffer circuitry. Low-side power MOSFETs 792, 797 and 799 are preferably implemented as N-channel devices. Output voltage $V_{out}$ is used as feedback signal $V_{FB}$, inverted by a level shift circuit 802 to produce a positive voltage as the control voltage input to an error amplifier within PWM controller 804. This control voltage is chosen to force the output voltage of pre-regulator 790A, across optional or parasitic capacitor 795, to a voltage $V_y$ having a magnitude equal to but the inverse of the output voltage $V_{out}$.

PWM controller 804 is driven by a clock and ramp generator circuit 805 at a clock frequency Φ and drives a break-before-make buffer 806 at the same frequency. BBM buffer 806 drives high-side MOSFET 791 and synchronous rectifier MOSFET 792 out of phase with gate biases $V_{G1}$ and $V_{G2}$ to prevent shoot-through conduction. The polarity of $V_{G1}$ is positive with respect to the source of MOSFET 791 if it is an N-channel device, and negative if MOSFET 791 is a P-channel device. Synchronous rectifier MOSFET 792 is controlled to conduct all or some portion of the time when MOSFET 791 is off, but never to conduct significant current when high-side MOSFET 791 is on.

The clock signal controlling PWM controller 804 also controls BBM buffer 803, producing gate signals $V_{GS3}$, $V_{GS4}$, $V_{GS5}$ and $V_{GS6}$ to control the sequenced switching of charge pump MOSFETs 796, 797, 798, and 799, respectively. These MOSFETs conduct in diagonal fashion, with MOSFETs 796 and 799 conducting while MOSFETs 797 and 798 are off so as to charge capacitor 800; and with MOSFETs 798 and 797 conducting while MOSFETs 796 and 799 are off so as to discharge capacitor 800 by transferring its charge onto output filter capacitor 801. BBM buffer 803 prevents shoot-through conduction between MOSFETs 796 and 797, and also between MOSFETs 798 and 799.

The MOSFETs 796-799 within charge pump post-converter 790B may be switched synchronously to the pre-regulator clock at the frequency Φ or at some higher multiple of the clock frequency, i.e. mΦ, or alternatively at a frequency independent of the clock frequency Φ. In a preferred embodiment, all the power MOSFETs in pre-regulator 790A and charge pump post-converter 790B are switched in synchronous fashion whereby filter capacitor 795 can be made small or may be eliminated. In contrast, if the MOSFETs within charge pump post-converter 790B are switched independently of the MOSFETS within pre-regulator 790A, capacitor 795 is required to temporarily store energy needed to support momentary load and line transients.

Synchronous operation of pre-regulator 790A and post-converter 790B in –1× type LCDI converter 790 is illustrated in FIGS. 27B and 27C. In FIG. 27B schematic diagram 810 represents converter 790 during the magnetizing of inductor 794 and simultaneous charging of the flying capacitor 800, with current flowing from $V_{batt}$ through on-state MOSFETs 791, 796 and 797 and during which time $V_x$ is biased to $V_{batt}$, $V_z$ is grounded, $V_w$ is biased to $V_y$, and flying capacitor 800 charges to a voltage +$V_y$. Off MOSFETs 792, 797, and 798 behave as open circuits and are not shown.

In FIG. 27C schematic diagram 820 represents converter 790 during the recirculation of current through inductor 794 and discharging of flying capacitor 800. During this time, an inductive recirculation current flows through forward-biased diode 793 shunted by on-state MOSFET 792, and through MOSFETs 797 and 798, charging output capacitor 801. During the recirculation stage, $V_x$ is near, but slightly below ground, specifically within a diode's forward bias $V_f$ of ground.

By connecting the positive terminal of capacitor 800 to ground and its negative terminal to the output, the voltage on $V_z$ instantly jumps to –$V_y$, the inverse of the intermediate voltage $V_y$, driving the output voltage $V_{out}$ across output capacitor 801. In this state, high-side MOSFET 791 and charge pump MOSFETs 796 and 799 are represented by open circuits.

Thus the operation of the inverter is similar to the operation of an voltage-raising charge pump, described above, except that during the fourth time interval the first terminal of the capacitor is coupled to ground instead of the output terminal and the second terminal of the capacitor is coupled to the output terminal of the inverter instead of the intermediate voltage. The second and/or third voltages may also be ground.

Figure 28A:
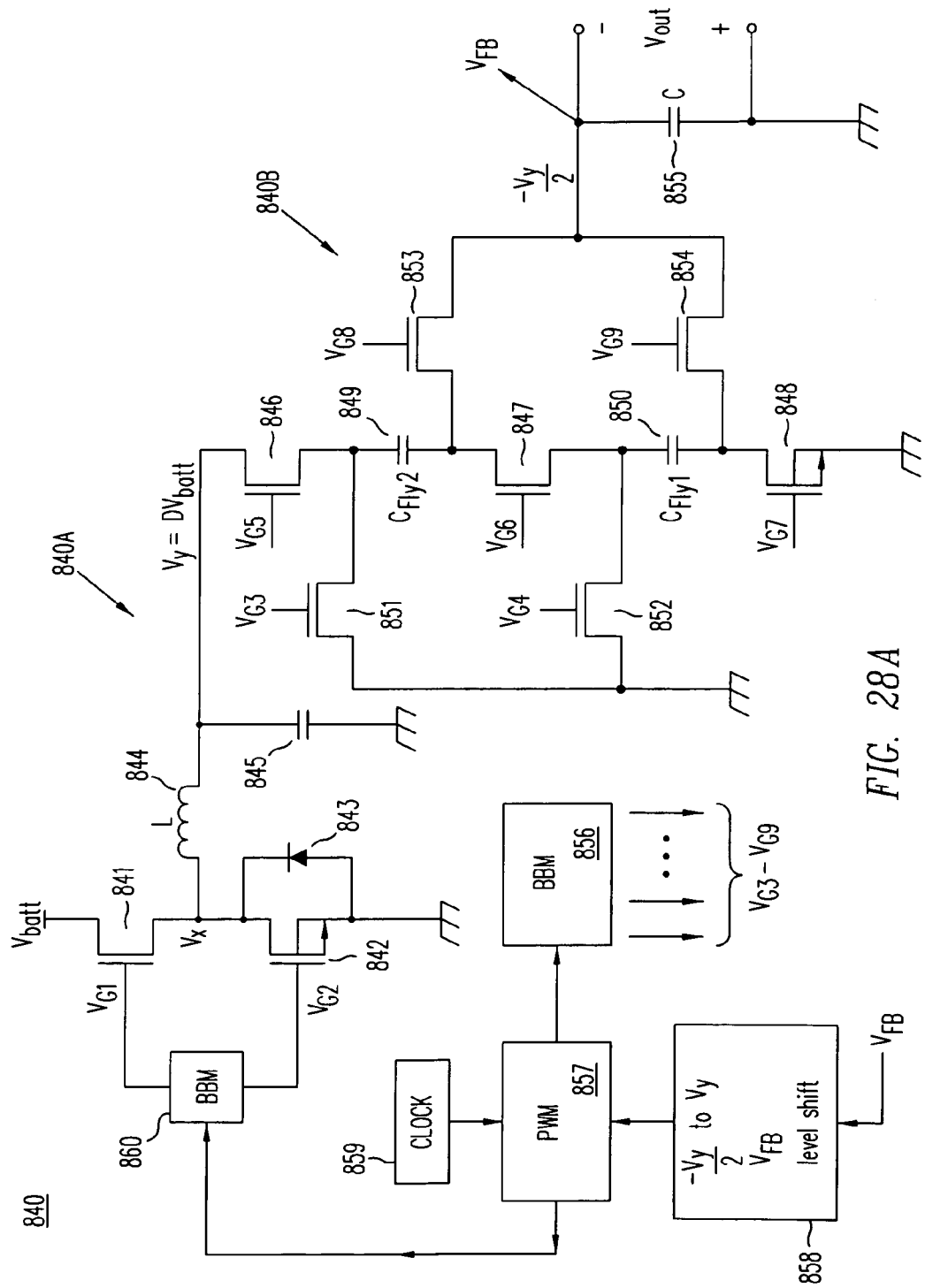
FIG. 28A is a circuit diagram of a fractional −0.5×LCDI regulating inverter.

FIG. 28A illustrates a fractional –0.5×LCDI regulating converter 840, also referred to herein as a fractional inverter. A step-down pre-regulator 840A comprises a PWM controller 837; a clock generator 859; a BBM buffer 860; a high-side power MOSFET 841; an N-channel synchronous rectifier MOSFET 842 with an intrinsic P-N diode 843; an inductor 844; and an optional filter capacitor 845. Powered by the intermediate voltage $V_y$ provided by pre-regulator 790A, the inverting fractional charge pump post-converter 790B comprises MOSFETs 846, 847 and 848 which charge flying capacitors 849 and 850. The discharge path comprises output-connected MOSFETs 853 and 854, which are connected to an output capacitor 855, and ground-connected MOSFETs 851 and 852.

Grounded synchronous rectifier MOSFET 842 is an N-channel device. The remaining devices may comprise either N-channel or P-channel MOSFETs with appropriate modification to the gate drive polarity and circuitry. The MOSFETs in charge pump post-converter 790B are controlled by a BBM buffer 856, which is ideally driven by the same clock generator 859 that controls MOSFETs 841 and 842 in pre-regulator 840A. The output voltage $V_{out}$, being equal to –0.5 times the intermediate voltage $V_y$, is used to control a PWM circuit 857 via a feedback voltage $V_{FB}$. $V_{FB}$ is appropriately level-shifted by a level-shift circuit 858 to produce a $V_{FBin}$ signal that drives the intermediate voltage $V_y$ to –$V_{out}$/0.5, the desired voltage $V_y$ for optimum converter efficiency.

FIG. 28B illustrates an equivalent circuit 870 of converter 840 during the cycle when inductor 844 is magnetized and capacitors 849 and 850 are charged, during which time MOSFETs 846, 847, and 848 are conducting and all other MOSFETs are off. During this cycle, series-connected capacitors 849 and 850 each charge to a voltage +$V_y$/2.

FIG. 28C illustrates an equivalent circuit 875 of converter 840 in the next phase when the inductor current re-circulates and the flying capacitors 849 and 850 transfer their charge onto output capacitor 855. In this phase, MOSFETs 841, 846, 847, and 848 are shut off, and MOSFET 842 is turned on, shunting a significant portion of inductor recirculation current from forward-biased diode 843. The negative terminals of flying capacitors 849 and 850 are shorted together and connected to output capacitor 855 through on MOSFETs 853 and 854. The positive terminals of capacitors 849 and 850 are connected to ground by turning on MOSFETs 851 and 852.

In this discharge phase, capacitors 849 and 850 are therefore connected in parallel, each of capacitors 849 and 850 being previously charged to a voltage+$V_y$/2. By attaching the positive terminals of these flying capacitors to ground, the voltage at their negative terminals which are connected to the output terminal is equal to –0.5$V_y$ relative to ground, i.e. a negative fractional output.??

Feedback Implementation

In the LCDX switching regulator circuits described herein, a key feature to operating near peak efficiency requires that the output of the pre-regulator be biased near $V_{out}$/n where "n" is the nX multiplier of the charge pump post-converter. While this condition could be met in an open-loop circuit, superior line and load regulation requires the converter to react to changes in the operating conditions dynamically and rapidly, i.e. in real time. Feedback of the converter's output voltage using closed loop control is commonly used in voltage regulators to achieve accurate regulating performance.

Specifically, in the LCDX family of regulators shown, the switched-inductor pre-regulator provides the regulation feature, with pulse widths preferably near a 50% duty factor, while the charge pump post-converter scales this output for up-down conversion or inversion. Because the voltage range of the output is scaled up, down, or inverted into a different voltage range than the $V_y$ output of the pre-regulator, any feedback signal $V_{FB}$ coming from the converter's $V_{out}$ must be adjusted, i.e. level shifted, before it can be fed into the $V_{FBin}$ input of the PWM controller. Alternatively the output of the pre-regulator $V_y$ can be used as feedback to force the voltage at $V_y$ to a particular value needed to produce the required output voltage $V_{out}$ at the maximum converter efficiency.

As defined previously in FIG. 15A, regardless of the feedback method, the feedback should drive $V_y$ to a voltage such that error voltage $\Delta V = V_{out} - V_z$ is small so that the condition $$V_{out} \approx V_z = nV_y = n \cdot D \cdot V_{in}$$

is maintained. Several methods to dynamically adjust the duty factor D of the pre-regulator's PWM controller exist including deriving feedback from $V_{out}$, $V_y$ or some combination thereof. The examples shown here are illustrative but not intended to be limiting as to the various methods to achieve closed-loop control of LCDX regulators.

Figure 29A:
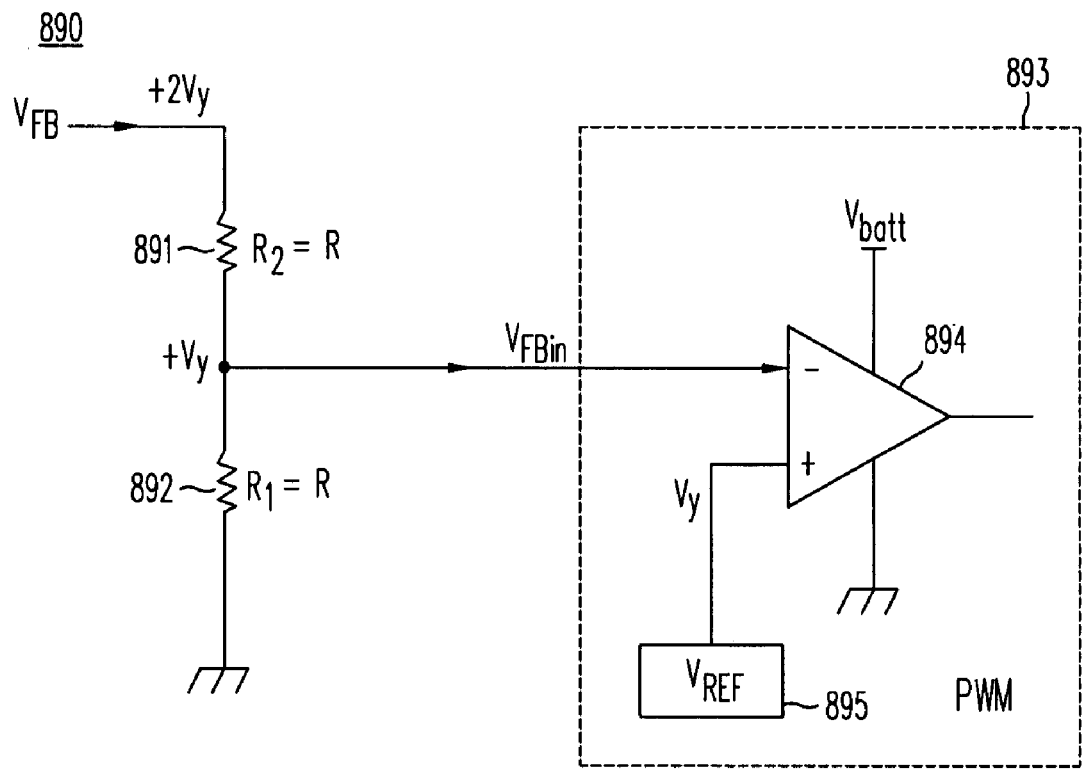
FIG. 29A is a schematic circuit diagram of a level-shifted feedback network for a doubler type LCDU converter.

As shown in feedback circuit 890 in FIG. 29A, a PWM controller 893 includes an error amplifier implemented as a differential-input operational amplifier, with its inverting input constituting the feedback input $V_{FBin}$ and its non-inverting input tied to a reference voltage generator 895, which generates a reference voltage $V_{ref}$. Feedback control occurs by controlling the pulse width and inductor current such that whenever the $V_{FBin}$ input is less than $V_{ref}$, the converter reacts by increasing pulse-width and switch on-time, increasing average inductor current, and driving $V_{out}$ to a higher voltage. Conversely, whenever the $V_{FBin}$ input is greater than $V_{ref}$, the converter reacts by decreasing pulse-width and shortening switch on-time, reducing average inductor current, and driving $V_{out}$ to a lower voltage.

While the actual value of $V_{ref}$ may be determined by a band-gap voltage reference circuit operating at 1.2V, the reference voltage may in some implementations be scaled to the desired output voltage of the pre-regulator, i.e. $V_y$, as shown in FIG. 29A. In practice, either the input $V_{FBin}$ can be divided down to the value of $V_{ref}$, or conversely $V_{ref}$ can be multiplied up to match the $V_y \approx V_{FBin}$ value. Both cases are considered in the following discussion.

Referring again to FIG. 29A, in a 2×-type LCDU switching regulator, feedback $V_{FB}$ from the output $V_{out}$ has a voltage twice that of the pre-regulator output voltage $V_y$. To properly level shift this voltage to a value near $V_y$, a simple resistor divider comprising two resistors 891 and 892 of equal value R easily performs the level shift function. As such $$V_{FBin} = V_{FB}\left(\frac{R_1}{R_1+R_2}\right) = +2V_y\left(\frac{R_1}{R_1+R_2}\right) \equiv +V_y$$

From this relation for a 2×-type LCDU regulator, it is obvious divider $R_1/(R_1+R_2)$ must equal ½. If however the reference voltage is not scaled to $V_y$, but instead only $V_{bandgap}=1.2V$ then the resistor ratio must be adjusted so that $$V_{FBin} = V_{FB}\left(\frac{R_1}{R_1+R_2}\right) = +2V_y\left(\frac{R_1}{R_1+R_2}\right) \equiv V_{bandgap}$$

In such a case the resistor ratio divides the feedback signal by $1.2V/2V_y$ or $1.2V/V_{out}$, not by one-half.

Figure 29B:
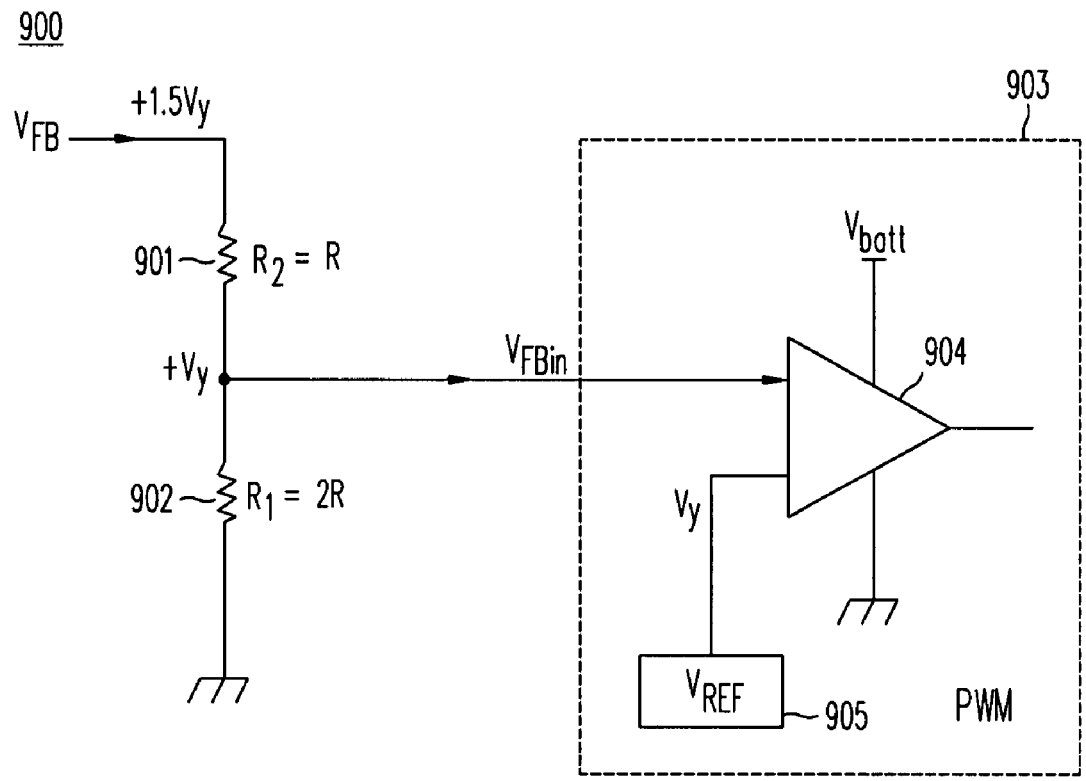
FIG. 29B is a schematic circuit diagram of a level-shifted feedback network for a fractional 1.5× type LCDU converter.

In FIG. 29B, a feedback circuit 900 uses resistor divider comprising resistors 901 and 902 for a 1.5×-type fractional LCDU regulator, where the level shift using the relation $R_1=2R_2$ results in an $V_{FBin}$ signal two-thirds that of the feedback voltage $V_{FB}$, namely $$V_{FBin} = V_{FB}\left(\frac{R_1}{R_1+R_2}\right) = +1.5V_y\left(\frac{R_1}{R_1+R_2}\right) \equiv +V_y$$

If however the reference voltage is not scaled to $V_y$, but instead only $V_{bandgap}=1.2V$ then the resistor ratio must be adjusted so that $$V_{FBin} = V_{FB}\left(\frac{R_1}{R_1+R_2}\right) = +1.5V_y\left(\frac{R_1}{R_1+R_2}\right) \equiv V_{bandgap}$$

In such a case the resistor ratio divides the feedback signal by $1.2V/1.5V_y$ or $1.2V/V_{out}$ rather than by two-thirds.

Feedback for a 0.5×-type LCDD converter is more complex. If the voltage reference is an un-scaled band-gap 1.2V reference, then so long that $V_{FB}=0.5V_y>V_{bandgap}$ then resistive level-shift circuit can be used and the feedback is given by $$V_{FBin} = V_{FB}\left(\frac{R_1}{R_1+R_2}\right) = +0.5V_y\left(\frac{R_1}{R_1+R_2}\right) \equiv V_{bandgap}$$

If $V_{ref}$ is scaled to equal the pre-regulator's output voltage $V_y$, then the feedback signal $V_{FB}$ is less than the reference voltage, i.e. $V_{FB}<V_{ref}$, and a resistor divider network will not work. Instead then an active level shift circuit is needed.

Figure 29C:
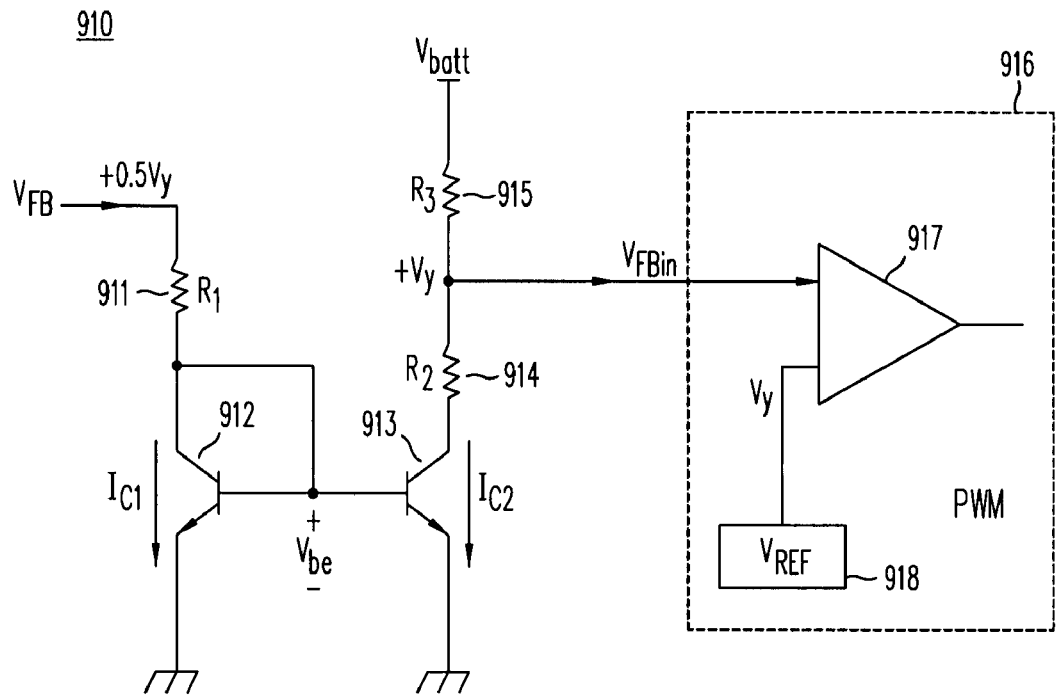
FIG. 29C is a schematic circuit diagram of a bipolar current mirror feedback network for a fractional 0.5× type LCDD converter.

A step-up level shift circuit 910 shown in FIG. 29C is an example of an active level shift circuit using a bipolar current mirror including NPN bipolar transistors 912 and 913, where the feedback voltage sets the current $I_{C1}$ in NPN transistor 912 according to the relation $I_{C1}=(V_{FB}-V_{be1})/R_1$. The current $I_{C2}$ in NPN mirror transistor 913 is then equal to the ratio of the emitter areas of the NPN mirror transistors 912 and 913 multiplied by $I_{C1}$, or $I_{C2}=m \cdot I_{C1}$ where m may for convenience be unity. The input voltage $V_{FBin}$ to error amplifier 917 can then be adjusted to equal the voltage $V_{ref}$ of reference voltage generator 918 by the ratio of the resistances of resistors 915 and 914. In this manner $V_{FBin}>V_{FB}$ and fluctuates in proportion to the output voltage.

Figure 29D:
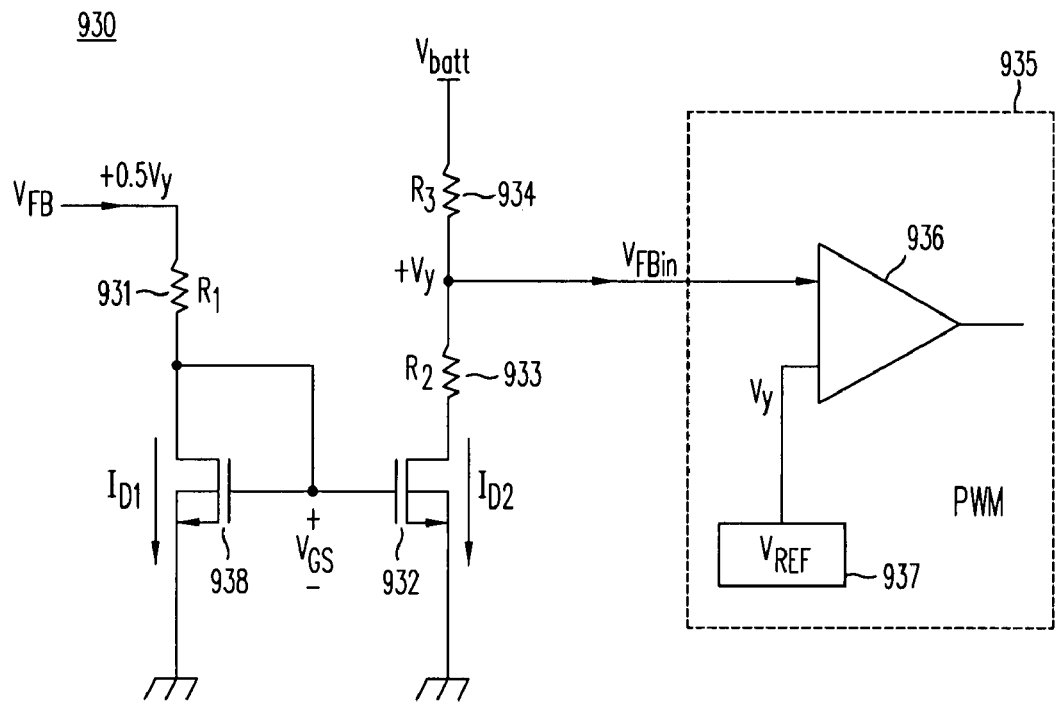
FIG. 29D is a schematic circuit diagram of a MOSFET current mirror feedback network for a fractional 0.5× type LCDD converter.

An alternative implementation 930 shown in FIG. 29D uses MOSFETs instead of bipolar transistors, but operates under a similar principal where the feedback voltage sets the current $I_{D1}$ in NMOS 938 according to the relation $I_{D1}=(V_{FB}-V_{GS1})/R_1$. The current $I_{D2}$ in NMOS mirror transistor 932 is then equal to the ratio of gate widths of the NMOS mirror transistors 932 and 938 multiplied by $I_{D1}$, or $I_{D2}=m \cdot I_{D1}$ where m may for convenience be unity. The input voltage $V_{FBin}$ to error amplifier 936 can then be adjusted to equal the voltage $V_{ref}$ of reference 937 by the ratio of the resistances of resistors 933 and 934. In this manner $V_{FBin}>V_{FB}$ and fluctuates in proportion to the output voltage.

Figure 29E:
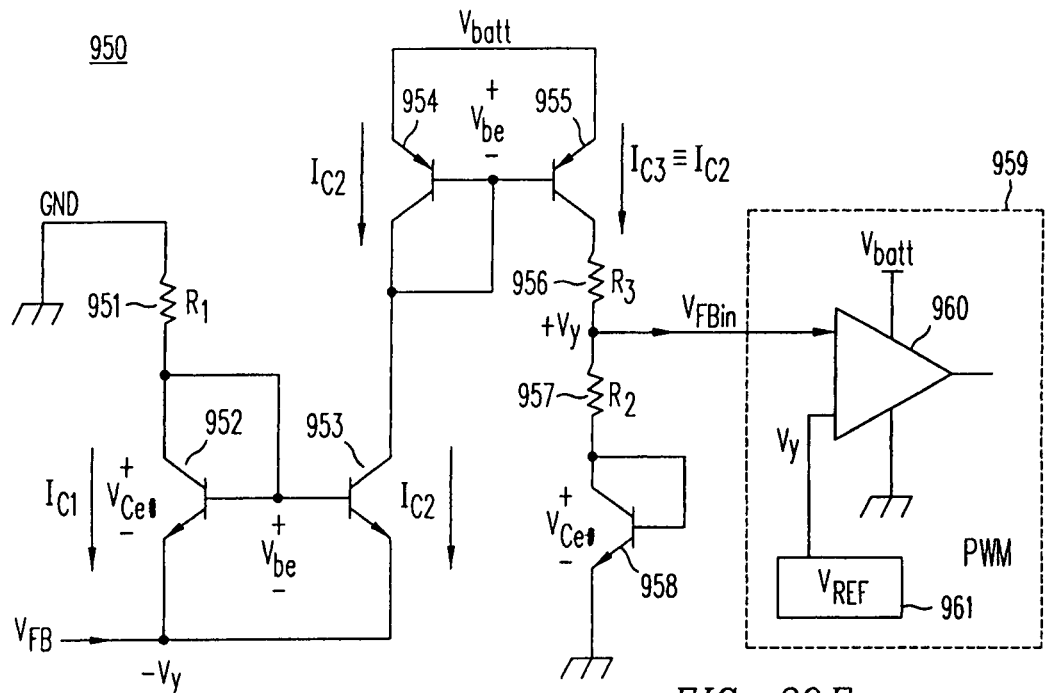
FIG. 29E is a schematic circuit diagram of a bipolar current mirror feedback network for a 1× type LCDI inverter.

An active feedback circuit is also required for inverting LCDI regulators, specifically since the error amplifier operates in circuitry biased above ground but the feedback signal $V_{FB}$ is below ground, i.e. negative, or vice-versa. One approach to implement a negative-to-positive level shift employs multiple current mirrors as shown in the feedback circuit 950 of FIG. 29E. In feedback circuit 950 the feedback signal is negative, i.e., $V_{FB}<0$. This voltage establishes a collector current proportional to the feedback voltage in a current mirror NPN transistor 952 according to the relation $I_{C1}=(|V_{FB}|-V_{be1})/R_1$. The current $I_{C2}$ in NPN mirror transistor 953 is then equal to the ratio of the emitter areas of transistors 952 and 953 multiplied by $I_{C1}$, or $I_{C2}=m_1 \cdot I_{C1}$ where m may for convenience be unity. Collector current $I_{C2}$ is then mirrored in a PNP transistor 954 to establish a current $I_{C3}$ in a mirror PNP transistor 955 sourced from a positive supply rail, in this example $+V_{batt}$. The current $I_{C3}$ in PNP mirror transistor 955 is then equal to the ratio of the emitter areas of transistors multiplied by $I_{C2}$, or $I_{C3}=m_2 \cdot I_{C2}$; where $m_2$ may for convenience be unity, and combining equations yields $I_{C3}=m_1 \cdot m_2 \cdot I_{C1}$.

This mirror current is then converted to a positive feedback voltage $V_{FBin}$, the input to an error amplifier 960, using a resistor divider comprised of resistors 956 and 957 and an optional grounded NPN transistor 958, and $V_{FB}$ is adjusted to be equal to the value of a reference voltage $V_{ref}$ generated by a voltage reference generator 961. Assuming that the emitter area ratios $m_1=1$ and $m_2=1$ then $I_{C3}=I_{C1}$, that NPN transistor 958 is identical to NPN transistor 952, and that resistors 957 and 951 are equal, i.e. $R_1=R_2$, then $V_{FBin}$ relative to ground is equivalent to the absolute value of the magnitude of the negative input voltage $V_{FB}$.

Figure 29F:
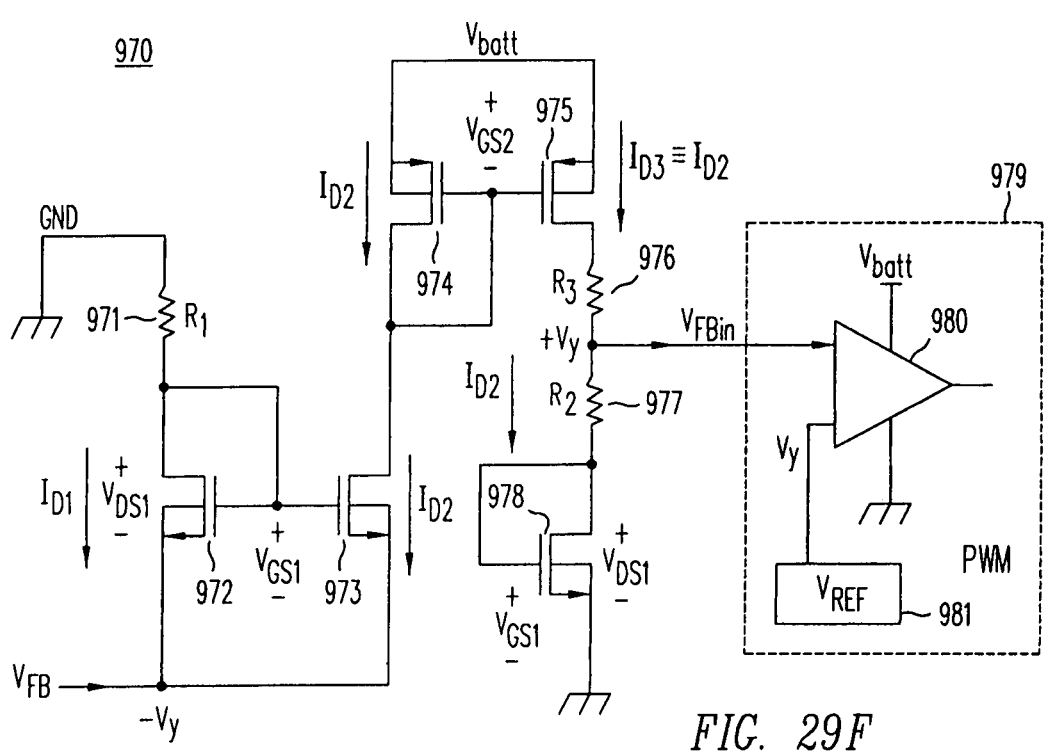
FIG. 29F is a schematic circuit diagram of a MOSFET current mirror feedback network for a −1× type LCDI inverter.

Feedback circuit 970 in FIG. 29F represents the CMOS equivalent of feedback circuit 950, with NMOS mirror transistors 972 and 973, PMOS mirror transistors 974 and 975 and a feedback voltage $V_{FBin}$ delivered to an error amplifier 980, adjusted using resistors 976 and 977 to be equal to voltage $V_{ref}$ generated by reference voltage generator 981 under nominal operating conditions. Specifically, if $I_{D1}=I_{D3}$, if NMOS transistors 972 and 978 are identical, and if $R_2=R_1$, then the magnitude of VFBin will equal the absolute value of the magnitude of negative feedback voltage $V_{FB}$, except that it is referenced to ground, i.e. represents a positive voltage.

Figure 29G:
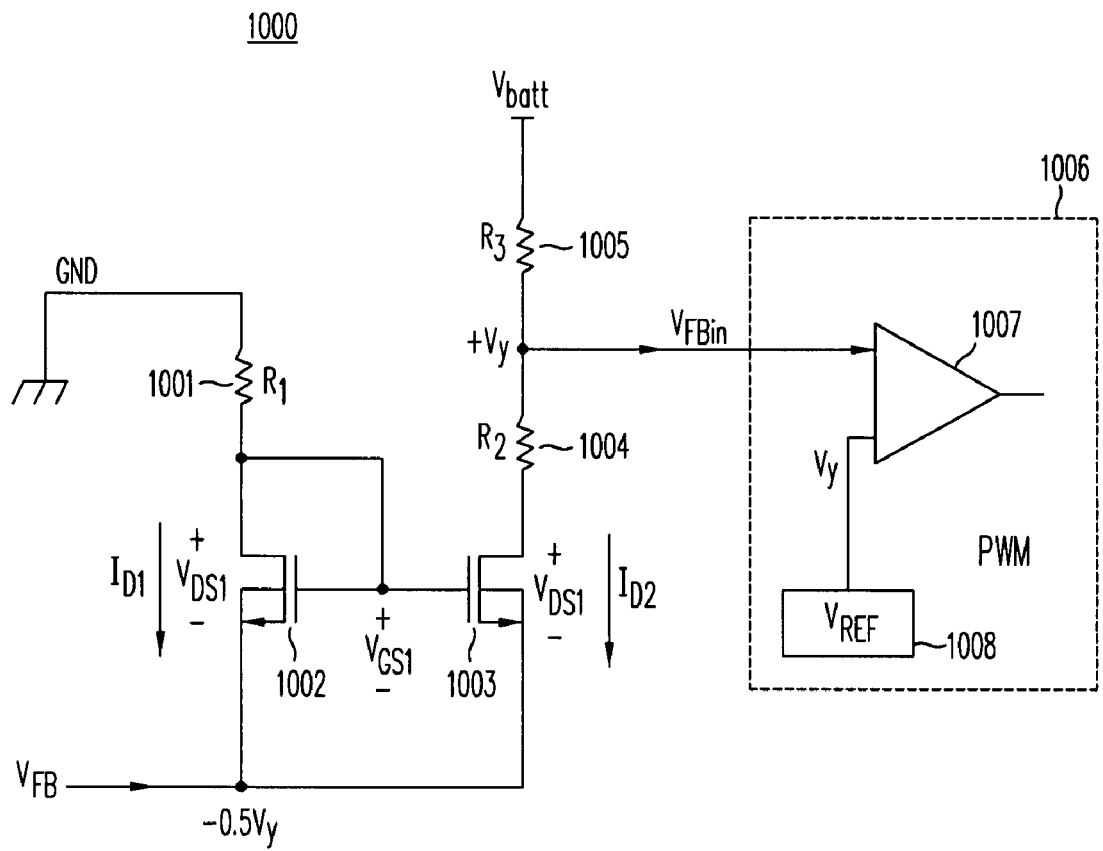
FIG. 29G is a schematic circuit diagram of a MOSFET current mirror feedback network for a fractional −0.5× type LCDI inverter.

A feedback circuit 1000, shown in FIG. 29G, can also be used for negative-to-positive level shifting whereby $I_{D1}$ in an NMOS 1002 is mirrored by an NMOS 1003 and adjusted by resistors 1005 and 1004 to produce a positive feedback $V_{FBin}$ to error amplifier 1007 at a voltage equal to $V_{ref}$ of voltage reference 1008.

As shown, feedback circuits 950, 970 and 1000 may be used for both $-1 \times LCDI$ and fractional $-0.5 \times LCDI$ inverting voltage regulators, depending on resistor values.

Figure 30A:
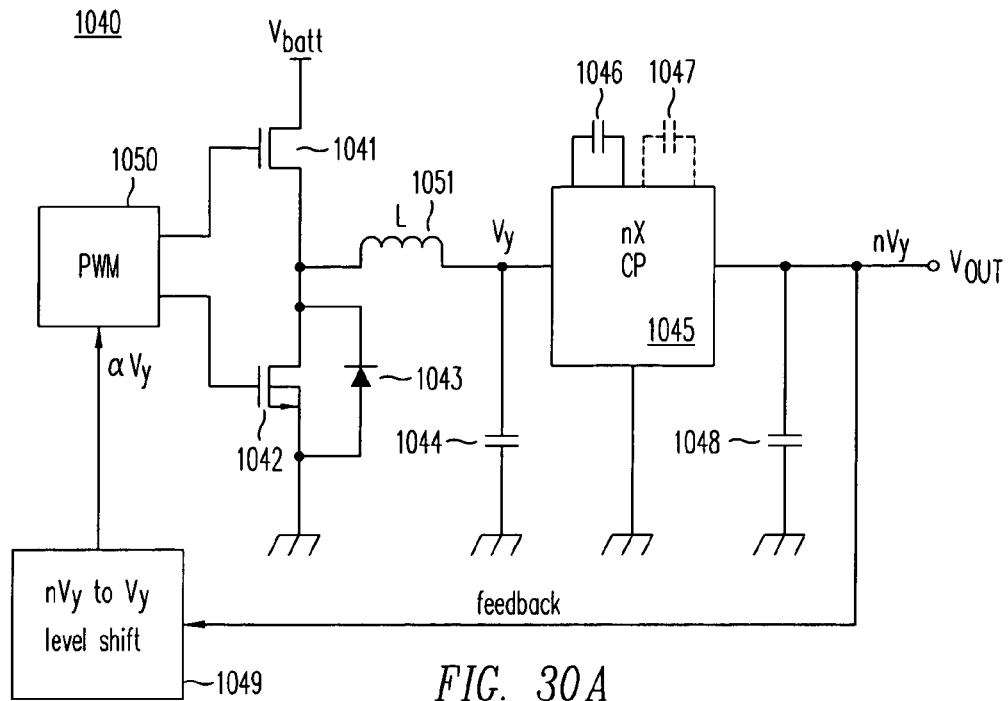
FIG. 30A is a circuit diagram of a level-shifted feedback circuit from the output terminal of a switched LCDX regulating converter.
Figure 30B:
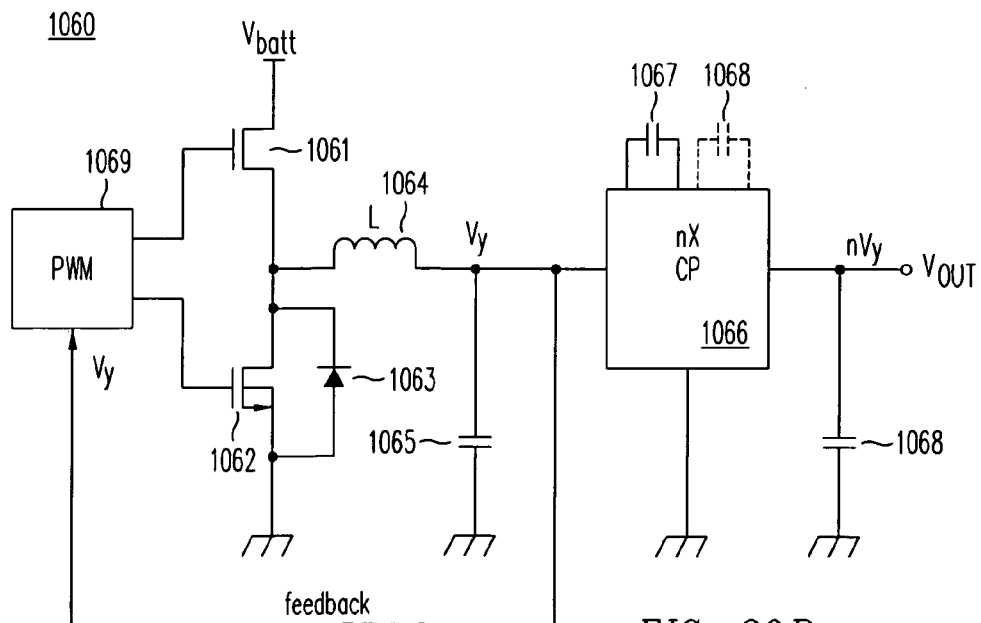
FIG. 30B is a circuit diagram of a non-level shifted feedback from intermediate $V_y$ terminal of a switched LCDX regulating converter.

In conclusion, FIG. 30A illustrates that an LCDX DC/DC converter 1040 utilizing closed loop feedback from $V_{out}$ to a PWM controller 1050 requires a level shift circuit 1049. In contrast LCDX converter 1060, shown in FIG. 30B, utilizing feedback from the output $V_y$ of the pre-regulator does not need any special level shifting of the feedback signal to a PWM controller 1069, except to adjust for the ratio of $V_y$ to $V_{ref}$.

Power MOSFET Gate Drive in LCDX Regulators

FIGS. 31A-31F illustrate a variety of gate buffers driving the gates of various power MOSFETs used in the disclosed switched LCDX converters. The power MOSFET device conductivity type, i.e. N-channel or P-channel, and its associated gate drive circuitry can affect performance and efficiency and are therefore another consideration in optimizing an LCDX switching regulator.

High-side MOSFETs, i.e. those with one high-current terminal permanently tied to the battery voltage batt or the intermediate voltage $V_y$, may comprise either NMOS or PMOS devices. Such devices include MOSFETs 481, 487 and 488 in the LCDU converter 480 of FIG. 18. They may also be used for floating devices such as MOSFET 489.

Figure 31A:
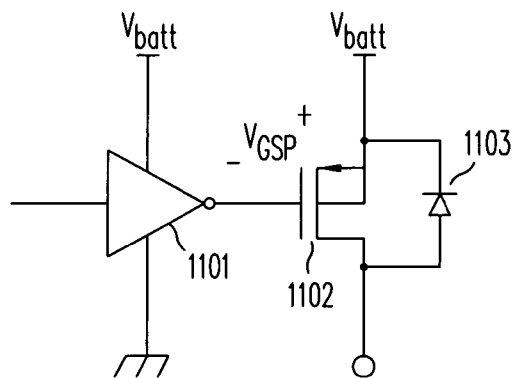
FIG. 31A is a circuit diagram of a gate buffer driven from $V_{batt}$ for a high-side P-channel power MOSFET in a switched LCDX converter.

In an inductive pre-regulator, for example, a high-side PMOS 1102 tied to the battery input as shown in circuit 1100 of FIG. 31A has its gate buffer 1101 powered by $V_{batt}$ so that its gate-to-source voltage $V_{GSP}$ ranges from $-V_{batt}$ to 0. PMOS 1102 as shown includes a source-body short forming anti-parallel P-N diode 1103 with its cathode connected to the transistor's source and with its anode tied to its drain. The diode 1103 remains reversed biased under normal operating conditions.

Figure 31B:
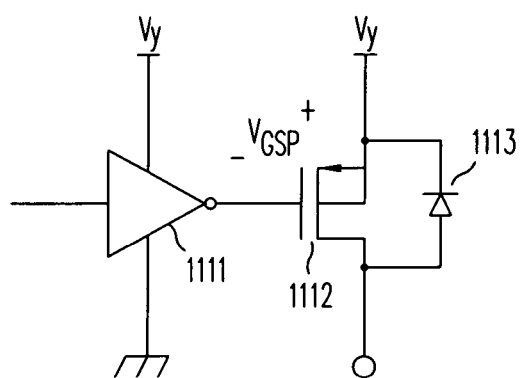
FIG. 31B is a circuit diagram of a gate buffer driven from the intermediate voltage $V_y$ for a high-side P-channel power MOSFET in a switched LCDX converter.

Similarly, in the charge-pump post-converter, a high-side PMOS 1112 tied to the intermediate voltage $V_y$, as shown in circuit 1110 of FIG. 31B has its gate buffer 1111 powered by $V_y$ so that its gate-to-source voltage $V_{GSP}$ ranges from $-V_y$ to 0. PMOS transistors benefit from their ease of gate drive but unfortunately exhibit on-state resistances two and half times larger than NMOS transistors for the same active device area. PMOS 1112 as shown includes a source-body short forming anti-parallel P-N diode 1113 with its cathode connected to the transistor's source and with its anode tied to its drain. The diode 1113 remains reverse-biased under normal operating conditions.

Figure 31C:
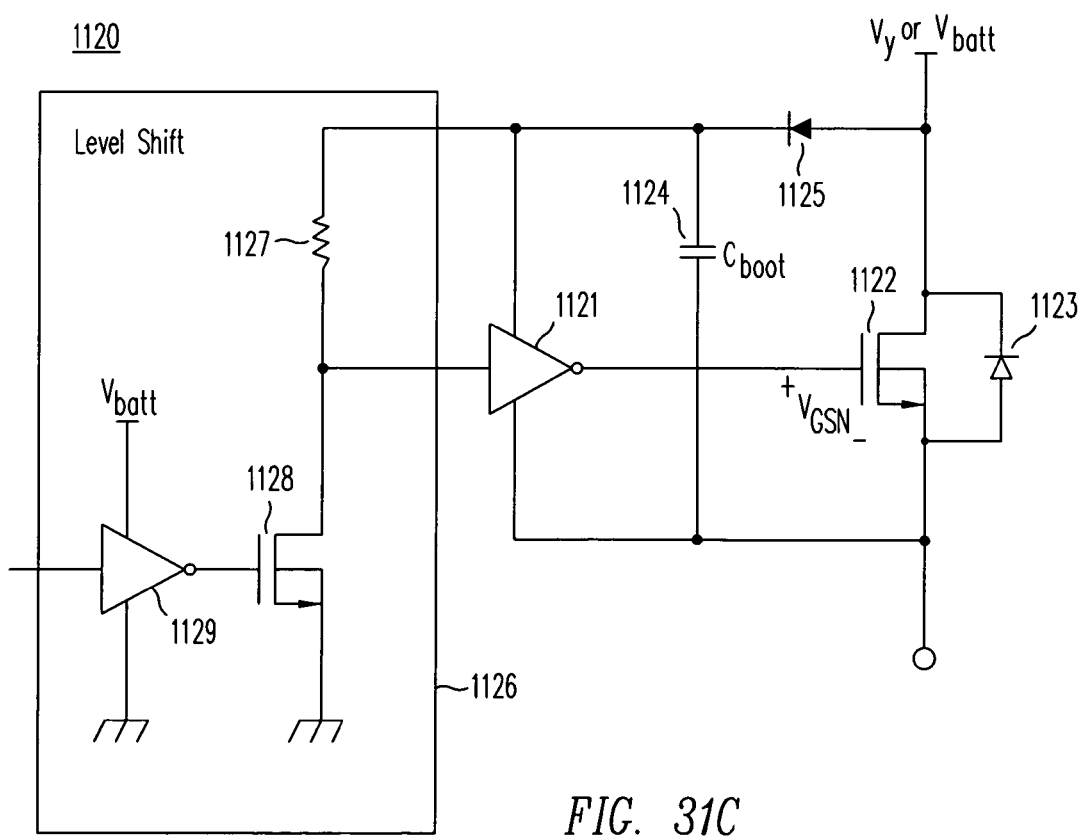
FIG. 31C is a circuit diagram of a boot strap gate buffer with resistive level shifting for a high-side N-channel power MOSFET in a switched LCDX converter.

In the case of a high-side power NMOS source-follower 1122 as shown in circuit 1120 of FIG. 31C, the gate drive must supply a voltage higher than the MOSFET's drain voltage and ideally should float with respect to the MOSFET's source so that a constant $V_{GSN}$ can be applied regardless of the output voltage of the source follower.

One means to implement floating NMOS gate drive is bootstrap circuit 1120, shown in FIG. 31C, where high-side NMOS 1122 is powered by a bootstrap capacitor 1124 and a floating gate buffer 1121 referenced to the source of NMOS 1122. The bootstrap capacitor 1124 is charged through bootstrap diode 1125 from either $V_{batt}$ or $V_y$ whenever NMOS 1122 is off, i.e. when $V_{GSN}=0$, and its source is pulled near ground. In this state, bootstrap capacitor 1124 charges to a voltage $(V_{batt}-V_f)$ or $(V_y-V_f)$, depending on the supply input. $V_f$ is the forward voltage of bootstrap diode 1125. Bootstrap gate drive requires constant switching to operate properly or the voltage across bootstrap capacitor 1124 may sag and allow NMOS 1122 to inadvertently turn off.

When buffer 1121 drives the gate of NMOS 1122 on, capacitor 1124 holds NMOS 1122 in its on state while its source voltage rises to near $V_{batt}$. The positive terminal of bootstrap capacitor 1124 then rises to approximately $(2V_{batt}-V_f)$ or $(2V_y-V_f)$ above ground maintaining $V_{GSN}$ at a constant gate drive $(V_{batt}-V_f)$ or $(V_y-V_f)$ throughout the transition. The input signal controlling gate buffer 1121 is resistive level shift circuit 1126 comprising resistor 1127, NMOS 1128 and gate buffer 1129 powered by $V_{batt}$.

Figure 31D:
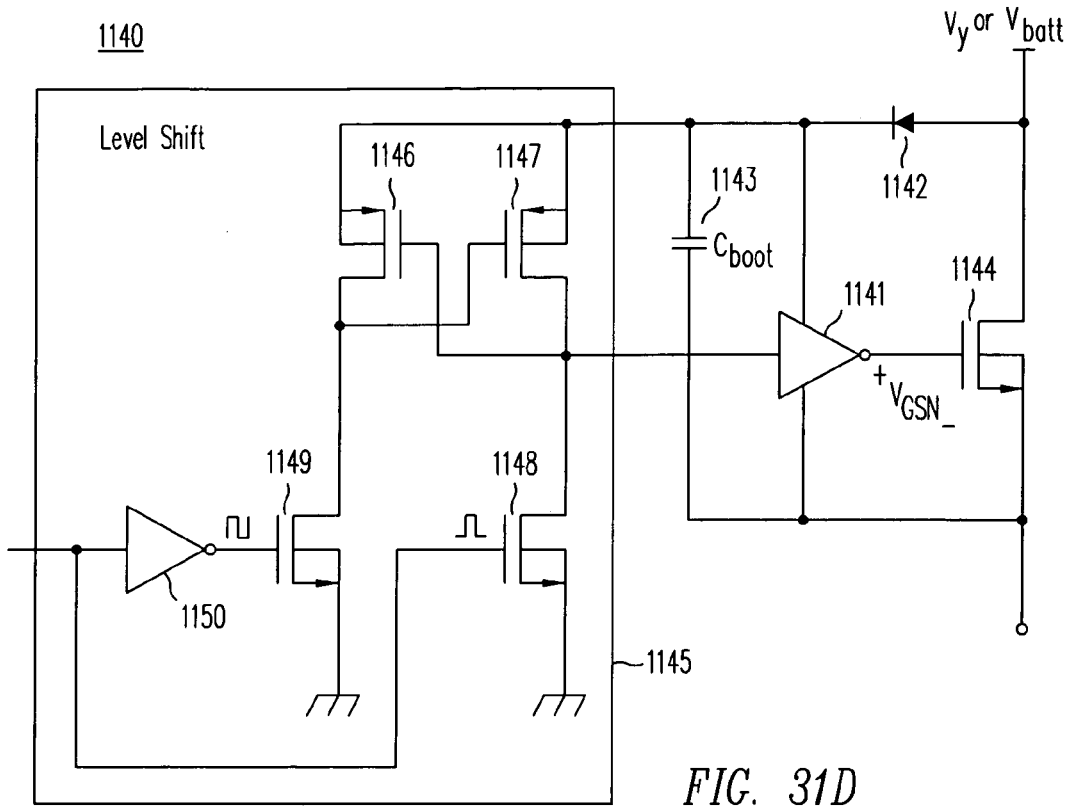
FIG. 31D is a circuit diagram of a boot strap gate buffer with cross-coupled level shifting for a high-side N-channel power MOSFET in a switched LCDX converter.
Figure 31E:
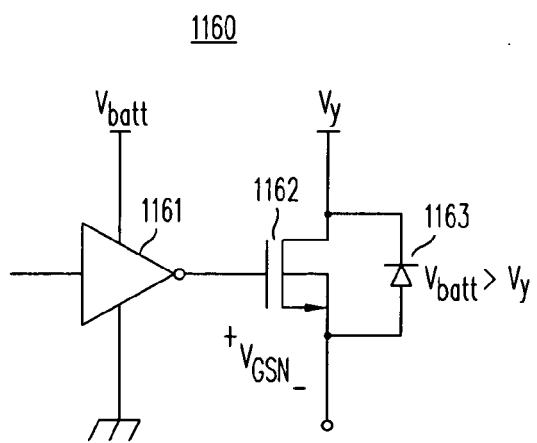
FIG. 31E is a circuit diagram of a gate buffer driven from $V_{batt}$ for a low-side N-channel power MOSFET in a switched LCDX converter.

An alternative implementation of a bootstrapped level shifted high side power NMOS circuit 1140 in FIG. 31D comprises power NMOS 1144, floating gate buffer 1141, bootstrap capacitor 1143 and bootstrap diode 1142 powered by $V_y$ or $V_{batt}$ and controlled by cross coupled level shift circuit 1145. Unlike level shift 1126 of FIG. 31C, which exhibits static power dissipation in resistor 117 whenever level shift NMOS 1128 is on, cross coupled level shift 1145 does not exhibit static power dissipation. It operates by inverter 1150 driving NMOS level shift transistors 1149 and 1150 out of phase pulling the gate of PMOS 1146 to ground and forcing the gate of 1147 to the bootstrap voltage, thereby latching the level shift circuit into a stable but non-conducting state.

Boot strap drive circuits 1120 and 1140 may be used for any high side or floating NMOS utilized in the pre-regulator circuit or in the charge pump post-converter.

A special gate drive circuit may be used for driving floating or high-side NMOS in the charge pump post-converter. Since in any LCDX converter the first stage is a down converter, then it follows that $V_{batt}>V_y$. In the gate drive circuit 1160 of FIG. 31E, gate buffer 1161 powers the gate of NMOS 1162 whose drain is biased to pre-regulator output voltage $V_y$. Without using floating gate drive, buffer 1161 applies the voltage $V_{batt}$ to the gate of NMOS 1162 regardless of its source voltage. Initially, at the onset of turn-on when NMOS 1162 is off, $V_{GSN}=V_{batt}$. After NMOS 1162 turns on and pulls up, the gate drive is diminished to an amount equal to $V_{GSN}=(V_{batt}-V_y)$. Since $V_y=D \cdot V_{batt}$, then the gate drive can be expressed as $V_{GSN}=V_{batt}(1-D)$.

Figure 31F:
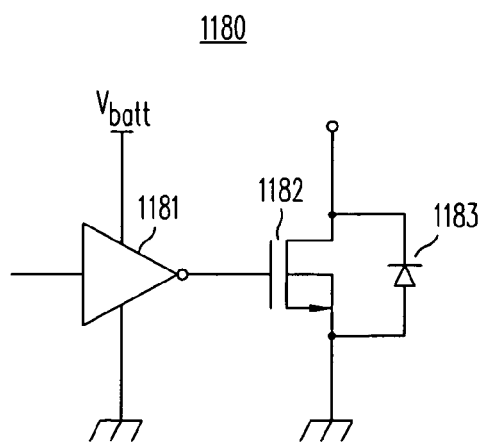
FIG. 31F is a circuit diagram of a gate buffer driven from the intermediate voltage $V_y$ for a low-side N-channel power MOSFET in a switched LCDX converter.
Figure 32:
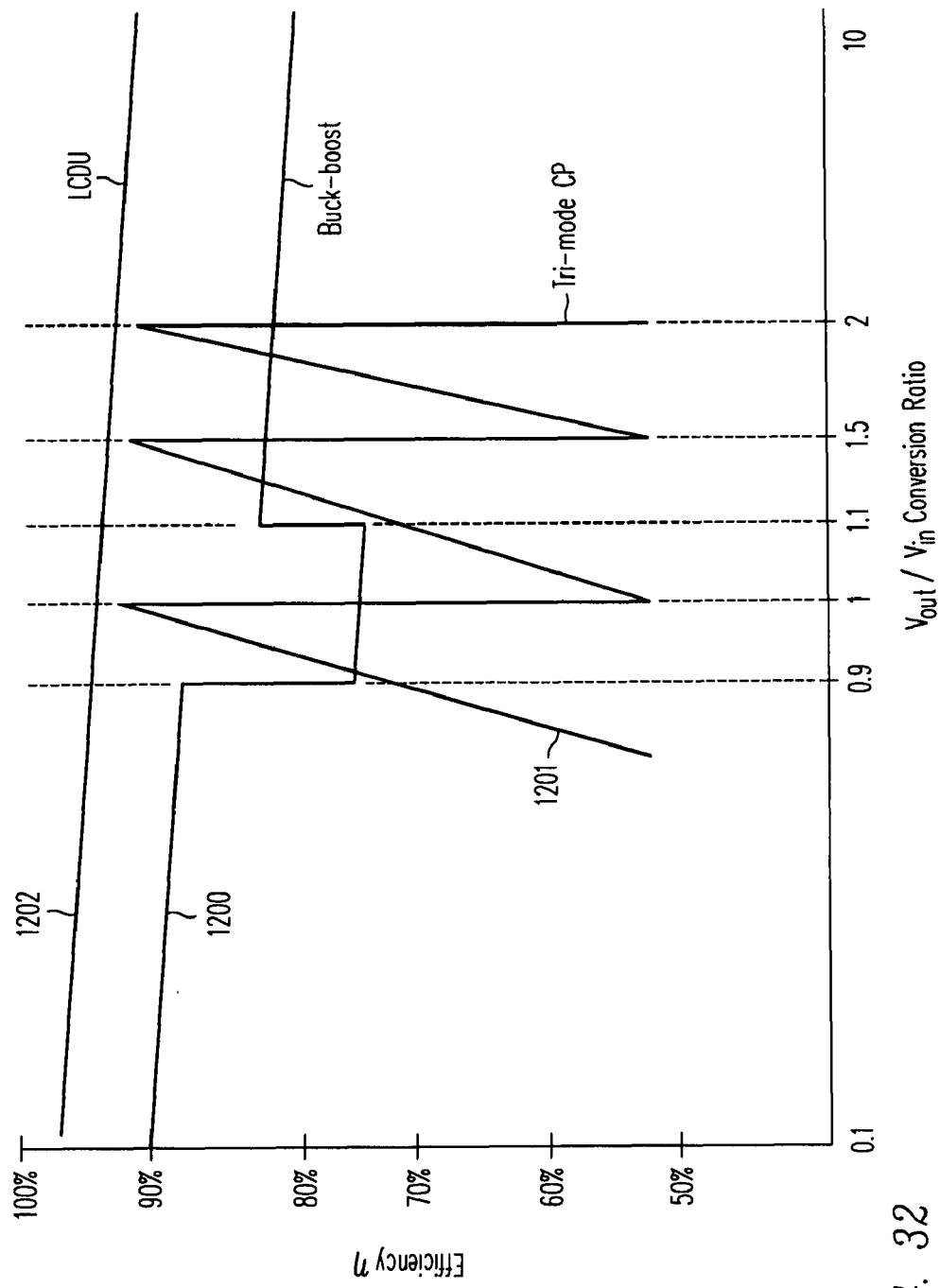
FIG. 32 is a graph showing a comparison of the efficiencies of a tri-mode charge pump and Buck-boost converter to the efficiency of an LCDU converter according to this invention.

Low side NMOS transistors such as transistors 483 and 486 in FIG. 18 are permanently connected to ground and do not require floating gate drive. NMOS 1182, shown in FIG. 31F, is driven by gate buffer 1181 powered by input $V_{batt}$ to minimize on-resistance. Notice also that low side NMOS 483 is used to recirculate inductor current and thereby forward biases PN diode 1183, shunted by on NMOS 1182.

While a number of embodiments of this invention have been described herein, it should be understood that these embodiment are illustrative, and not limiting, of the broad principles of this invention. Many alternative and additional embodiments within the broad principles of this invention will be apparent to persons of skill in the art from the descriptions herein.

I claim:

1. A DC/DC voltage converter comprising:
    a step-down pre-regulator comprising a switched inductive circuit; and
    a post-converter comprising a charge pump,
    wherein an output terminal of the pre-regulator is coupled to an input terminal of the post-converter, an input terminal of the DC/DC converter comprising an input terminal of the pre-regulator, an output terminal of the DC/DC converter comprising an output terminal of the post-converter.

2. The DC/DC voltage converter of claim 1 further comprising a feedback path, a first terminal of the feedback path being coupled to control circuitry of the pre-regulator.

3. The DC/DC voltage converter of claim 2 wherein a second terminal of the feedback path is coupled to the output terminal of the post-converter.

4. The DC/DC voltage converter of claim 2 wherein a second terminal of the feedback path is coupled to the output terminal of the pre-regulator.

5. The DC/DC voltage converter of claim 1 wherein the pre-regulator comprises a high-side switch connected in a series path with a low-side switch and an inductor connected to a point in the series path between the high-side switch and the low-side switch.

6. The DC/DC voltage converter of claim 1 wherein the post-converter comprises a voltage polarity inverter.

7. The DC/DC voltage converter of claim 1 wherein the pre-regulator comprises a Buck converter.

8. A method of converting a first DC voltage to a second DC voltage comprising:
    providing at least one inductor and at least one capacitor;
    during a first time interval coupling a first terminal of the at least one inductor to the first DC voltage;
    during a second time interval coupling the first terminal of the at least one inductor to a second voltage, thereby producing an intermediate voltage at a second terminal of the at least one inductor;
    during a third time interval coupling a first terminal of the at least one capacitor to the intermediate voltage and coupling a second terminal of the at least one capacitor to a third voltage; and
    during a fourth time interval coupling the second terminal of the at least one capacitor to the intermediate voltage and coupling the first terminal of the at least one capacitor to an output terminal, thereby providing the second DC voltage at the output terminal.

9. The method of claim 8 wherein the first and third time intervals overlap.

10. The method of claim 9 wherein the second and fourth time intervals overlap.

11. The method of claim 8 wherein the first time interval defines a duty cycle and the method further comprises using the second DC voltage to determine the duty cycle.

12. The method of claim 8 wherein the first time interval defines a duty cycle and the method further comprises using the intermediate voltage to determine the duty cycle.

13. The method of claim 8 wherein the first and second time intervals define a first cycle and the third and fourth time intervals define a second cycle, the method comprising clocking the first and second cycles synchronously.

14. A method of converting a first DC voltage to a second DC voltage comprising:
    providing at least one inductor and at least one capacitor;
    during a first time interval coupling a first terminal of the at least one inductor to the first DC voltage;
    during a second time interval coupling the first terminal of the at least one inductor to a second voltage, thereby producing an intermediate voltage at a second terminal of the at least one inductor;
    during a third time interval coupling a first terminal of the at least one capacitor to the intermediate voltage and coupling a second terminal of the at least one capacitor to a third voltage; and
    during a fourth time interval coupling the second terminal of the at least one capacitor to a fourth voltage and coupling the first terminal of the at least one capacitor to an output terminal, thereby providing the second DC voltage at the output terminal.

15. The method of claim 14 wherein the first and third time intervals overlap.

16. The method of claim 15 wherein the second and fourth time intervals overlap.

17. The method of claim 14 wherein the first time interval defines a duty cycle and the method further comprises using the second DC voltage to determine the duty cycle.

18. The method of claim 14 wherein the first time interval defines a duty cycle and the method further comprises using the intermediate voltage to determine the duty cycle.

19. The method of claim 14 wherein the first and second time intervals define a first cycle and the third and fourth time intervals define a second cycle, the method comprising clocking the first and second cycles synchronously.

* * * * *